United States Patent
Shibayama

(10) Patent No.: US 11,415,787 B2
(45) Date of Patent: Aug. 16, 2022

(54) VARIABLE MAGNIFICATION OPTICAL SYSTEM, OPTICAL APPARATUS, AND METHOD FOR MANUFACTURING VARIABLE MAGNIFICATION OPTICAL SYSTEM

(71) Applicant: Nikon Corporation, Tokyo (JP)

(72) Inventor: Atsushi Shibayama, Tokyo (JP)

(73) Assignee: Nikon Corporation, Tokyo (JP)

(*) Notice: Subject to any disclaimer, the term of this patent is extended or adjusted under 35 U.S.C. 154(b) by 104 days.

(21) Appl. No.: 16/752,686

(22) Filed: Jan. 26, 2020

(65) Prior Publication Data

US 2020/0233192 A1  Jul. 23, 2020

Related U.S. Application Data

(62) Division of application No. 15/545,704, filed as application No. PCT/JP2016/052596 on Jan. 29, 2016, now Pat. No. 10,606,047.

(30) Foreign Application Priority Data

Jan. 30, 2015 (JP) .................. 2015-017910

(51) Int. Cl.
  *G02B 15/14* (2006.01)
  *G02B 13/18* (2006.01)
  (Continued)

(52) U.S. Cl.
  CPC ...... *G02B 15/144511* (2019.08); *G02B 13/02* (2013.01); *G02B 13/18* (2013.01);
  (Continued)

(58) Field of Classification Search
  CPC ........ G02B 15/144511; G02B 15/1445; G02B 15/144; G02B 15/14; G02B 15/177;
  (Continued)

(56) References Cited

U.S. PATENT DOCUMENTS

| 5,715,097 A | 2/1998 | Shibayama et al. |
| 5,835,272 A | 11/1998 | Kodama |

(Continued)

FOREIGN PATENT DOCUMENTS

| CN | 102411196 A | 4/2012 |
| JP | 11-231220 A | 8/1999 |

(Continued)

OTHER PUBLICATIONS

Office Action dated Jun. 29, 2020, in Indian Patent Application No. 201717030442.

(Continued)

*Primary Examiner* — William R Alexander
(74) *Attorney, Agent, or Firm* — SGPatents PLLC

(57) ABSTRACT

A variable magnification optical system includes, in order from an object: a first lens group (G1) having a negative refractive power; a second lens group (G2) having a positive refractive power; a third lens group (G3) having a negative refractive power; and a fourth lens group (G4) having a positive refractive power. The system performs varying magnification by changing the distance between the first lens group and the second lens group, the distance between the second lens group and the third lens group, and the distance between the third lens group and the fourth lens group. The third lens group includes a 32nd lens group (G32) configured to be movable so as to have a component in a direction orthogonal to an optical axis in order to correct image blur as a vibration-reduction lens group (VR) and a 31st lens group (G31) disposed at an object-side of the 32nd lens group. The 32nd lens group has negative refractive power, and the system satisfies Conditional Expression (1) below.

$$0.200 < f1/f3 < 0.900 \qquad (1)$$

19 Claims, 55 Drawing Sheets

(51) Int. Cl.
  *G03B 5/00* (2021.01)
  *G02B 15/177* (2006.01)
  *G02B 13/02* (2006.01)
  *G02B 27/64* (2006.01)
  *G03B 5/04* (2021.01)

(52) U.S. Cl.
  CPC ......... *G02B 15/177* (2013.01); *G02B 27/646* (2013.01); *G03B 5/00* (2013.01); *G03B 5/04* (2013.01); *G03B 2205/0015* (2013.01); *G03B 2205/0046* (2013.01)

(58) Field of Classification Search
  CPC ........ G02B 15/16; G02B 13/02; G02B 13/18; G02B 27/646; G02B 27/64; G03B 5/00; G03B 5/04; G03B 2205/0015; G03B 2205/0046
  USPC ......................................................... 359/557
  See application file for complete search history.

(56) References Cited

U.S. PATENT DOCUMENTS

| | | | |
|---|---|---|---|
| 6,618,198 | B1 | 9/2003 | Endo |
| 7,126,759 | B2* | 10/2006 | Sensui ........... G02B 15/144511 |
| | | | 359/680 |
| 7,961,409 | B2 | 6/2011 | Yamamoto et al. |
| 8,144,403 | B2 | 3/2012 | Ito et al. |
| 8,259,400 | B2 | 9/2012 | Shibata |
| 8,908,273 | B2 | 12/2014 | Fujimoto |
| 9,250,425 | B2 | 2/2016 | Hagiwara |
| 9,348,125 | B2 | 5/2016 | Imaoka |
| 9,575,295 | B2* | 2/2017 | Noda ............. G02B 15/145121 |
| 9,823,488 | B2* | 11/2017 | Kawamura .... G02B 15/144113 |
| 9,915,811 | B2 | 3/2018 | Onozaki |
| 10,606,047 | B2* | 3/2020 | Shibayama ............ G02B 13/18 |
| 2005/0013015 | A1* | 1/2005 | Sensui ........... G02B 15/144511 |
| | | | 359/680 |
| 2010/0188755 | A1 | 7/2010 | Shibata |
| 2012/0069441 | A1 | 3/2012 | Fujimoto et al. |
| 2012/0105693 | A1* | 5/2012 | Hagiwara ............ G02B 27/646 |
| | | | 348/294 |
| 2013/0107365 | A1* | 5/2013 | Kanazashi ............. G02B 27/64 |
| | | | 359/557 |
| 2013/0141628 | A1* | 6/2013 | Imaoka ................ G02B 15/177 |
| | | | 359/680 |
| 2014/0152887 | A1* | 6/2014 | Hagiwara ............... G02B 15/22 |
| | | | 348/360 |
| 2014/0211082 | A1 | 7/2014 | Imaoka |
| 2014/0368913 | A1* | 12/2014 | Kawamura .......... G02B 27/646 |
| | | | 359/557 |
| 2014/0368925 | A1* | 12/2014 | Kawamura .......... G02B 27/646 |
| | | | 359/687 |
| 2015/0015956 | A1* | 1/2015 | Kim ............... G02B 15/144515 |
| | | | 359/557 |
| 2015/0070520 | A1* | 3/2015 | Hagiwara ............. G02B 15/177 |
| | | | 348/208.11 |
| 2015/0109670 | A1* | 4/2015 | Kawana ............... G02B 15/173 |
| | | | 359/557 |
| 2015/0124322 | A1 | 5/2015 | Onozaki |
| 2015/0309290 | A1* | 10/2015 | Ori ................. G02B 15/145125 |
| | | | 359/683 |
| 2015/0309291 | A1* | 10/2015 | Ori ................. G02B 15/145125 |
| | | | 359/683 |
| 2015/0370041 | A1* | 12/2015 | Noda ..................... G02B 15/14 |
| | | | 359/683 |
| 2016/0062095 | A1* | 3/2016 | Kawamura .......... G02B 27/646 |
| | | | 359/683 |
| 2016/0170189 | A1* | 6/2016 | Fujimoto ....... G02B 15/145527 |
| | | | 359/557 |
| 2016/0202457 | A1* | 7/2016 | Li ......................... G02B 27/646 |
| | | | 359/557 |
| 2018/0196240 | A1* | 7/2018 | Fujimoto ........... G02B 27/0025 |

FOREIGN PATENT DOCUMENTS

| | | |
|---|---|---|
| JP | 2010-170062 A | 8/2010 |
| WO | WO 2016/121903 A1 | 8/2016 |

OTHER PUBLICATIONS

International Search Report from International Patent Application No. PCT/JP2016/052596, dated Apr. 26, 2016.
Written Opinion of the International Searching Authority from International Patent Application No. PCT/JP2016/052596, dated Apr. 26, 2016.
Office Action dated Nov. 7, 2017 in Japanese Patent Application No. 2016-572164.
Extended European search report for European Patent Application No. 16743506.4, dated Sep. 21, 2018.
Office Action dated May 5, 2019, in Chinese Patent Application No. 201680017399.1.
Office Action dated Dec. 11, 2019 in Chinese Patent Application No. 201680017399.1.
Office Action dated Aug. 6, 2019 in Japanese Patent Application No. 2018-189284.
Office Action dated Dec. 13, 2018 in U.S. Appl. No. 15/545,704.
Office Action dated Jun. 3, 2019 in U.S. Appl. No. 15/545,704.

* cited by examiner (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION (a)

LATERAL ABERRATION (b)

LATERAL ABERRATION (c)

LATERAL ABERRATION

VARIABLE MAGNIFICATION OPTICAL SYSTEM, OPTICAL APPARATUS, AND METHOD FOR MANUFACTURING VARIABLE MAGNIFICATION OPTICAL SYSTEM

TECHNICAL FIELD

The present invention relates to a variable magnification optical system, an optical apparatus, and a method for manufacturing the variable magnification optical system.

Priority is claimed on Japanese Patent Application No. 2015-017910, filed Jan. 30, 2015, the content of which is incorporated herein by reference.

TECHNICAL BACKGROUND

Conventionally, a variable magnification optical system having a wide angle of view including a camera shake compensation mechanism has been proposed (for example, see Patent Document 1).

RELATED ART DOCUMENTS

Patent Document

Patent Document 1:
Japanese Patent Application, Publication No. H11-231220

SUMMARY OF INVENTION

Technical Problem

In recent years, there has been an increasing demand for a variable magnification optical system which has both a wide angle of view and a satisfactory optical performance.

Solution to Problem

According to an aspect of the present invention, there is provided a variable magnification optical system including, in order from an object: a first lens group having a negative refractive power; a second lens group having a positive refractive power; a third lens group having a negative refractive power; and a fourth lens group having a positive refractive power, the system performing varying magnification by changing the distance between the first lens group and the second lens group, the distance between the second lens group and the third lens group, and the distance between the third lens group and the fourth lens group, wherein the third lens group includes a 32nd lens group configured to be movable so as to have a component in a direction orthogonal to an optical axis in order to correct image blur as a vibration-reduction lens group and a 31st lens group disposed at an object-side of the 32nd lens group, the 32nd lens group has negative refractive power, and the system satisfies the following conditional expression.

$$0.200 < f1/f3 < 0.900$$

where
f1: a focal length of the first lens group
f3: a focal length of the third lens group According to another aspect of the present invention, there is provided a variable magnification optical system including, in order from an object: a first lens group having a negative refractive power; a second lens group having a positive refractive power; a third lens group having a negative refractive power; and a fourth lens group having a positive refractive power, the system performing varying magnification by changing the distances between the respective lens groups, wherein the third lens group includes a 32nd lens group configured to be movable so as to have a component in a direction orthogonal to an optical axis in order to correct image blur as a vibration-reduction lens group and a 31st lens group which is disposed close to an object-side of the 32nd lens group and of which the position in the direction orthogonal to the optical axis during image blur correction is immovable, the 31st lens group has positive or negative refractive power, the 32nd lens group has negative refractive power, and the system satisfies the following conditional expression.

$$0.200 < f1/f3 < 0.900$$

where
f1: a focal length of the first lens group
f3: a focal length of the third lens group According to another aspect of the present invention, there is provided an optical apparatus having the above-described variable magnification optical system mounted thereon.

According to another aspect of the present invention, there is provided a method for manufacturing a variable magnification optical system, wherein the variable magnification optical system includes, in order from an object: a first lens group having a negative refractive power; a second lens group having a positive refractive power; a third lens group having a negative refractive power; and a fourth lens group having a positive refractive power, the system performing varying magnification by changing the distance between the first lens group and the second lens group, the distance between the second lens group and the third lens group, and the distance between the third lens group and the fourth lens group, wherein the third lens group includes a 32nd lens group configured to be movable so as to have a component in a direction orthogonal to an optical axis in order to correct image blur as a vibration-reduction lens group and a 31st lens group disposed at an object-side of the 32nd lens group, the 32nd lens group has negative refractive power, and the method includes arranging the respective lenses in a lens barrel so as to satisfy the following conditional expression.

$$0.200 < f1/f3 < 0.900$$

where
f1: a focal length of the first lens group
f3: a focal length of the third lens group According to another aspect of the present invention, there is provided a method for manufacturing a variable magnification optical system, wherein the variable magnification optical system includes, in order from an object: a first lens group having a negative refractive power; a second lens group having a positive refractive power; a third lens group having a negative refractive power; and a fourth lens group having a positive refractive power, the system performing varying magnification by changing the distances between the respective lens groups, wherein the third lens group includes a 32nd lens group configured to be movable so as to have a component in a direction orthogonal to an optical axis in order to correct image blur as a vibration-reduction lens group and a 31st lens group which is disposed close to an object-side of the 32nd lens group and of which the position in the direction orthogonal to the optical axis during image blur correction is immovable, the 31st lens group has positive or negative refractive power, the 32nd lens group has negative refractive power, and the method includes arranging the respective lenses in a lens barrel so as to satisfy the following conditional expression.

$$0.200 < f1/f3 < 0.900$$

where f1: a focal length of the first lens group
f3: a focal length of the third lens group

DESCRIPTION OF EMBODIMENTS

Figure 1:
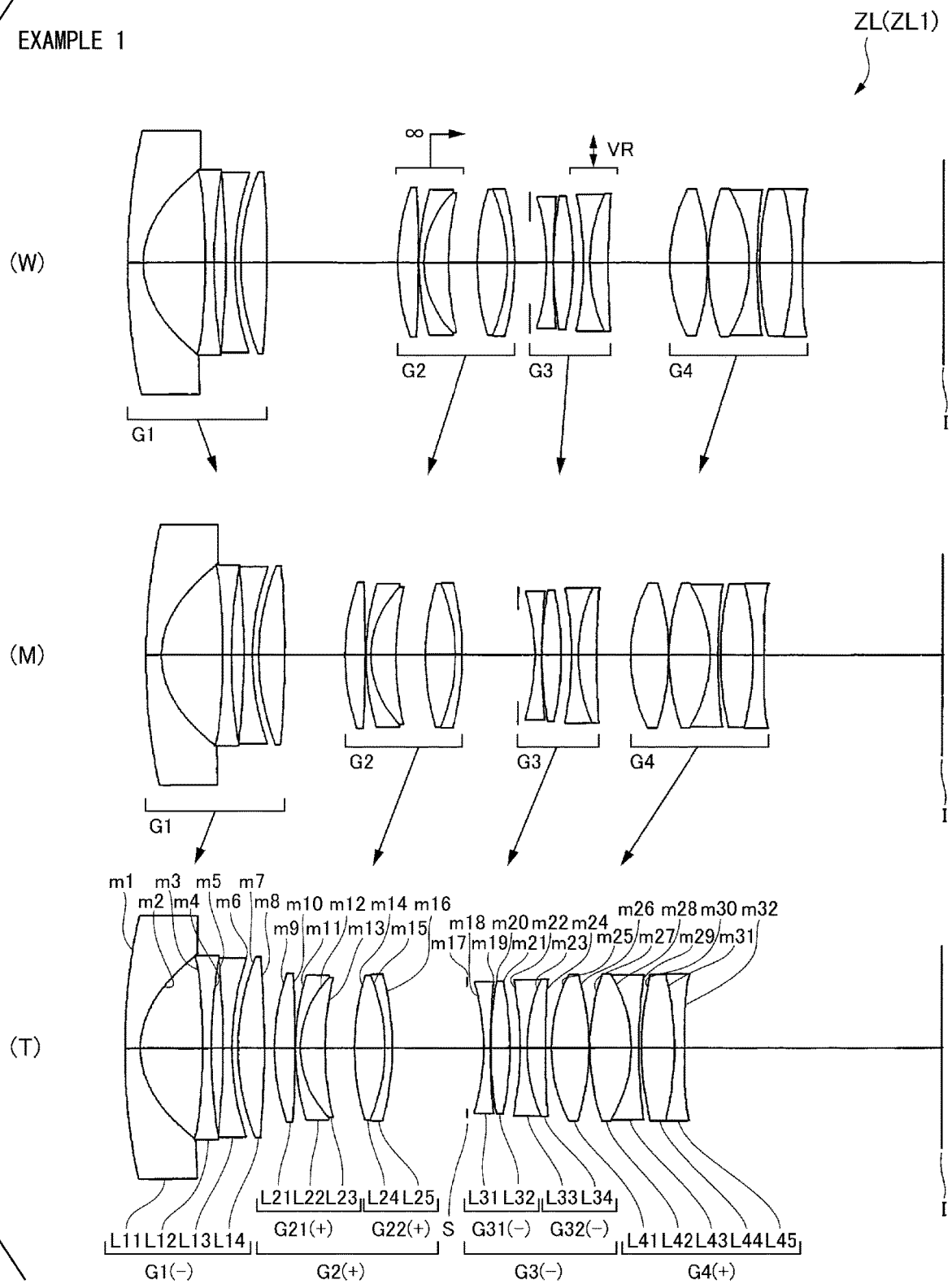
FIG. 1 is a cross-sectional view of a variable magnification optical system according to Example 1, wherein parts (W), (M), and (T) are in a wide-angle end state, an intermediate focal length state, and a telephoto end state, respectively.

An embodiment will now be described with reference to the drawings. FIG. 1 illustrates an example of a configuration of a variable magnification optical system (variable power optical system) ZL. In other examples, the number of lens groups, a lens configuration of each lens group, and the like can be changed appropriately.

In an embodiment, a variable magnification optical system ZL includes, in order from an object, a first lens group G1 having a negative refractive power; a second lens group G2 having a positive refractive power; a third lens group G3 having a negative refractive power; and a fourth lens group G4 having a positive refractive power, the system performing varying magnification (varying power) by changing the distance between the first lens group G1 and the second lens group G2, the distance between the second lens group G2 and the third lens group G3, and the distance between the third lens group G3 and the fourth lens group G4, wherein the third lens group G3 includes a 32nd lens group G32 configured to be movable so as to have a component in a direction orthogonal to an optical axis in order to correct image blur as a vibration-reduction lens group (VR) and a 31st lens group G31 disposed close to an object-side of the 32nd lens group G32, and the 32nd lens group G32 has negative refractive power.

Alternatively, a variable magnification optical system ZL may, in order from an object include a first lens group G1 having a negative refractive power; a second lens group G2 having a positive refractive power; a third lens group G3 having a negative refractive power; and a fourth lens group G4 having a positive refractive power, the system performing varying magnification by changing the distances between the respective lens groups, wherein the third lens group G3 includes a 32nd lens group G32 configured to be movable so as to have a component in a direction orthogonal to an optical axis in order to correct image blur as a vibration-reduction lens group (VR) and a 31st lens group G31 which is disposed close to an object-side of the 32nd lens group G32 and of which the position in the direction orthogonal to the optical axis during image blur correction is immovable, the 31st lens group G31 has positive or negative refractive power, and the 32nd lens group G32 has negative refractive power.

As described above, the variable magnification optical system has lens groups having a negative, positive, negative, and positive refractive power and changes the distances between the respective lens groups. Therefore, it is possible to implement a variable magnification optical system having a wide angle of view. Moreover, the third lens group G3 having a negative refractive power is configured to include the 31st lens group G31 and the 32nd lens group G32 having a negative refractive power, and the 32nd lens group G32 is moved so as to have a component in the direction orthogonal to the optical axis to perform image blur correction. Therefore, it is possible to suppress the occurrence of eccentric coma aberration (decentering coma aberration) and one-sided blur during image blur correction and to obtain satisfactory imaging performance. Here, if at least a portion of a lens group (for example, the second lens group G2) other than the third lens group G3 is configured as a vibration-reduction lens group, when the F-value is decreased (brightened) and an image height is increased, manufacturing sensitivity increases and it is difficult to manufacture the lens group. However, if at least a portion of the third lens group G3 in the optical system having a negative, positive, negative, and positive refractive power is configured as a vibration-reduction lens group, even when the F-value is decreased and the image height is increased, it is possible to obtain an effect that an increase in manufacturing sensitivity is suppressed. When a portion of the third lens group G3 is configured as a vibration-reduction lens group and a lens which is immovable during vibration reduction is disposed in the third lens group G3 on a side closer to the object side than the vibration-reduction lens group, it is possible to obtain an effect that the vibration-reduction performance does not decrease even when the F-value is decreased.

The variable magnification optical system ZL satisfies Conditional Expression (1) below.

$$0.200 < f1/f3 < 0.900 \qquad (1)$$

where f1: a focal length of the first lens group G1 f3: a focal length of the third lens group G3

Conditional Expression (1) is a conditional expression for correcting curvature of field and coma aberration satisfactorily while obtaining a wide angle of view (a half-angle of view of approximately 50° or more) in the wide-angle end state.

If the focal length ratio exceeds the upper limit value of Conditional Expression (1), the focal length of the first lens group G1 is increased, and it is difficult to obtain a wide angle of view (a half-angle of view of approximately 50° or more) in the wide-angle end state. In some cases, a total lens length and a lens diameter of the first lens group G1 are increased.

In order to obtain the effect reliably, it is preferable that the upper limit value of Conditional Expression (1) be set to 0.800. In order to obtain the effect more reliably, it is preferable that the upper limit value of Conditional Expression (1) be set to 0.700.

If the focal length ratio is smaller than the lower limit value of Conditional Expression (1), the focal length of the first lens group G1 is decreased and it is difficult to correct curvature of field and coma aberration. Therefore, it may be difficult to obtain satisfactory imaging performance.

In order to obtain the effect reliably, it is preferable that the lower limit value of Conditional Expression (1) be set to 0.250. In order to obtain the effect more reliably, it is preferable that the lower limit value of Conditional Expression (1) be set to 0.300.

Preferably, the variable magnification optical system ZL satisfies Conditional Expression (2) below.

$$0.700 < f32/f3 < 2.500 \quad (2)$$

where f32: a focal length of the 32nd lens group G32

Conditional Expression (2) is a conditional expression for defining the focal length of the 32nd lens group G32 which is the vibration-reduction lens group (VR) with respect to the focal length of the third lens group G3. When Conditional Expression (2) is satisfied, it is possible to control a moving distance of the 32nd lens group G32 appropriately during image blur correction while obtaining satisfactory imaging performance.

When the focal length ratio exceeds the upper limit value of Conditional Expression (2), the focal length of the 32nd lens group G32 is increased and the moving distance of the 32nd lens group G32 during image blur correction increases. Due to this, the size of an image blur correction mechanism may increase.

In order to obtain the effect reliably, it is preferable that the upper limit value of Conditional Expression (2) be set to 2.100. In order to obtain the effect more reliably, it is preferable that the upper limit value of Conditional Expression (2) be set to 1.700.

When the focal length ratio is smaller than the lower limit value of Conditional Expression (2), the focal length of the 32nd lens group G32 is decreased, the occurrence of one-sided blur or eccentric coma aberration occurring during image blur correction increases, and it is difficult to maintain satisfactory imaging performance during image blur correction.

In order to obtain the effect reliably, it is preferable that the lower limit value of Conditional Expression (2) be set to 0.800. In order to obtain the effect more reliably, it is preferable that the lower limit value of Conditional Expression (2) be set to 0.900.

Preferably, the variable magnification optical system ZL satisfies Conditional Expression (3) below.

$$0.400 < f4/f2 < 1.600 \quad (3)$$

where f4: a focal length of the fourth lens group G4 f2: a focal length of the second lens group G2

Conditional Expression (3) is a conditional expression for defining an appropriate ratio of the focal length of the fourth lens group G4 to the focal length of the second lens group G2. When Conditional Expression (3) is satisfied, it is possible to decrease a total lens length while satisfactorily correcting various aberrations including spherical aberration and obtaining a small (bright) F-value (approximately F2.8 to F3.5).

If the focal length ratio exceeds the upper limit value of Conditional Expression (3), the focal length of the second lens group G2 becomes smaller than the focal length of the fourth lens group G4 and it is difficult to correct spherical aberration. As a result, it is difficult to obtain a small (bright) F-value (approximately F2.8 to F3.5).

In order to obtain the effect reliably, it is preferable that the upper limit value of Conditional Expression (3) be set to 1.400. In order to obtain the effect more reliably, it is preferable that the upper limit value of Conditional Expression (3) be set to 1.200.

When the focal length ratio is smaller than the lower limit value of Conditional Expression (3), the focal length of the second lens group G2 becomes larger than the focal length of the fourth lens group G4 and it is difficult to decrease the total lens length.

In order to obtain the effect reliably, it is preferable that the lower limit value of Conditional Expression (3) be set to 0.500. In order to obtain the effect more reliably, it is preferable that the lower limit value of Conditional Expression (3) be set to 0.600.

In the variable magnification optical system ZL, it is preferable that the 32nd lens group G32 be constituted by a cemented lens including a positive lens and a negative lens.

According to this configuration, it is possible to effectively correct eccentric coma aberration and one-sided blur when the 32nd lens group G32 is moved to perform image blur correction. Moreover, it is possible to decrease the size and the weight of a lens that moves for image blur correction and to effectively decrease the size of an image blur correction mechanism and the entire lens.

In the variable magnification optical system ZL, it is preferable that the 31st lens group G31 have a negative lens and a positive lens.

According to this configuration, it is possible to effectively correct eccentric coma aberration and one-sided blur when the 32nd lens group G32 is moved to perform image blur correction.

In the variable magnification optical system ZL, it is preferable that the 31st lens group G31 be constituted by, in order from an object, a negative lens and a positive lens.

According to this configuration, it is possible to effectively correct eccentric coma aberration and one-sided blur when the 32nd lens group G32 is moved to perform image blur correction.

In the variable magnification optical system ZL, it is preferable that the 31st lens group G31 be constituted by, in order from an object, a cemented lens including a negative lens and a positive lens.

According to this configuration, it is possible to effectively correct eccentric coma aberration and one-sided blur when the 32nd lens group G32 is moved to perform image blur correction.

In the variable magnification optical system ZL, it is preferable that the 31st lens group G31 be constituted by, in order from an object, a positive lens and a negative lens.

According to this configuration, it is possible to effectively correct eccentric coma aberration and one-sided blur when the 32nd lens group G32 is moved to perform image blur correction.

In the variable magnification optical system ZL, it is preferable that the 31st lens group G31 be constituted by, in order from an object, a cemented lens including a positive lens and a negative lens.

According to this configuration, it is possible to effectively correct eccentric coma aberration and one-sided blur when the 32nd lens group G32 is moved to perform image blur correction.

In the variable magnification optical system ZL, it is preferable that the second lens group G2 be constituted by, in order from an object, a 21st lens group G21 having a positive refractive power and a 22nd lens group G22 having a positive refractive power, and the 21st lens group G21 is moved in an optical axis direction as a focusing lens group to thereby perform focusing.

According to this configuration, it is possible to decrease the size and the weight of a lens group that moves upon focusing and to decrease the size of an entire lens system and to increase a focusing speed during autofocus.

In the variable magnification optical system ZL, it is preferable that a lens surface closest to an image, of the 32nd lens group G32 be an aspherical surface.

According to this configuration, it is possible to effectively correct eccentric coma aberration and one-sided blur when the 32nd lens group G32 is moved to perform image blur correction.

Preferably, the variable magnification optical system ZL satisfies Conditional Expression (4) below.

$$1.100 < A(T3.5)/A(T4.0) < 5.000 \quad (4)$$

where

A(T3.5): an sphericity at a point on the aspherical surface where light corresponding to F-value of 3.5 passes through the aspherical surface in a telephoto end state A(T4.0): an asphericity at a point on the aspherical surface where light corresponding to F-value of 4.0 passes through the aspherical surface in the telephoto end state.

The asphericity refers to an amount of sag, with respect to an approximately spherical surface, in the aspherical surface along the optical axis.

Conditional Expression (4) is a Conditional Expression for defining an appropriate value of the asphericity of the aspherical surface closest to an image, of the 32nd lens group G32. When Conditional Expression (4) is satisfied, it is possible to satisfactorily correct one-sided blur and eccentric coma aberration when the 32nd lens group G32 is moved to perform image blur correction.

When the asphericity ratio exceeds the upper limit value of Conditional Expression (4), the asphericity of the 32nd lens group G32 becomes too large and it is difficult to correct one-sided blur and eccentric coma aberration when the 32nd lens group G32 is moved to perform image blur correction.

In order to obtain the effect reliably, it is preferable that the upper limit value of Conditional Expression (4) is set to 4.000. In order to obtain the effect more reliably, it is preferable that the upper limit value of Conditional Expression (4) be set to 3.000.

When the asphericity ratio is smaller than the lower limit value of Conditional Expression (4), the asphericity of the 32nd lens group G32 is insufficient and it is difficult to correct one-sided blur and eccentric coma aberration when the 32nd lens group G32 is moved to perform image blur correction.

In order to obtain the effect reliably, it is preferable that the lower limit value of Conditional Expression (4) be set to 1.250. In order to obtain the effect more reliably, it is preferable that the lower limit value of Conditional Expression (4) be set to 1.400.

In this way, it is possible to implement the variable magnification optical system ZL which has a wide angle of view and in which various aberrations are corrected satisfactorily.

Figure 53:
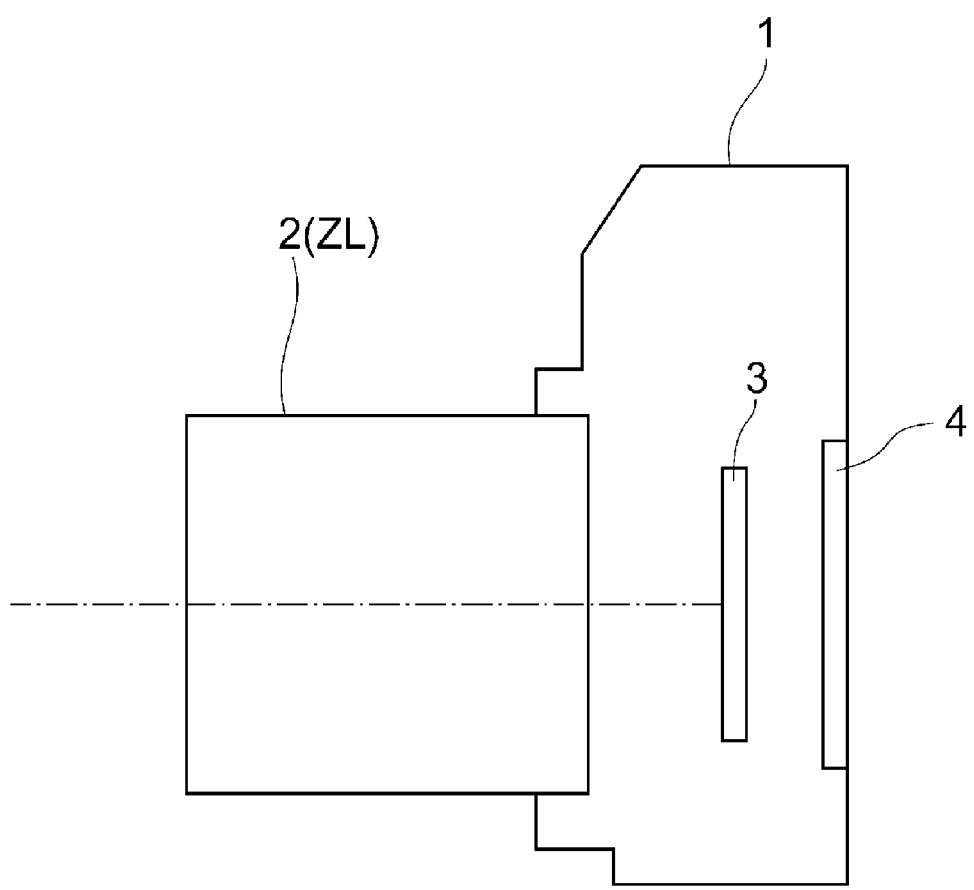
FIG. 53 is a diagram illustrating an example of a configuration of a camera having a variable magnification optical system mounted thereon.

Next, a camera (an optical apparatus) having the above-described variable magnification optical system ZL will be described with reference to the drawings. FIG. 53 illustrates an example of a configuration of a camera having a variable magnification optical system mounted thereon.

As illustrated in FIG. 53, a camera 1 is an interchangeable lens camera (a so-called mirrorless camera) having the above-described variable magnification optical system ZL as an image capturing lens 2. In this camera, light from an object (a subject) which is not illustrated is collected by the image capturing lens 2 and forms a subject image on an image plane of the imaging unit 3 via an optical low-pass filter (OLPF) which is not illustrated. The subject image is photoelectrically converted by a photoelectric conversion element provided in the imaging unit 3, whereby the image of the subject is generated. This image is displayed on an electronic view finder (EVF) 4 provided in the camera 1. In this way, a photographer can observe the subject via the EVF 4. Moreover, when a release button (not illustrated) is pressed by the photographer, the image of the subject generated by the imaging unit 3 is stored in a memory (not illustrated). In this way, the photographer can capture the image of the subject using the camera 1.

As can be understood from respective examples to be described later, the variable magnification optical system ZL mounted on the camera 1 as the image capturing lens 2 has a wide angle of view and has a satisfactory optical performance such that various aberrations are corrected satisfactorily due to its characteristic lens configuration. Therefore, according to the camera 1, it is possible to implement an optical apparatus which has a wide angle of view and has a satisfactory optical performance such that various aberrations are corrected satisfactorily.

Although a mirrorless camera has been described as an example of the camera 1, the camera is not limited to this. For example, the same effect as the camera 1 can be obtained even when the above-described variable magnification optical system ZL is mounted on a single-lens reflex camera which has a quick return mirror on a camera body and views a subject using a finder optical system.

Figure 54:
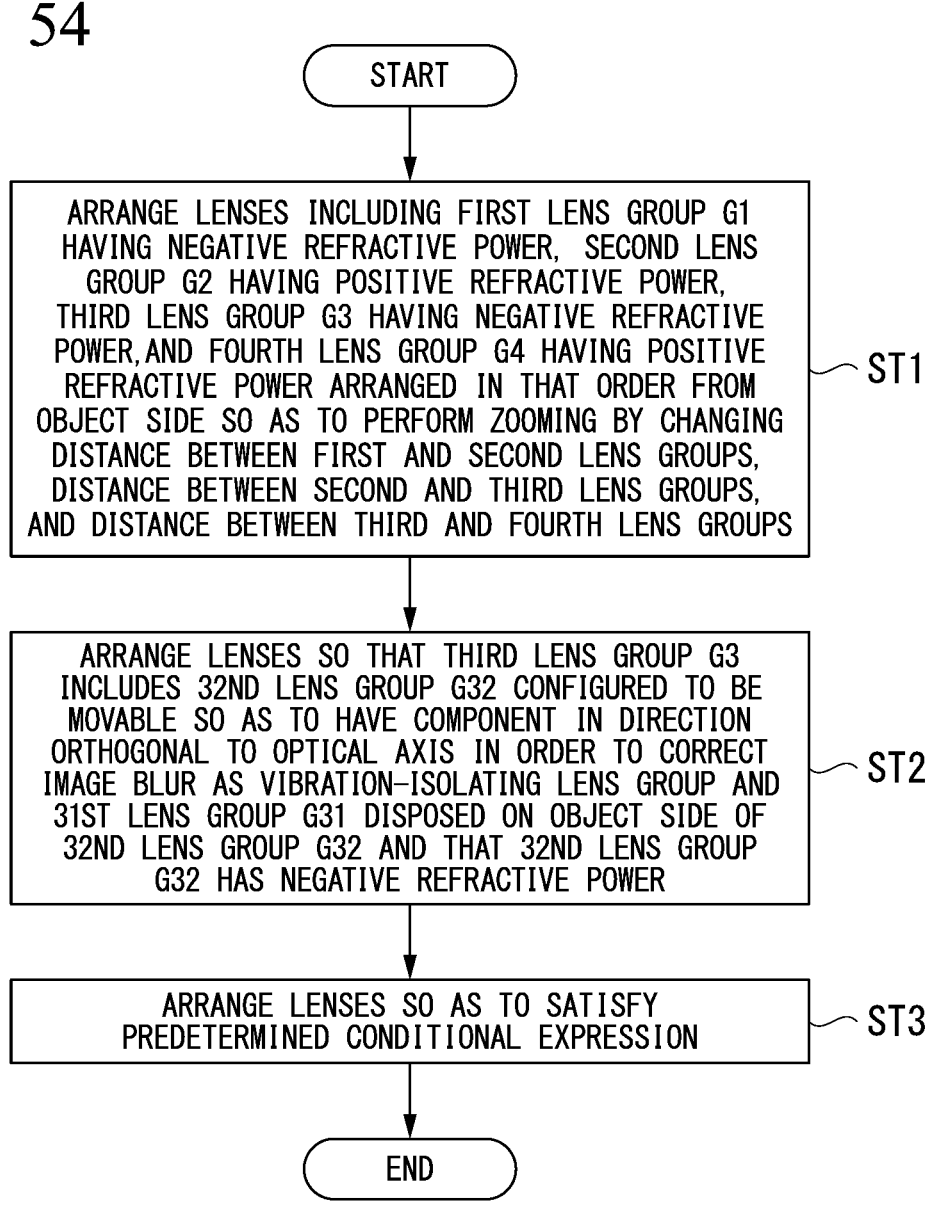
FIG. 54 is a diagram illustrating an outline of an example of a method for manufacturing a variable magnification optical system.
Figure 55:
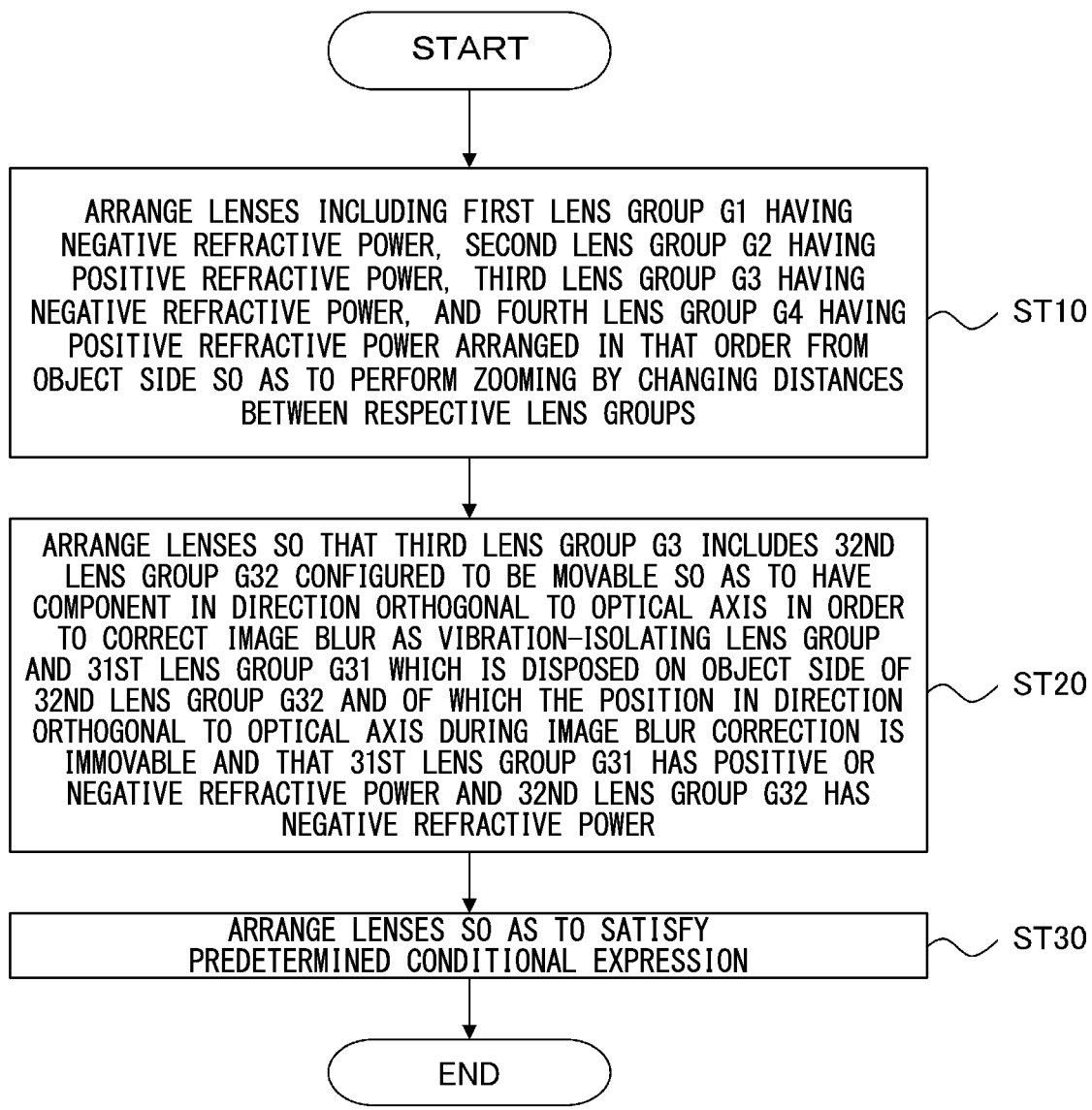
FIG. 55 is a diagram illustrating an outline of an example of a method for manufacturing a variable magnification optical system.

Next, an example of a method for manufacturing the above-described variable magnification optical system ZL will be described. FIGS. 54 and 55 illustrate an example of a method for manufacturing the variable magnification optical system ZL.

In the example illustrated in FIG. 54, first, respective lenses including, in order from an object, a first lens group G1 having a negative refractive power; a second lens group G2 having a positive refractive power; a third lens group G3 having a negative refractive power; and a fourth lens group G4 having a positive refractive power are arranged in a lens barrel such that varying magnification is performed by changing the distance between the first lens group G1 and the second lens group G2, the distance between the second lens group G2 and the third lens group G3, and the distance between the third lens group G3 and the fourth lens group G4 (step ST1). Subsequently, the respective lenses are arranged such that the third lens group G3 includes a 32nd lens group G32 configured to be movable so as to have a component in a direction orthogonal to an optical axis in order to correct image blur as a vibration-reduction lens group (VR) and a 31st lens group G31 disposed close to an object-side of the 32nd lens group G32, and the 32nd lens group G32 has negative refractive power (step ST2). Moreover, the respective lenses are arranged in the lens barrel so as to satisfy Conditional Expression (1) below (step ST3).

$$0.200 < f1/f3 < 0.900 \quad (1)$$

where f1: a focal length of the first lens group f3: a focal length of the third lens group In the example illustrated in FIG. 55, first, respective lenses including, in order from an object, a first lens group G1 having a negative refractive power; a second lens group G2 having a positive refractive power; a third lens group G3 having a negative refractive power; and a fourth lens group G4 having a positive refractive power are arranged in a lens barrel such that varying magnification is performed by changing the distances between the respective lens groups (step ST10). Subsequently, the respective lenses are arranged such that the third lens group G3 includes a 32nd lens group G32 configured to be movable so as to have a component in a direction orthogonal to an optical axis in order to correct image blur as a vibration-reduction lens group (VR) and a 31st lens group G31 which is disposed close to an object-side of the 32nd lens group G32 and of which the position in the direction orthogonal to the optical axis during image blur correction is immovable, the 31st lens group G31 has positive or negative refractive power, and the 32nd lens group G32 has negative refractive power (step ST20). Moreover, the respective lenses are arranged in the lens barrel so as to satisfy Conditional Expression (1) below (step ST30).

$$0.200 < f1/f3 < 0.900 \quad (1)$$

where
f1: a focal length of the first lens group G1
f3: a focal length of the third lens group G3

According to an example of a lens arrangement, as illustrated in FIG. 1, a negative meniscus lens L11 having a concave surface oriented toward an image side, a biconcave lens L12, a biconcave lens L13, and a biconvex lens L14 are arranged, in order from an object, to form the first lens group G1. A biconvex lens L21, a cemented lens including a negative meniscus lens L22 having a concave surface oriented toward the image side and a positive meniscus lens L23 having a convex surface oriented toward the object side and a cemented lens including a biconvex lens L24 and a negative meniscus lens L25 having a concave surface oriented toward the object side are arranged, in order from the object, to form the second lens group G2. A biconcave lens L31, a biconvex lens L32, and a cemented lens including a biconcave lens L33 and a positive meniscus lens L34 having a convex surface oriented toward the object side are arranged, in order from the object, to form the third lens group G3. A biconvex lens L41, a cemented lens including a biconcave lens L42 and a biconcave lens L43, a biconvex lens L44, and a biconcave lens L45 are arranged, in order from the object, to form the fourth lens group G4. Moreover, in the third lens group G3, the lenses ranging from the biconcave lens L31 to the biconvex lens L32 form the 31st lens group G31 and the cemented lens including the biconcave lens L33 and the positive meniscus lens L34 having the convex surface oriented toward the object side forms the 32nd lens group G32 (the vibration-reduction lens group (VR)). The respective lens groups prepared in this manner are arranged in the above-described order to manufacture the variable magnification optical system ZL.

According to the above-described manufacturing method, it is possible to manufacture the variable magnification optical system ZL which has a wide angle of view and in which various aberrations are corrected satisfactorily.

EXAMPLES

Hereinafter, respective examples will be described with reference to the drawings.

FIGS. 1, 5, 9, 13, 17, 21, 25, 29, 33, 37, 41, 45, and 49 are cross-sectional views illustrating the configuration and the refractive power allocation of variable magnification optical systems ZL (ZL1 to ZL13) according to respective examples. In the lower part of the cross-sectional views of the variable magnification optical systems ZL1 to ZL13, the moving directions along the optical axis of each lens group upon varying magnification from the wide-angle end state (W) to the telephoto end state (T) via the intermediate focal length state (M) are indicated by arrows. In the upper part of the cross-sectional views of the variable magnification optical systems ZL1 to ZL13, the moving direction of the focusing lens group upon focusing from an object at infinity to an object at a close distance is indicated by an arrow and the state of the vibration-reduction lens group VR when correcting image blur is also illustrated.

Respective reference symbols in FIG. 1 associated with Example 1 are used independently in respective examples in order to avoid complication of description due to an increased number of reference symbol characters. Therefore, even when components in diagrams associated with other examples are denoted by the same reference symbols as used in FIG. 1, these components do not necessarily have the same configuration as those of other examples.

Tables 1 to 13 illustrated below are tables of respective specifications of Examples 1 to 13.

In the respective examples, the d-line (wavelength: 587.562 nm) and the g-line (wavelength: 435.835 nm) are selected as an aberration characteristics calculation target.

In [Lens Specification] in tables, a surface number indicates a sequence number of an optical surface from an object side along a traveling direction of light, R indicates a radius of curvature of each optical surface, D indicates a surface distance which is the distance on the optical axis from each optical surface to the next optical surface (or an image plane), nd indicates a refractive index for the d-line, of a material of an optical member, and vd indicates the Abbe number for the d-line, of a material of an optical member. Moreover, Di indicates a surface distance between an i-th surface and an (i+1)th surface and Aperture stop indicates an aperture stop S. When the optical surface is an aspherical surface, a mark "*" is assigned to the surface number and a paraxial radius of curvature is described in the radius of curvature column R.

In [Aspheric Data] in tables, the shape of an aspherical surface described in [Lens Specification] is expressed by Equation (a) below. X(y) indicates the distance along the optical axis direction from a tangential plane at the vertex of an aspherical surface to a position on the aspherical surface at a height y, R indicates a radius of curvature (a paraxial radius of curvature) of a reference spherical surface, κ indicates a conic constant, and Ai indicates an aspheric coefficient at degree i. "E-n" indicates "×10$^{-n}$". For example, 1.234E−05=1.234×10$^{-5}$. An aspheric coefficient A2 at degree 2 is 0 and is not illustrated.

$$X(y)=(y^2/R)/\{1+(1-\kappa \times y^2/R^2)^{1/2}\}+A4 \times y^4+A6 \times y^6+A8 \times y^8+A10 \times y^{10}+A12 \times y^{12}+A14 \times y^{14}+A16 \times y^{16}+A18 \times y^{18} \quad (a)$$

In [Various Data] in tables, f indicates a focal length of an entire lens system, FNo indicates the F-number, ω indicates a half-angle of view (unit: °), Y indicates the maximum image height, BF indicates the distance (an air-conversion length) from the last lens surface to the image plane I on the optical axis upon focusing on infinity, and TL indicates the sum of BF and the distance from the frontmost lens surface to the last lens surface on the optical axis upon focusing on infinity.

In [Variable Distance Data] in tables, Di indicates a surface distance between an i-th surface and an (i+1)th surface, D0 indicates an axial air distance between an object plane and a lens surface closest to object, of the first lens group G1, f indicates the focal length of an entire lens system, and β indicates an imaging magnification.

In [Lens Group Data] in tables, the starting surface and the focal length are shown.

In [Conditional Expression Correspondence Values] in tables, values corresponding to Conditional Expressions (1) to (4) are illustrated.

Hereinafter, "mm" is generally used as the unit of the focal length f, the radius of curvature R, the surface distance D, and other length and the like described in all specification values unless particularly stated otherwise. However, the unit is not limited to this since an equivalent optical performance is obtained even when the optical system is proportionally expanded or reduced. Moreover, the unit is not limited to "mm" and other appropriate units may be used.

The above description of tables is common to all examples, and description will not be provided below.

Example 1

Example 1 will be described with reference to FIGS. 1 to 4 and Table 1. As illustrated in FIG. 1, a variable magnification optical system ZL (ZL1) according to Example 1 is constituted by, in order from an object, a first lens group G1 having a negative refractive power; a second lens group G2 having a positive refractive power; a third lens group G3 having a negative refractive power; and a fourth lens group G4 having a positive refractive power.

The first lens group G1 is constituted by, in order from an object, a negative meniscus lens L11 having a concave surface oriented toward an image side, a biconcave lens L12, a biconcave lens L13, and a biconvex lens L14. The negative meniscus lens L11 is a glass-molded aspherical lens of which the lens surfaces on both sides are aspherical surfaces. Moreover, the biconcave lens L12 is a glass-molded aspherical lens of which the lens surface on the object side is an aspherical surface.

The second lens group G2 includes, in order from an object, a 21st lens group G21 having a positive refractive power and a 22nd lens group G22 having a positive refractive power. The 21st lens group G21 is constituted by, in order from an object, a biconvex lens L21 and a cemented lens including a negative meniscus lens L22 having a concave surface oriented toward the image side and a positive meniscus lens L23 having a convex surface oriented toward the object side. The 22nd lens group G22 is constituted by, in order from an object, a cemented lens including a biconvex lens L24 and a negative meniscus lens L25 having a concave surface oriented toward the object side.

The third lens group G3 is constituted by, in order from the object, a 31st lens group G31 having a negative refractive power and a 32nd lens group G32 having a negative refractive power. The 31st lens group G31 is constituted by, in order from the object, a biconcave lens L31 and a biconvex lens L32. The 32nd lens group G32 is constituted by, in order from the object, a cemented lens including a biconcave lens L33 and a positive meniscus lens L34 having a convex surface oriented toward the object side. The positive meniscus lens L34 is a glass-molded aspherical lens of which the lens surface on the image side is an aspherical surface.

The fourth lens group G4 is constituted by, in order from the object, a biconvex lens L41, a cemented lens including a biconvex lens L42 and a biconcave lens L43, and a cemented lens including a biconvex lens L44 and a biconcave lens L45. The biconcave lens L45 is a glass-molded aspherical lens of which the lens surface on the image side is an aspherical surface.

An aperture stop S is provided between the second lens group G2 and the third lens group G3, and the aperture stop S forms the third lens group G3.

Varying magnification from the wide-angle end state to the telephoto end state is performed by moving the first lens group G1 toward the image side and then moving the first lens group G1 toward the object side, and moving the second lens group G2, the third lens group G3, and the fourth lens group G4 toward the object side such that the distances between the respective lens groups (the distance between the first and second lens groups G1 and G2, the distance between the second and third lens groups G2 and G3, and the distance between the third and fourth lens groups G4) are changed. The aperture stop S is moved toward the object side integrally with the third lens group G3.

Focusing from infinity to an object at a close distance is performed by moving the 21st lens group G21 toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K. The 31st lens group G31 positioned at an object-side of the 32nd lens group G32 is immovable during image blur correction.

In Example 1, in the wide-angle end state, since the vibration reduction coefficient is −0.73 and the focal length is 16.40 mm, the moving distance of the vibration-reduction lens group VR for correcting the rotation blur of 0.81° is −0.32 mm. In the intermediate focal length state, since the vibration reduction coefficient is −0.85 and the focal length is 23.50 mm, the moving distance of the vibration-reduction lens group VR for correcting the rotation blur of 0.68° is −0.33 mm. In the telephoto end state, since the vibration reduction coefficient is −1.14 and the focal length is 34.00 mm, the moving distance of the vibration-reduction lens group VR for correcting the rotation blur of 0.57° is −0.29 mm.

Table 1 illustrates the values of respective specifications of Example 1. Surface numbers 1 to 32 in Table 1 correspond to optical surfaces of m1 to m32 illustrated in FIG. 1.

TABLE 1

[Lens Specification]

| Surface number | R | D | nd | vd |
|---|---|---|---|---|
| *1 | 141.63094 | 3.000 | 1.76690 | 46.9 |
| *2 | 16.71640 | 12.038 | 1.00000 | |
| *3 | −163.31283 | 1.700 | 1.76690 | 46.9 |
| 4 | 106.92575 | 2.420 | 1.00000 | |
| 5 | −163.11816 | 1.700 | 1.49700 | 81.7 |
| 6 | 54.83939 | 1.200 | 1.00000 | |
| 7 | 48.77184 | 5.134 | 1.75520 | 27.6 |
| 8 | −212.53934 | (D8) | 1.00000 | |
| 9 | 45.70675 | 3.974 | 1.64769 | 33.7 |
| 10 | −288.07145 | 0.100 | 1.00000 | |
| 11 | 48.60693 | 1.000 | 1.84666 | 23.8 |
| 12 | 19.56306 | 4.835 | 1.60342 | 38.0 |
| 13 | 60.48377 | (D13) | 1.00000 | |
| 14 | 50.48320 | 5.971 | 1.49700 | 81.7 |
| 15 | −36.76255 | 1.400 | 1.84666 | 23.8 |
| 16 | −56.36078 | (D16) | 1.00000 | |
| 17 | (Aperture stop) | 3.263 | 1.00000 | |
| 18 | −44.67424 | 1.300 | 1.90366 | 31.3 |
| 19 | 136.86704 | 0.100 | 1.00000 | |
| 20 | 78.75412 | 3.763 | 1.84666 | 23.8 |
| 21 | −61.79495 | 2.000 | 1.00000 | |
| 22 | −66.55193 | 1.300 | 1.80400 | 46.6 |
| 23 | 33.85946 | 3.577 | 1.80518 | 25.4 |
| *24 | 166.11512 | (D24) | 1.00000 | |
| 25 | 32.35576 | 7.398 | 1.49700 | 81.7 |
| 26 | −47.64507 | 0.100 | 1.00000 | |
| 27 | 44.76173 | 8.068 | 1.49700 | 81.7 |
| 28 | −28.00000 | 1.500 | 1.74950 | 35.2 |
| 29 | 112.87980 | 0.500 | 1.00000 | |
| 30 | 62.06564 | 6.433 | 1.49700 | 81.7 |
| 31 | −60.00000 | 2.000 | 1.80610 | 41.0 |
| *32 | 1756.27000 | (D32) | 1.00000 | |

[Aspheric Data]

| Surface | κ | A4 | A6 | A8 | A10 |
|---|---|---|---|---|---|
| 1 | 1.00000e+00 | 2.39893e−06 | −3.02265e−09 | −3.98490e−12 | 7.49728e−15 |
| 2 | 0.00000e+00 | 1.03248e−05 | −2.60887e−09 | 1.01418e−10 | −3.52377e−13 |
| 3 | 1.00000e+00 | −2.78891e−06 | 8.09697e−10 | 3.72105e−11 | −1.98773e−13 |
| 24 | 1.00000e+00 | −1.69763e−06 | −2.10001e−10 | 9.14225e−12 | −1.74272e−14 |
| 32 | 1.00000e+00 | 1.63396e−05 | 8.55710e−09 | 1.48907e−11 | 9.87697e−15 |

[Various Data]

| | W | M | T |
|---|---|---|---|
| f | 16.40 | 23.50 | 34.00 |
| FNo | 2.84 | 2.89 | 2.90 |
| ω | 53.9 | 40.5 | 30.1 |
| Y | 20.00 | 20.00 | 20.00 |
| TL | 159.619 | 155.850 | 159.619 |
| BF | 27.560 | 34.986 | 50.202 |

[Variable Distance Data]

| | Focusing on infinity | | | Focusing on close point | | |
|---|---|---|---|---|---|---|
| | W | M | T | W | M | T |
| D0 | ∞ | ∞ | ∞ | 334.20 | 337.97 | 334.20 |
| β | — | — | — | −0.0459 | −0.0653 | −0.0958 |
| f | 16.40 | 23.50 | 34.00 | — | — | — |
| D8 | 25.600 | 11.753 | 2.000 | 27.098 | 13.374 | 3.831 |
| D13 | 5.686 | 5.686 | 5.686 | 4.188 | 4.065 | 3.855 |
| D16 | 3.000 | 11.057 | 14.758 | 3.000 | 11.057 | 14.758 |
| D24 | 12.000 | 6.595 | 1.200 | 12.000 | 6.595 | 1.200 |
| D32 | 27.560 | 34.986 | 50.202 | 27.571 | 35.009 | 50.252 |

[Lens Group Data]

| Lens group | Starting surface | Focal length |
|---|---|---|
| 1st lens group | 1 | −23.08 |
| 2nd lens group | 9 | 40.97 |

TABLE 1-continued

| | | |
|---|---|---|
| 21st lens group | 9 | 79.53 |
| 22nd lens group | 14 | 66.09 |
| 3rd lens group | 17 | −51.06 |
| 31st lens group | 17 | −617.47 |
| 32nd lens group | 22 | −58.65 |
| 4th lens group | 25 | 37.98 |

[Conditional Expression Conditional Expression Correspondence Values]

| | |
|---|---|
| Conditional Expression (1) | f1/f3 = 0.452 |
| Conditional Expression (2) | f32/f3 = 1.149 |
| Conditional Expression (3) | f4/f2 = 0.927 |
| Conditional Expression (4) | A(T3.5)/A(T4.0) = 1.740 |

It can be understood from Table 1 that the variable magnification optical system ZL1 according to Example 1 satisfies Conditional Expressions (1) to (4).

Figure 2:
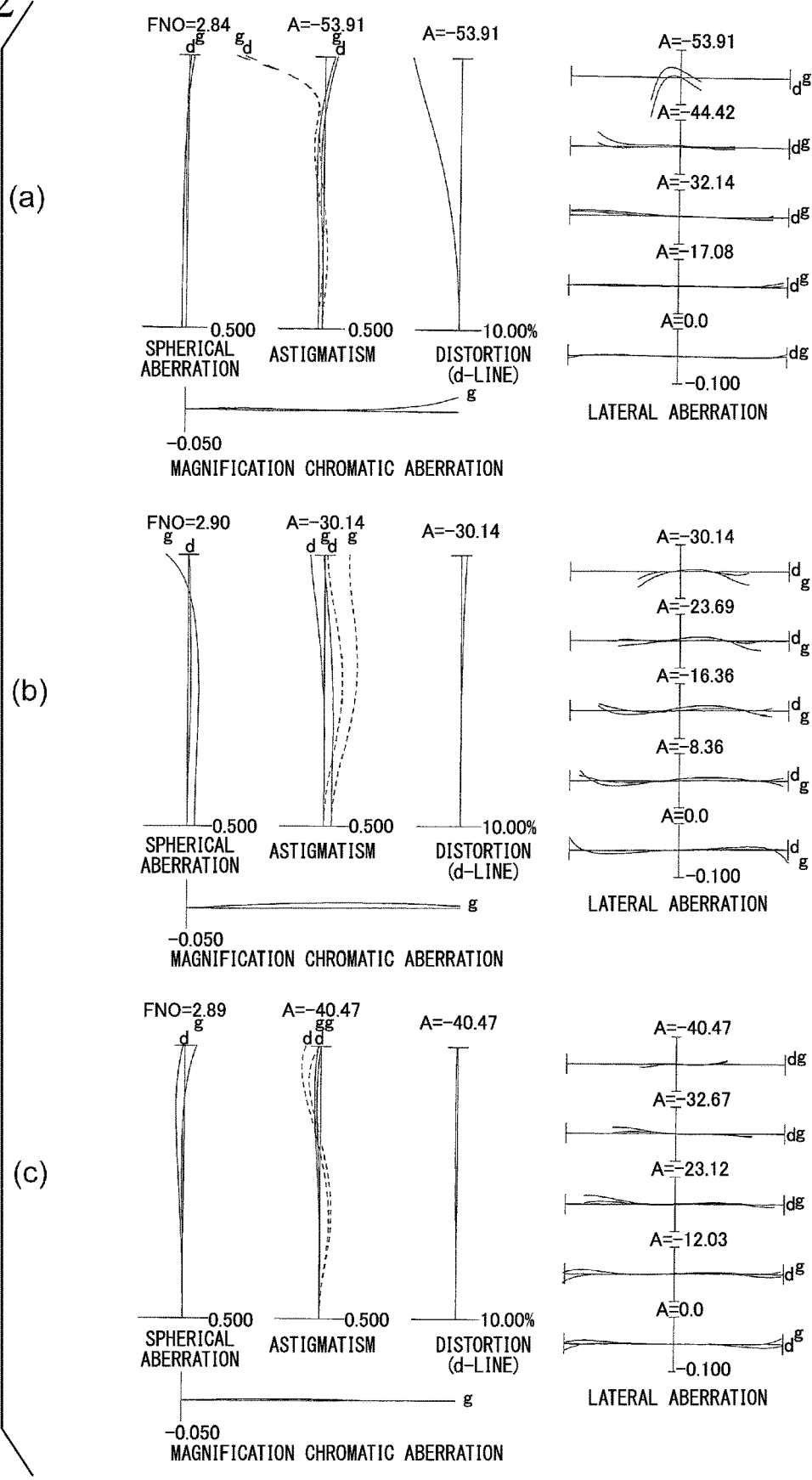
FIG. 2 shows graphs illustrating various aberrations of the variable magnification optical system according to Example 1 upon focusing on infinity, wherein parts (a), (b), and (c) are in the wide-angle end state, the intermediate focal length state, and the telephoto end state, respectively.
Figure 3:
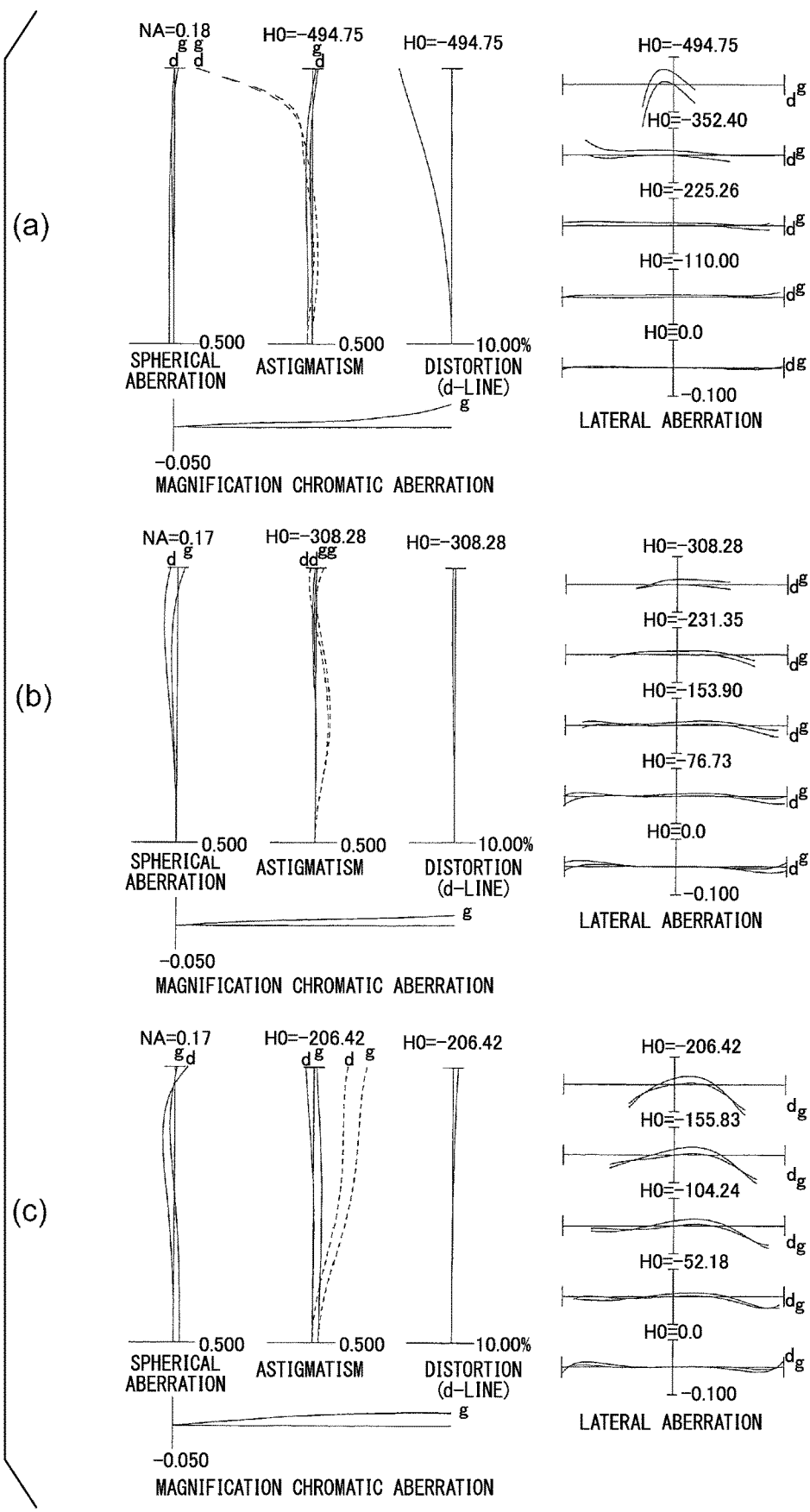
FIG. 3 shows graphs illustrating various aberrations of the variable magnification optical system according to Example 1 upon focusing on a close point, wherein parts (a), (b), and (c) are in the wide-angle end state, the intermediate focal length state, and the telephoto end state, respectively.
Figure 4:
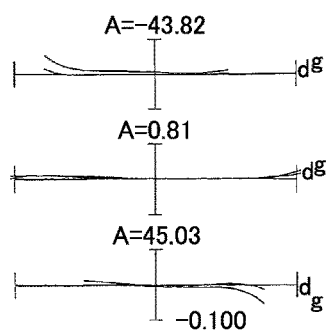
FIG. 4 shows graphs illustrating lateral aberrations of the variable magnification optical system according to Example 1 after image blur correction was performed upon focusing on infinity, wherein parts (a), (b), and (c) are in the wide-angle end state, the intermediate focal length state, and the telephoto end state, respectively.
Figure 4:
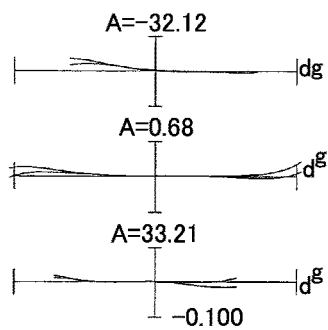
Figure 4:
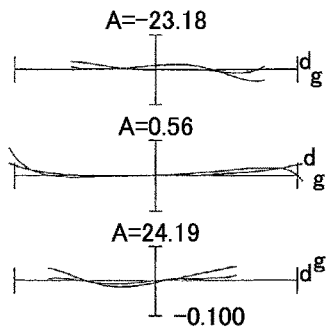

FIG. 2 shows graphs illustrating various aberrations (spherical aberration, astigmatism, distortion, magnification chromatic aberration (lateral chromatic aberration), and lateral aberration) upon focusing on infinity, of the variable magnification optical system ZL1 according to Example 1, in which part (a) illustrates the wide-angle end state, part (b) illustrates the intermediate focal length state, and part (c) illustrates the telephoto end state. FIG. 3 shows graphs illustrating various aberrations (spherical aberration, astigmatism, distortion, magnification chromatic aberration, and lateral aberration) upon focusing on a close point, of the variable magnification optical system ZL1 according to Example 1, in which part (a) illustrates the wide-angle end state, part (b) illustrates the intermediate focal length state, and part (c) illustrates the telephoto end state. FIG. 4 shows graphs illustrating lateral aberration of the variable magnification optical system ZL1 according to Example 1 when image blur correction is performed upon focusing on infinity, in which part (a) illustrates the wide-angle end state, part (b) illustrates the intermediate focal length state, and part (c) illustrates the telephoto end state.

In the graphs illustrating respective aberrations, FNO indicates the F-number, NA indicates a numerical aperture, A indicates a half-angle of view (unit: °) at each image height, and HO indicates an object height. d indicates aberration at the d-line and g indicates aberration at the g-line. Moreover, aberrations without these characters indicate aberrations at the d-line. In the graphs illustrating the spherical aberration upon focusing on infinity, the F-number values corresponding to the maximum aperture are illustrated. In the graphs illustrating the spherical aberration upon focusing on a close point, the numerical aperture values corresponding to the maximum aperture are illustrated. In the graphs illustrating the astigmatism, a solid line indicates the sagittal image plane and a broken line indicates the meridional image plane.

The same reference symbols as in this example are used in the aberration graphs of respective examples to be described later.

It can be understood from FIGS. 2 to 4 that the variable magnification optical system ZL1 according to Example 1 has a satisfactory optical performance such that various aberrations are satisfactorily corrected in states ranging from the wide-angle end state to the telephoto end state and from the focusing-on-infinity state to the focusing-on-close-point state. Moreover, it can be understood that the variable magnification optical system ZL1 has an excellent imaging performance upon image blur correction.

Example 2

Figure 5:
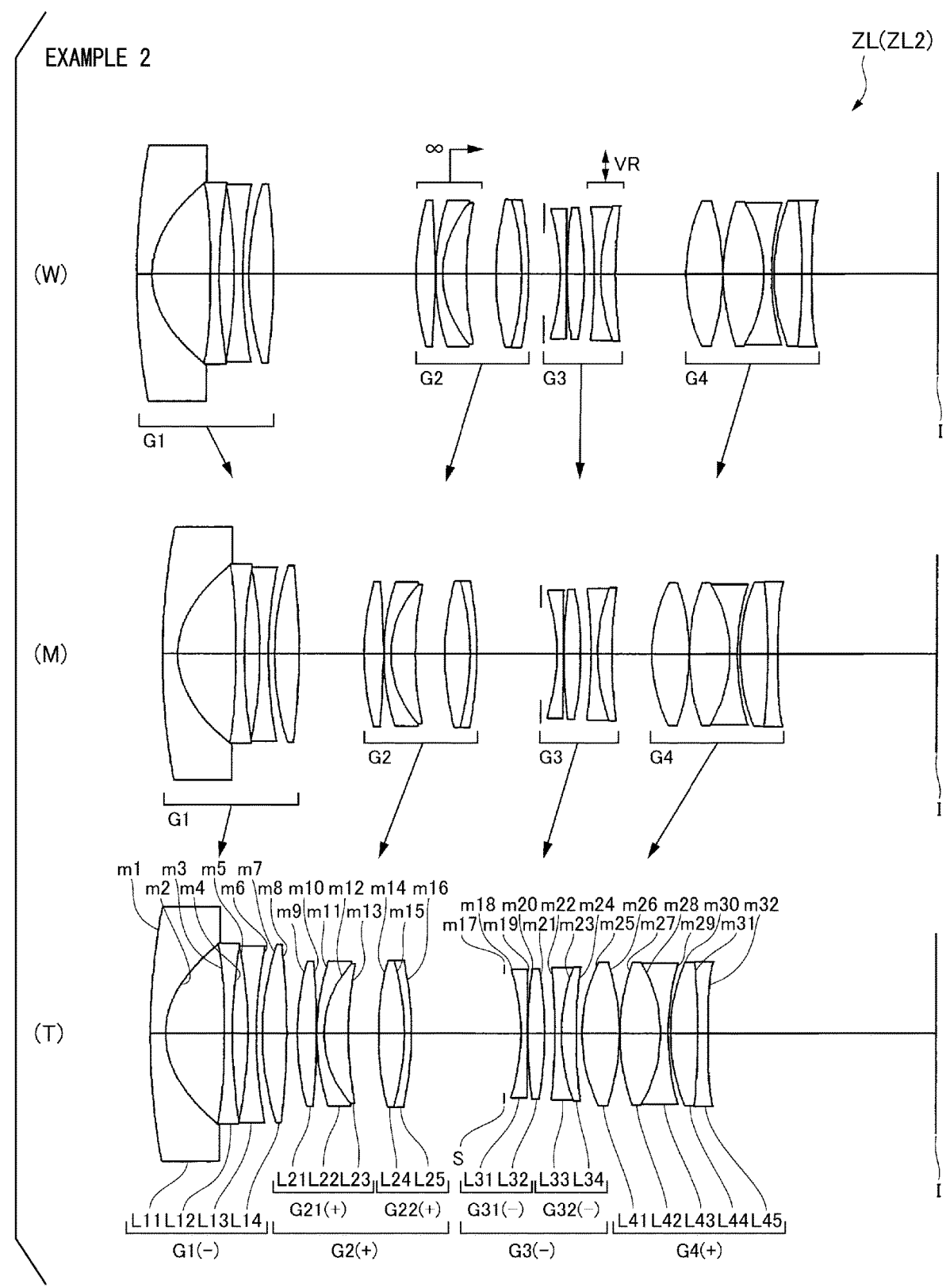
FIG. 5 is a cross-sectional view of a variable magnification optical system according to Example 2, wherein parts (W), (M), and (T) are in a wide-angle end state, an intermediate focal length state, and a telephoto end state, respectively.

Example 2 will be described with reference to FIGS. 5 to 8 and Table 2. As illustrated in FIG. 5, a variable magnification optical system ZL (ZL2) according to Example 2 is constituted by, in order from an object, a first lens group G1 having a negative refractive power; a second lens group G2 having a positive refractive power; a third lens group G3 having a negative refractive power; and a fourth lens group G4 having a positive refractive power.

The first lens group G1 is constituted by, in order from the object, a negative meniscus lens L11 having a concave surface oriented toward an image side, a biconcave lens L12, a biconcave lens L13, and a biconvex lens L14. The negative meniscus lens L11 is a glass-molded aspherical lens of which the lens surfaces on both sides are aspherical surfaces. Moreover, the biconcave lens L12 is a glass-molded aspherical lens of which the lens surface on the object side is an aspherical surface.

The second lens group G2 is constituted by, in order from the object, a 21st lens group G21 having a positive refractive power and a 22nd lens group G22 having a positive refractive power. The 21st lens group G21 is constituted by, in order from the object, a biconvex lens L21 and a cemented lens including a negative meniscus lens L22 having a concave surface oriented toward the image side and a positive meniscus lens L23 having a convex surface oriented toward the object side. The 22nd lens group G22 is constituted by, in order from the object, a cemented lens including a biconvex lens L24 and a negative meniscus lens L25 having a concave surface oriented toward the object side.

The third lens group G3 is constituted by, in order from the object, a 31st lens group G31 having a negative refractive power and a 32nd lens group G32 having a negative refractive power. The 31st lens group G31 is constituted by, in order from the object, a negative meniscus lens L31 having a concave surface oriented toward the object side and a biconvex lens L32. The 32nd lens group G32 is constituted by, in order from the object, a cemented lens including a biconcave lens L33 and a positive meniscus lens L34 having a convex surface oriented toward the object side. The positive meniscus lens L34 is a glass-molded aspherical lens of which the lens surface on the image side is an aspherical surface.

The fourth lens group G4 is constituted by, in order from the object, a biconvex lens L41, a cemented lens including a biconvex lens L42 and a biconcave lens L43, and a cemented lens including a biconvex lens L44 and a biconcave lens L45. The biconvex lens L45 is a glass-molded aspherical lens of which the lens surface on the image side is an aspherical surface.

An aperture stop S is provided between the second lens group G2 and the third lens group G3, and the aperture stop S forms the third lens group G3.

Varying magnification from the wide-angle end state to the telephoto end state is performed by moving the first lens group G1 toward the image side and then moving the first lens group G1 toward the object side, and moving the second lens group G2, the third lens group G3, and the fourth lens group G4 toward the object side such that the distances between the respective lens groups (the distance between the first and second lens groups G1 and G2, the distance between the second and third lens groups G2 and G3, and the distance between the third and fourth lens groups G4) are changed. The aperture stop S is moved toward the object side integrally with the third lens group G3.

Focusing from infinity to an object at a close distance is performed by moving the 21st lens group G21 toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K. The 31st lens group G31 positioned at an object-side of the 32nd lens group G32 is immovable during image blur correction.

In Example 2, in the wide-angle end state, since the vibration reduction coefficient is −0.64 and the focal length is 16.40 mm, the moving distance of the vibration-reduction lens group VR for correcting the rotation blur of 0.81° is −0.36 mm. In the intermediate focal length state, since the vibration reduction coefficient is −0.72 and the focal length is 23.50 mm, the moving distance of the vibration-reduction lens group VR for correcting the rotation blur of 0.68° is −0.39 mm. In the telephoto end state, since the vibration reduction coefficient is −0.95 and the focal length is 34.00 mm, the moving distance of the vibration-reduction lens group VR for correcting the rotation blur of 0.57° is −0.35 mm.

Table 2 illustrates the values of respective specifications of Example 2. Surface numbers 1 to 32 in Table 2 correspond to optical surfaces of m1 to m32 illustrated in FIG. 5.

TABLE 2

[Lens Specification]

| Surface number | R | D | nd | vd |
|---|---|---|---|---|
| *1 | 150.10753 | 3.000 | 1.76690 | 46.9 |
| *2 | 16.71640 | 11.635 | 1.00000 | |
| *3 | −200.00000 | 1.700 | 1.76690 | 46.9 |
| 4 | 110.26615 | 3.043 | 1.00000 | |
| 5 | −91.18897 | 1.700 | 1.49700 | 81.7 |
| 6 | 92.62695 | 1.200 | 1.00000 | |
| 7 | 59.51795 | 4.893 | 1.75520 | 27.6 |
| 8 | −144.55653 | (D8) | 1.00000 | |
| 9 | 54.17771 | 3.853 | 1.57957 | 53.7 |
| 10 | −168.15683 | 0.100 | 1.00000 | |
| 11 | 48.15476 | 1.400 | 1.84666 | 23.8 |
| 12 | 20.82567 | 4.835 | 1.60342 | 38.0 |
| 13 | 71.98010 | (D13) | 1.00000 | |
| 14 | 58.01895 | 5.140 | 1.51680 | 63.9 |
| 15 | −52.48261 | 1.400 | 1.84666 | 23.8 |
| 16 | −74.41904 | (D16) | 1.00000 | |
| 17 | (Aperture stop) | 3.263 | 1.00000 | |
| 18 | −43.11863 | 1.300 | 1.90265 | 35.7 |
| 19 | −3362.00370 | 0.100 | 1.00000 | |
| 20 | 104.17981 | 3.392 | 1.84666 | 23.8 |
| 21 | −70.96939 | 2.000 | 1.00000 | |
| 22 | −123.26792 | 1.300 | 1.80400 | 46.6 |
| 23 | 39.25731 | 2.900 | 1.80518 | 25.4 |
| *24 | 97.15002 | (D24) | 1.00000 | |
| 25 | 33.14690 | 7.392 | 1.49700 | 81.7 |
| 26 | −45.99196 | 0.100 | 1.00000 | |
| 27 | 42.33821 | 8.071 | 1.49700 | 81.7 |
| 28 | −28.00000 | 1.500 | 1.80100 | 34.9 |
| 29 | 51.31589 | 0.526 | 1.00000 | |
| 30 | 39.34858 | 5.507 | 1.49700 | 81.7 |
| 31 | −147.88723 | 2.000 | 1.80610 | 41.0 |
| *32 | 527.01174 | (D32) | 1.00000 | |

[Aspheric Data]

| Surface | κ | A4 | A6 | A8 | A10 |
|---|---|---|---|---|---|
| 1 | 1.00000e+00 | 1.26673e−06 | −8.06378e−10 | −5.17432e−12 | 6.92202e−15 |
| 2 | 0.00000e+00 | 7.39970e−06 | −1.69408e−09 | 8.62137e−11 | −2.76050e−13 |
| 3 | 1.00000e+00 | −3.24223e−06 | −1.82950e−09 | 4.19496e−11 | −1.68279e−13 |

TABLE 2-continued

| 24 | 1.00000e+00 | −1.72282e−06 | −2.38905e−09 | 2.61824e−11 | −6.18766e−14 |
| 32 | 1.00000e+00 | 1.58498e−05 | 1.18507e−08 | −1.55976e−11 | 3.21472e−14 |

[Various Data]

|  | W | M | T |
|---|---|---|---|
| f | 16.40 | 23.50 | 34.00 |
| FNo | 2.86 | 2.79 | 2.81 |
| ω | 53.8 | 40.1 | 29.9 |
| Y | 20.00 | 20.00 | 20.00 |
| TL | 159.618 | 154.244 | 156.368 |
| BF | 25.145 | 31.652 | 45.295 |

[Variable Distance Data]

|  | Focusing on infinity | | | Focusing on close point | | |
|---|---|---|---|---|---|---|
|  | W | M | T | W | M | T |
| D0 | ∞ | ∞ | ∞ | 340.38 | 345.76 | 343.63 |
| β | — | — | — | −0.0449 | −0.0637 | −0.0931 |
| f | 16.40 | 23.50 | 34.00 | — | — | — |
| D8 | 28.281 | 12.865 | 2.000 | 29.898 | 14.571 | 3.902 |
| D13 | 5.918 | 5.918 | 5.918 | 4.301 | 4.212 | 4.016 |
| D16 | 3.000 | 12.629 | 18.705 | 3.000 | 12.629 | 18.705 |
| D24 | 14.025 | 7.930 | 1.200 | 14.025 | 7.930 | 1.200 |
| D32 | 25.145 | 31.652 | 45.295 | 25.145 | 31.652 | 45.295 |

[Lens Group Data]

| Lens group | Starting surface | Focal length |
|---|---|---|
| 1st lens group | 1 | −24.25 |
| 2nd lens group | 9 | 42.48 |
| 21st lens group | 9 | 79.22 |
| 22nd lens group | 14 | 72.35 |
| 3rd lens group | 17 | −64.54 |
| 31st lens group | 17 | −99999.00 |
| 32nd lens group | 22 | −67.09 |
| 4th lens group | 25 | 42.46 |

[Conditional Expression Correspondence Value]

| Conditional Expression (1) | f1/f3 = 0.376 |
| Conditional Expression (2) | f32/f3 = 1.039 |
| Conditional Expression (3) | f4/f2 = 1.000 |
| Conditional Expression (4) | A(T3.5)/A(T4.0) = 1.755 |

It can be understood from Table 2 that the variable magnification optical system ZL2 according to Example 2 satisfies Conditional Expressions (1) to (4).

Figure 6:
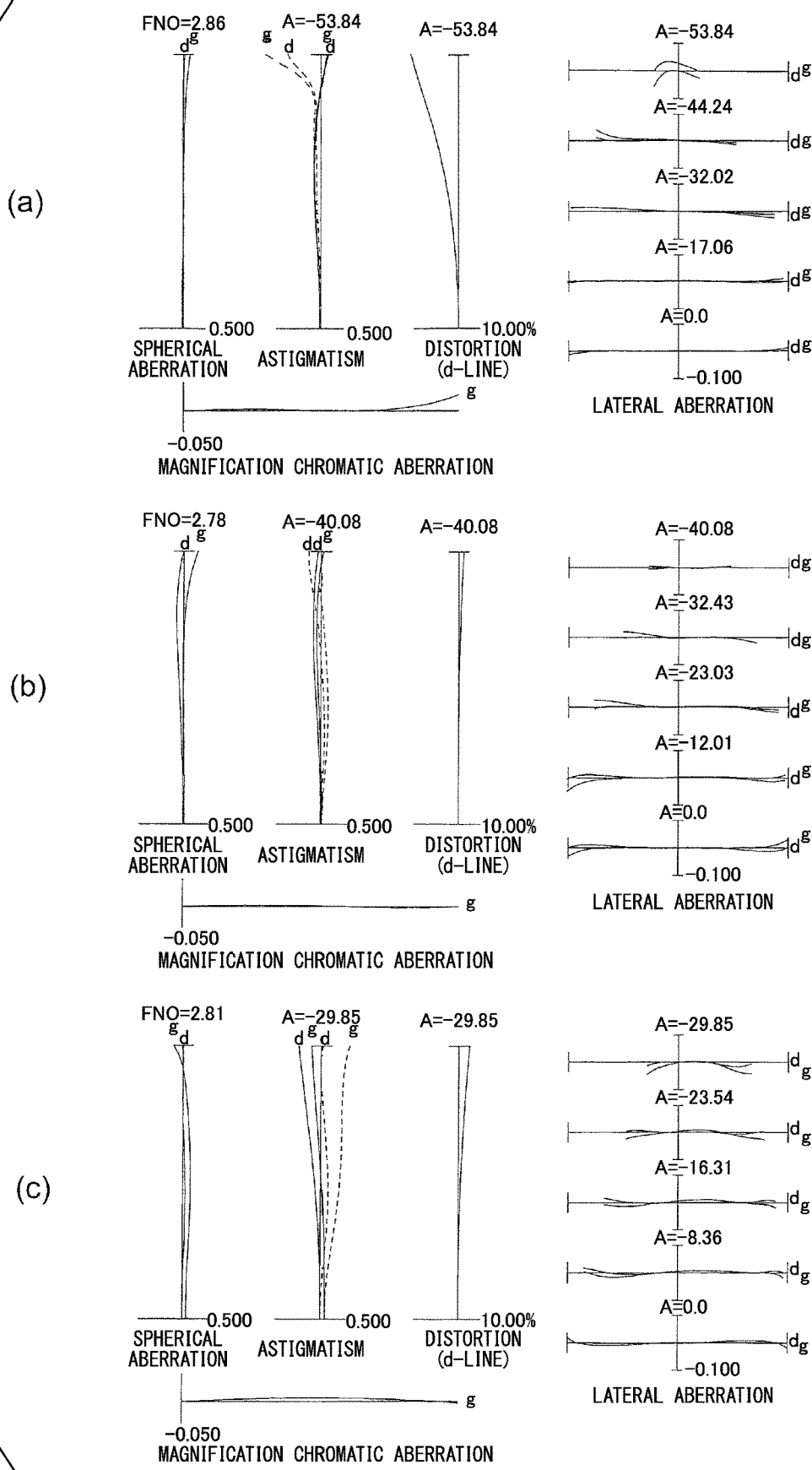
FIG. 6 shows graphs illustrating various aberrations of the variable magnification optical system according to Example 2 upon focusing on infinity, wherein parts (a), (b), and (c) are in the wide-angle end state, the intermediate focal length state, and the telephoto end state, respectively.
Figure 7:
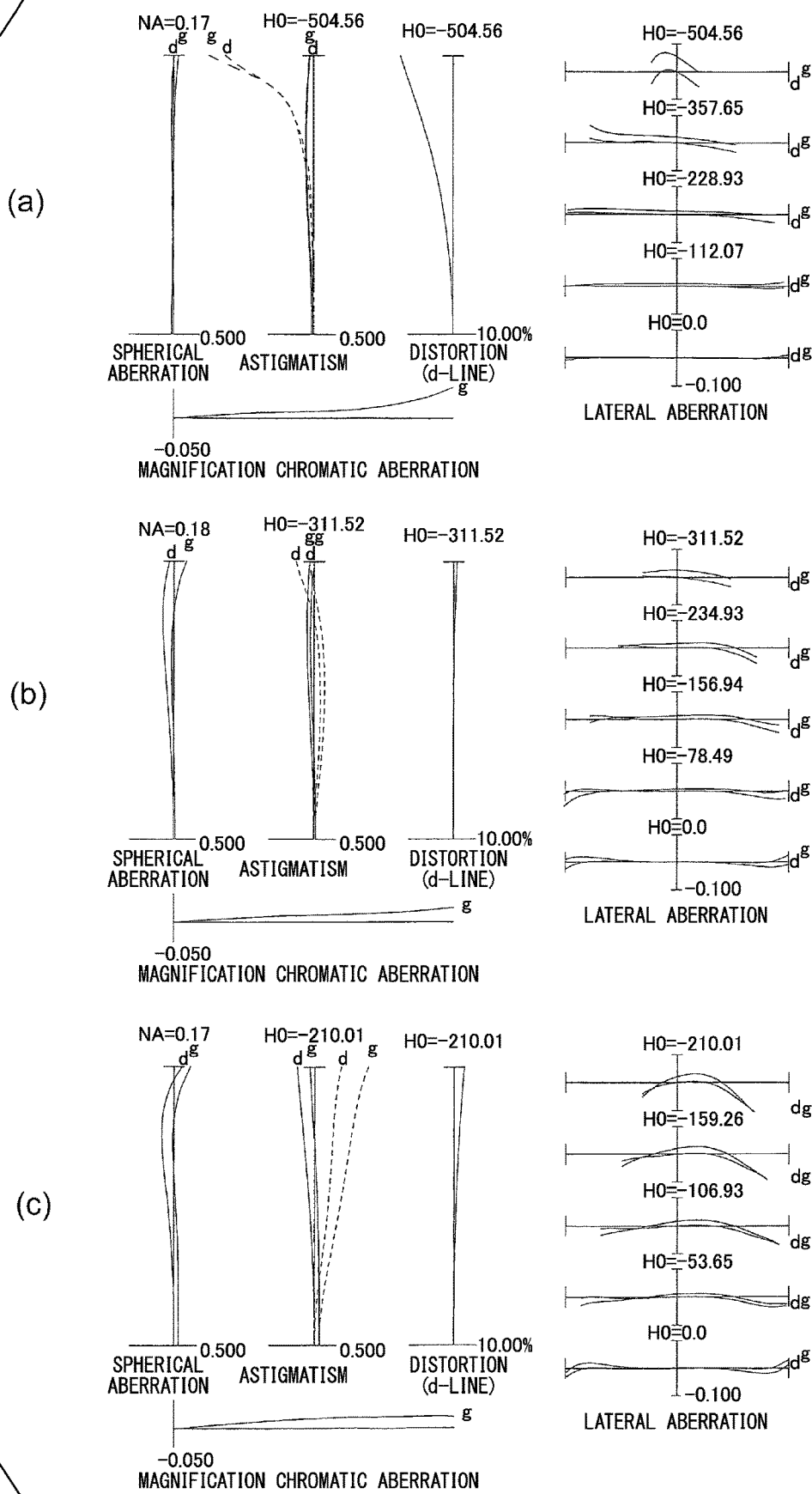
FIG. 7 shows graphs illustrating various aberrations of the variable magnification optical system according to Example 2 upon focusing on a close point, wherein parts (a), (b), and (c) are in the wide-angle end state, the intermediate focal length state, and the telephoto end state, respectively.
Figure 8:
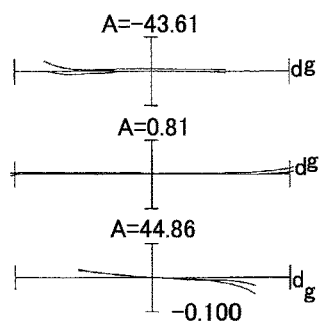
FIG. 8 shows graphs illustrating lateral aberrations of the variable magnification optical system according to Example 2 after image blur correction was performed upon focusing on infinity, wherein parts (a), (b), and (c) are in the wide-angle end state, the intermediate focal length state, and the telephoto end state, respectively.
Figure 8:
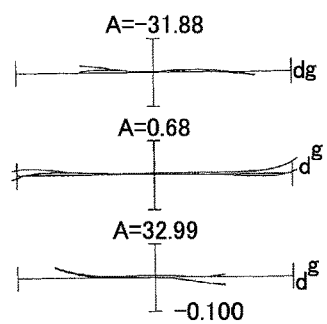
Figure 8:
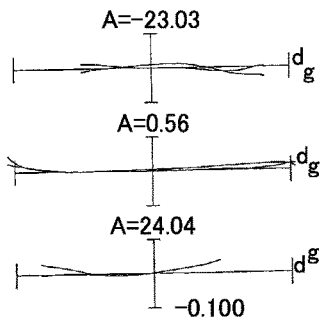

FIG. 6 shows graphs illustrating various aberrations (spherical aberration, astigmatism, distortion, magnification chromatic aberration, and lateral aberration) upon focusing on infinity, of the variable magnification optical system ZL2 according to Example 2, in which part (a) illustrates the wide-angle end state, part (b) illustrates the intermediate focal length state, and part (c) illustrates the telephoto end state. FIG. 7 shows graphs illustrating various aberrations (spherical aberration, astigmatism, distortion, magnification chromatic aberration, and lateral aberration) upon focusing on a close point, of the variable magnification optical system ZL2 according to Example 2, in which part (a) illustrates the wide-angle end state, part (b) illustrates the intermediate focal length state, and part (c) illustrates the telephoto end state. FIG. 8 shows graphs illustrating lateral aberration of the variable magnification optical system ZL2 according to Example 2 when image blur correction is performed upon focusing on infinity, in which part (a) illustrates the wide-angle end state, part (b) illustrates the intermediate focal length state, and part (c) illustrates the telephoto end state.

It can be understood from FIGS. 6 to 8 that the variable magnification optical system ZL2 according to Example 2 has a satisfactory optical performance when various aberrations are satisfactorily corrected in states ranging from the wide-angle end state to the telephoto end state and from the focusing-on-infinity state to the focusing-on-close-point state. Moreover, it can be understood that the variable magnification optical system ZL2 has an excellent imaging performance upon image blur correction.

Example 3

Figure 9:
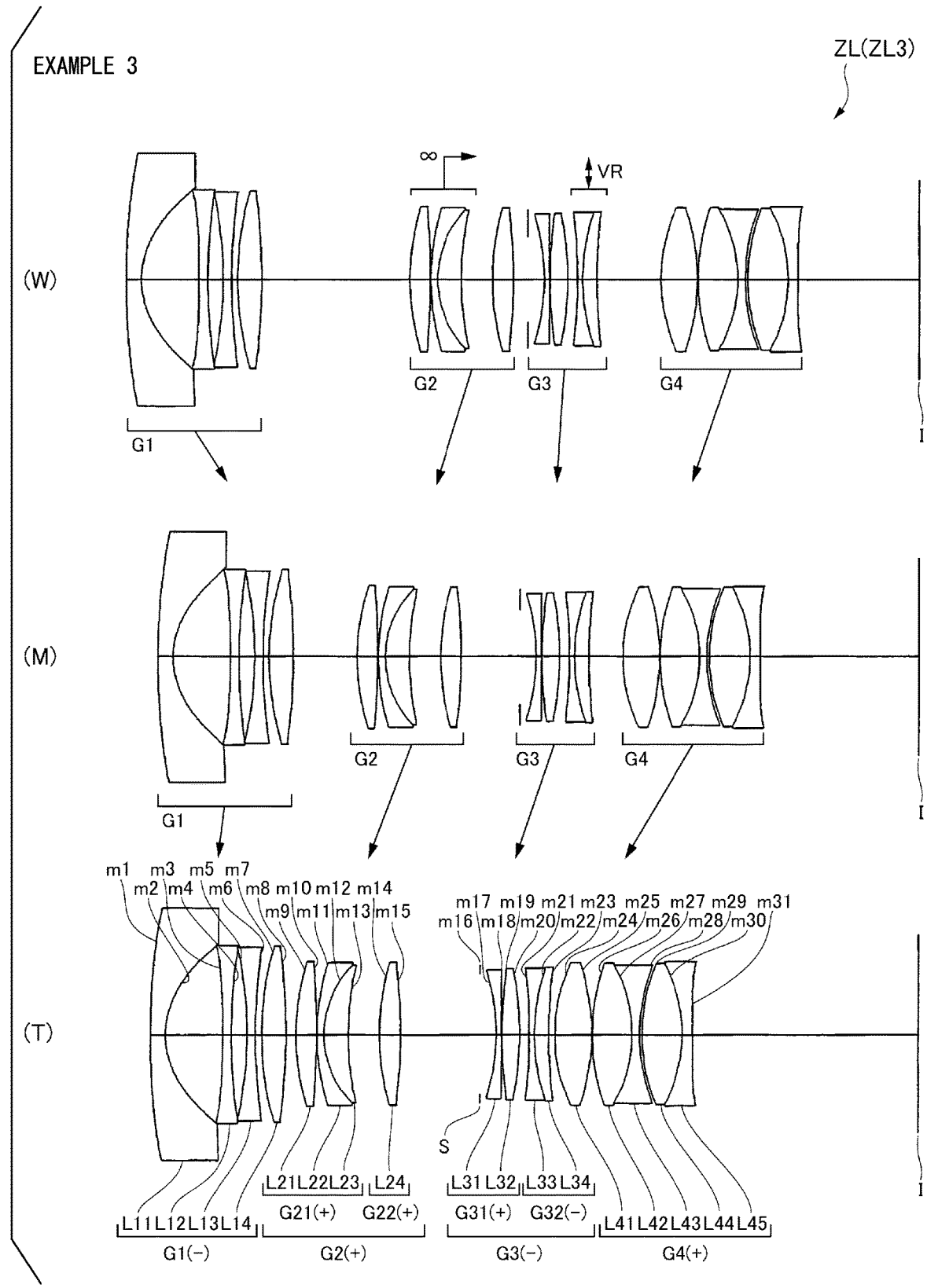
FIG. 9 is a cross-sectional view of a variable magnification optical system according to Example 3, wherein parts (W), (M), and (T) are in a wide-angle end state, an intermediate focal length state, and a telephoto end state, respectively.

Example 3 will be described with reference to FIGS. 9 to 12 and Table 3. As illustrated in FIG. 9, a variable magnification optical system ZL (ZL3) according to Example 3 is constituted by, in order from an object, a first lens group G1 having a negative refractive power; a second lens group G2 having a positive refractive power; a third lens group G3 having a negative refractive power; and a fourth lens group G4 having a positive refractive power.

The first lens group G is constituted by, in order from the object, a negative meniscus lens L11 having a concave surface oriented toward an image side, a biconcave lens L12, a biconcave lens L13, and a biconvex lens L14. The negative meniscus lens L11 is a glass-molded aspherical lens of which the lens surfaces on both sides are aspherical surfaces.

Moreover, the biconcave lens L12 is a glass-molded aspherical lens of which the lens surface on the object side is an aspherical surface.

The second lens group G2 is constituted by, in order from the object, a 21st lens group G21 having a positive refractive power and a 22nd lens group G22 having a positive refractive power. The 21st lens group G21 is constituted by, in order from the object, a biconvex lens L21 and a cemented lens including a negative meniscus lens L22 having a concave surface oriented toward the image side and a positive meniscus lens L23 having a convex surface oriented toward the object side. The 22nd lens group G22 is constituted by a biconvex lens L24.

The third lens group G3 is constituted by, in order from the object, a 31st lens group G31 having a positive refractive power and a 32nd lens group G32 having a negative refractive power. The 31st lens group G31 is constituted by, in order from the object, a negative meniscus lens L31 having a concave surface oriented toward the object side and a biconvex lens L32. The 32nd lens group G32 is constituted by, in order from the object, a cemented lens including a biconcave lens L33 and a positive meniscus lens L34 having a convex surface oriented toward the object side. The positive meniscus lens L34 is a glass-molded aspherical lens of which the lens surface on the image side is an aspherical surface.

The fourth lens group G4 is constituted by, in order from the object, a biconvex lens L41, a cemented lens including a biconvex lens L42 and a biconcave lens L43, and a cemented lens including a biconvex lens L44 and a biconcave lens L45. The biconcave lens L45 is a glass-molded aspherical lens of which the lens surface on the image side is an aspherical surface.

An aperture stop S is provided between the second lens group G2 and the third lens group G3, and the aperture stop S forms the third lens group G3.

Varying magnification from the wide-angle end state to the telephoto end state is performed by moving the first lens group G1 toward the image side) chan and then moving the first lens group G1 toward the object side, and moving the second lens group G2, the third lens group G3, and the fourth lens group G4 toward the object side such that the distances between the respective lens groups (the distance between the first and second lens groups G1 and G2, the distance between the second and third lens groups G2 and G3, and the distance between the third and fourth lens groups G4) are changed. The aperture stop S is moved toward the object side integrally with the third lens group G3.

Focusing from infinity to an object at a close distance is performed by moving the 21st lens group G21 toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K. The 31st lens group G31 positioned at an object-side of the 32nd lens group G32 is immovable during image blur correction.

In Example 3, in the wide-angle end state, since the vibration reduction coefficient is −0.63 and the focal length is 16.40 mm, the moving distance of the vibration-reduction lens group VR for correcting the rotation blur of 0.81° is −0.37 mm. In the intermediate focal length state, since the vibration reduction coefficient is −0.73 and the focal length is 23.95 mm, the moving distance of the vibration-reduction lens group VR for correcting the rotation blur of 0.67° is −0.38 mm. In the telephoto end state, since the vibration reduction coefficient is −0.95 and the focal length is 34.00 mm, the moving distance of the vibration-reduction lens group VR for correcting the rotation blur of 0.57° is −0.35 mm.

Table 3 illustrates the values of respective specifications of Example 3. Surface numbers 1 to 31 in Table 3 correspond to optical surfaces of m1 to m31 illustrated in FIG. 9.

TABLE 3

[Lens Specification]

| Surface number | R | D | nd | vd |
|---|---|---|---|---|
| *1 | 163.30041 | 3.000 | 1.76690 | 46.9 |
| *2 | 16.71640 | 11.632 | 1.00000 | |
| *3 | −200.00000 | 1.722 | 1.76690 | 46.9 |
| 4 | 119.78033 | 3.168 | 1.00000 | |
| 5 | −79.22706 | 1.700 | 1.49700 | 81.7 |
| 6 | 124.43920 | 1.200 | 1.00000 | |
| 7 | 62.39960 | 4.890 | 1.75520 | 27.6 |
| 8 | −133.86420 | (D8) | 1.00000 | |
| 9 | 48.51093 | 4.118 | 1.58313 | 59.4 |
| 10 | −176.87394 | 0.100 | 1.00000 | |
| 11 | 49.08121 | 1.400 | 1.84666 | 23.8 |
| 12 | 19.98762 | 4.835 | 1.60342 | 38.0 |
| 13 | 63.37128 | (D13) | 1.00000 | |
| 14 | 52.68721 | 4.196 | 1.49700 | 81.7 |
| 15 | −113.72899 | (D15) | 1.00000 | |
| 16 | (Aperture stop) | 3.263 | 1.00000 | |
| 17 | −41.35615 | 1.000 | 1.90265 | 35.7 |
| 18 | −2033.84380 | 0.100 | 1.00000 | |
| 19 | 95.41351 | 3.529 | 1.84666 | 23.8 |
| 20 | −68.05697 | 2.000 | 1.00000 | |
| 21 | −115.66704 | 1.000 | 1.80400 | 46.6 |
| 22 | 41.08343 | 2.888 | 1.80518 | 25.4 |
| *23 | 107.26614 | (D23) | 1.00000 | |

TABLE 3-continued

| | | | | |
|---|---|---|---|---|
| 24 | 33.80083 | 7.404 | 1.49700 | 81.7 |
| 25 | −44.75974 | 0.100 | 1.00000 | |
| 26 | 42.35968 | 8.006 | 1.56883 | 56.0 |
| 27 | −28.00000 | 1.500 | 1.90366 | 31.3 |
| 28 | 37.91033 | 0.500 | 1.00000 | |
| 29 | 36.97974 | 8.146 | 1.70000 | 48.1 |
| 30 | −29.64467 | 2.000 | 1.80604 | 40.7 |
| *31 | 60381.93200 | (D31) | 1.00000 | |

[Aspheric Data]

| Surface | κ | A4 | A6 | A8 | A10 |
|---|---|---|---|---|---|
| 1 | 1.00000e+00 | 1.11419e−06 | 2.52394e−10 | −5.86932e−12 | 7.15071e−15 |
| 2 | 0.00000e+00 | 6.59539e−06 | −1.62162e−09 | 8.28640e−11 | −2.56086e−13 |
| 3 | 1.00000e+00 | −3.78859e−06 | −3.13736e−09 | 3.84551e−11 | −1.62364e−13 |
| 23 | 1.00000e+00 | −1.68070e−06 | −2.52180e−09 | 2.06388e−11 | −4.27009e−14 |
| 31 | 1.00000e+00 | 1.51955e−05 | 9.57967e−09 | −1.60225e−13 | −1.30459e−14 |

[Various Data]

| | W | M | T |
|---|---|---|---|
| f | 16.40 | 23.95 | 34.00 |
| FNo | 2.83 | 2.81 | 2.87 |
| ω | 53.8 | 39.6 | 30.0 |
| Y | 20.00 | 20.00 | 20.00 |
| TL | 159.621 | 153.085 | 154.372 |
| BF | 24.417 | 31.945 | 45.425 |

[Variable Distance Data]

| | Focusing on infinity | | | Focusing on close point | | |
|---|---|---|---|---|---|---|
| | W | M | T | W | M | T |
| D0 | ∞ | ∞ | ∞ | 340.38 | 346.92 | 345.63 |
| β | — | — | — | −0.0449 | −0.0647 | −0.0926 |
| f | 16.40 | 23.95 | 34.00 | — | — | — |
| D8 | 29.641 | 12.756 | 2.000 | 31.359 | 14.586 | 4.042 |
| D13 | 6.286 | 6.286 | 6.286 | 4.569 | 4.456 | 4.245 |
| D15 | 3.000 | 11.881 | 16.064 | 3.000 | 11.881 | 16.064 |
| D23 | 12.880 | 6.820 | 1.200 | 12.880 | 6.820 | 1.200 |
| D31 | 24.417 | 31.945 | 45.425 | 24.417 | 31.945 | 45.425 |

[Lens Group Data]

| Lens group | Starting surface | Focal length |
|---|---|---|
| 1st lens group | 1 | −24.96 |
| 2nd lens group | 9 | 43.65 |
| 21st lens group | 9 | 83.13 |
| 22nd lens group | 14 | 73.06 |
| 3rd lens group | 16 | −68.79 |
| 31st lens group | 16 | 1918.75 |
| 32nd lens group | 21 | −68.77 |
| 4th lens group | 24 | 43.59 |

[Conditional Expression Correspondence Value]

| | |
|---|---|
| Conditional Expression (1) | f1/f3 = 0.363 |
| Conditional Expression (2) | f32/f3 = 1.000 |
| Conditional Expression (3) | f4/f2 = 0.999 |
| Conditional Expression (4) | A(T3.5)/A(T4.0) = 1.770 |

It can be understood from Table 3 that the variable magnification optical system ZL3 according to Example 3 satisfies Conditional Expressions (1) to (4).

Figure 10:
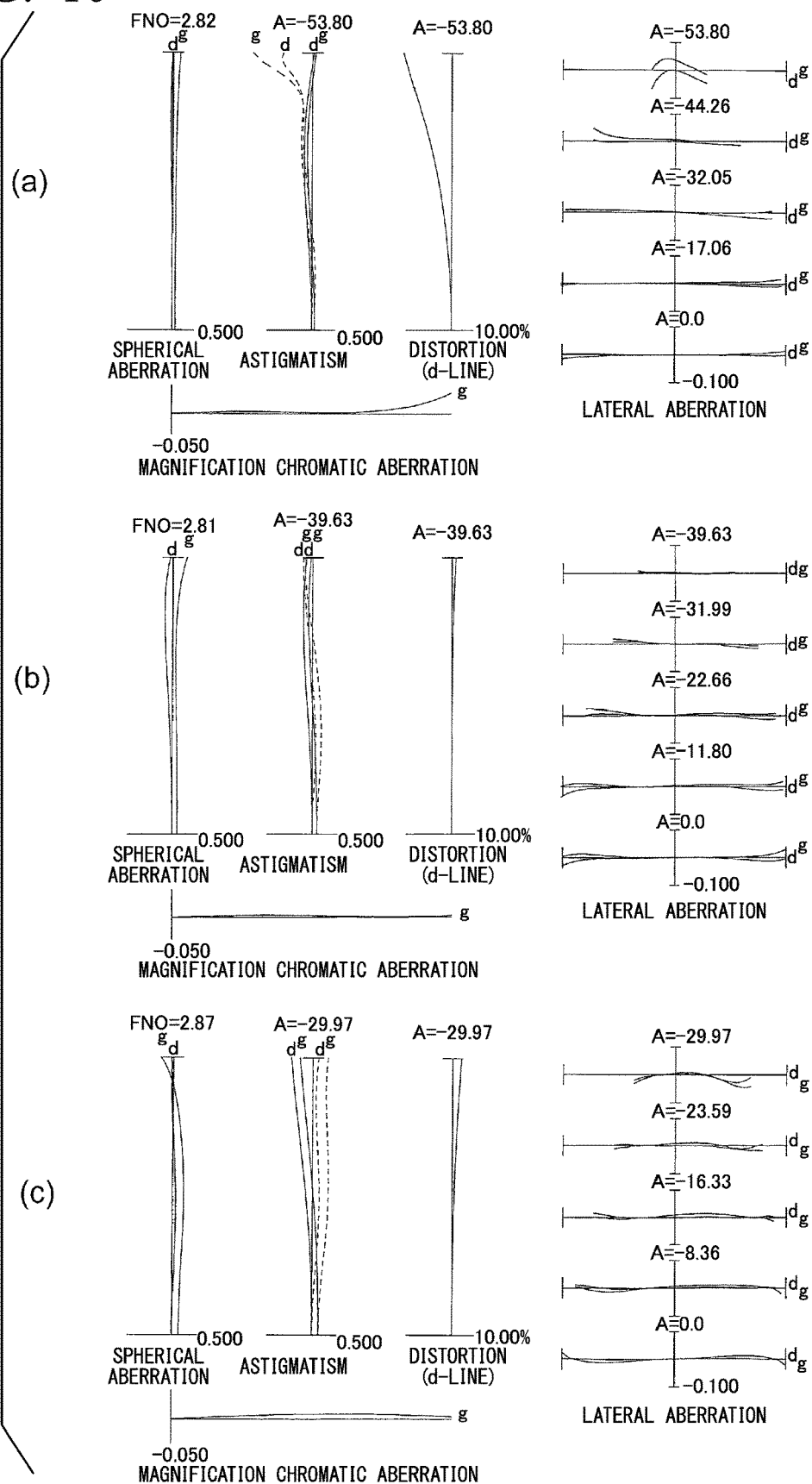
FIG. 10 shows graphs illustrating various aberrations of the variable magnification optical system according to Example 3 upon focusing on infinity, wherein parts (a), (b), and (c) are in the wide-angle end state, the intermediate focal length state, and the telephoto end state, respectively.
Figure 11:
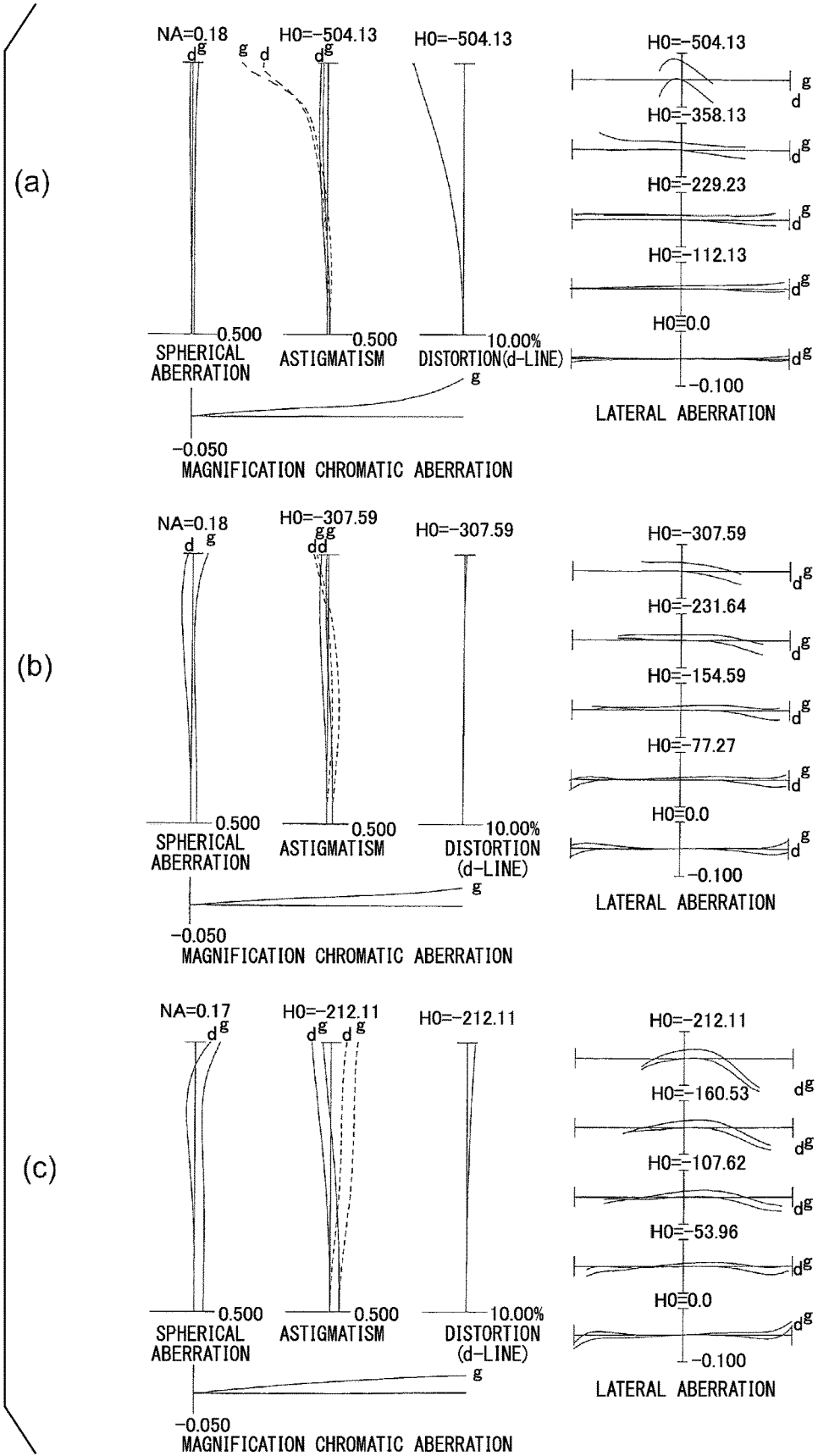
FIG. 11 shows graphs illustrating various aberrations of the variable magnification optical system according to Example 3 upon focusing on a close point, wherein parts (a), (b), and (c) are in the wide-angle end state, the intermediate focal length state, and the telephoto end state, respectively.
Figure 12:
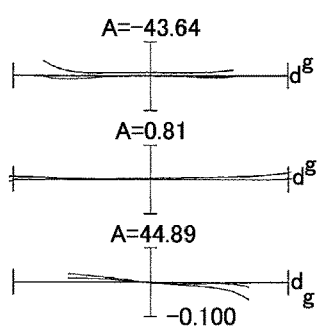
FIG. 12 shows graphs illustrating lateral aberrations of the variable magnification optical system according to Example 3 after image blur correction was performed upon focusing on infinity, wherein parts (a), (b), and (c) are in the wide-angle end state, the intermediate focal length state, and the telephoto end state, respectively.
Figure 12:
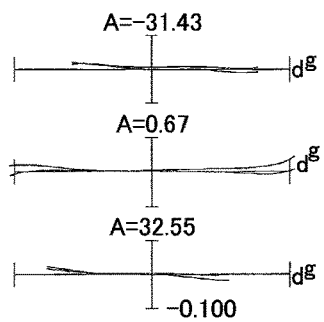
Figure 12:
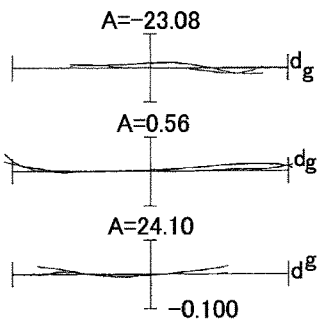

FIG. 10 shows graphs illustrating various aberrations (spherical aberration, astigmatism, distortion, magnification chromatic aberration, and lateral aberration) upon focusing on infinity, of the variable magnification optical system ZL3 according to Example 3, in which part (a) illustrates the wide-angle end state, part (b) illustrates the intermediate focal length state, and part (c) illustrates the telephoto end state. FIG. 11 shows graphs illustrating various aberrations (spherical aberration, astigmatism, distortion, magnification chromatic aberration, and lateral aberration) upon focusing on a close point, of the variable magnification optical system ZL3 according to Example 3, in which part (a) illustrates the wide-angle end state, part (b) illustrates the intermediate focal length state, and part (c) illustrates the telephoto end state. FIG. 12 shows graphs illustrating lateral aberration of the variable magnification optical system ZL3 according to Example 3 when image blur correction is performed upon focusing on infinity, in which part (a) illustrates the wide-angle end state, part (b) illustrates the intermediate focal length state, and part (c) illustrates the telephoto end state.

It can be understood from FIGS. 10 to 12 that the variable magnification optical system ZL3 according to Example 3 has a satisfactory optical performance such that aberrations are satisfactorily corrected in states ranging from the wide-angle end state to the telephoto end state and from the focusing-on-infinity state to the focusing-on-close-point state. Moreover, it can be understood that the variable magnification optical system ZL3 has an excellent imaging performance upon image blur correction.

Example 4

Figure 13:
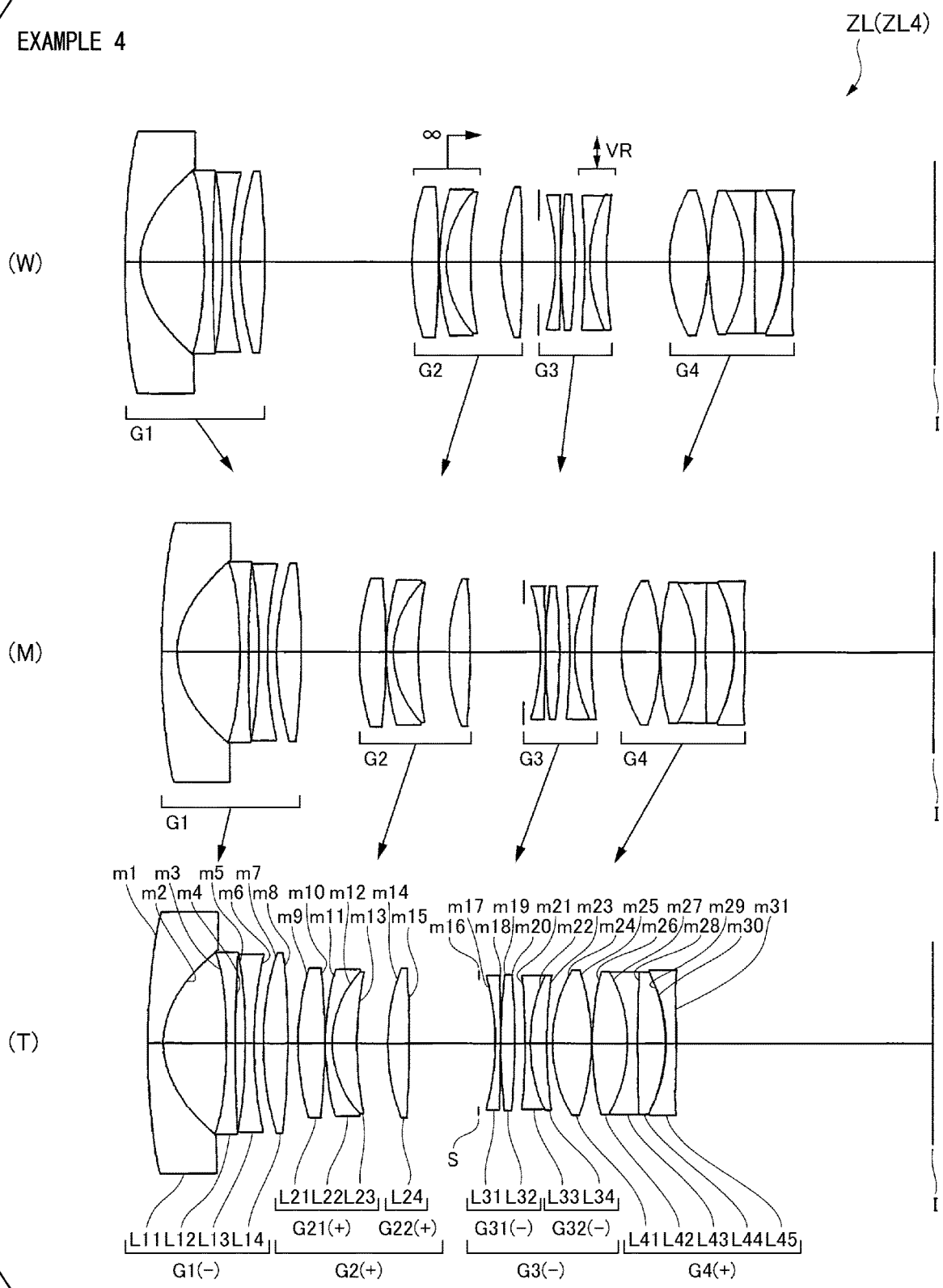
FIG. 13 is a cross-sectional view of a variable magnification optical system according to Example 4, wherein parts (W), (M), and (T) are in a wide-angle end state, an intermediate focal length state, and a telephoto end state, respectively.

Example 4 will be described with reference to FIGS. 13 to 16 and Table 4. As illustrated in FIG. 13, a variable magnification optical system ZL (ZL4) according to Example 4 is constituted by, in order from an object, a first lens group G1 having a negative refractive power; a second lens group G2 having a positive refractive power; a third lens group G3 having a negative refractive power; and a fourth lens group G4 having a positive refractive power.

The first lens group G1 is constituted by, in order from the object, a negative meniscus lens L11 having a concave surface oriented toward an image side, a biconcave lens L12, a biconcave lens L13, and a biconvex lens L14. The negative meniscus lens L11 is a glass-molded aspherical lens of which the lens surfaces on both sides are aspherical surfaces. Moreover, the biconcave lens L12 is a glass-molded aspherical lens of which the lens surface on the object side is an aspherical surface.

The second lens group G2 is constituted by, in order from the object, a 21st lens group G21 having a positive refractive power and a 22nd lens group G22 having a positive refractive power. The 21st lens group G21 is constituted by, in order from the object, a biconvex lens L21 and a cemented lens including a negative meniscus lens L22 having a concave surface oriented toward the image side and a positive meniscus lens L23 having a convex surface oriented toward the object side. The 22nd lens group G22 is constituted by a biconvex lens L24.

The third lens group G3 is constituted by, in order from the object, a 31st lens group G31 having a negative refractive power and a 32nd lens group G32 having a negative refractive power. The 31st lens group G31 is constituted by, in order from the object, a negative meniscus lens L31 having a concave surface oriented toward the object side and a biconvex lens L32. The 32nd lens group G32 is constituted by, in order from the object, a cemented lens including a biconcave lens L33 and a positive meniscus lens L34 having a convex surface oriented toward the object side. The positive meniscus lens L34 is a glass-molded aspherical lens of which the lens surface on the image side is an aspherical surface.

The fourth lens group G4 is constituted by, in order from the object, a biconvex lens L41, a cemented lens including a biconvex lens L42, a biconcave lens L43, and a biconvex lens L44, and a negative meniscus lens L45 having a concave surface oriented toward the object side. The negative meniscus lens L45 is a glass-molded aspherical lens of which the lens surface on the image side is an aspherical surface.

An aperture stop S is provided between the second lens group G2 and the third lens group G3, and the aperture stop S forms the third lens group G3.

Varying magnification from the wide-angle end state to the telephoto end state is performed by moving the first lens group G1 toward the image side and then moving the first lens group G1 toward the object side, moving the second lens group G2, the third lens group G3, and the fourth lens group G4 toward the object side such that the distances between the respective lens groups (the distance between the first and second lens groups G1 and G2, the distance between the second and third lens groups G2 and G3, and the distance between the third and fourth lens groups G4) are changed. The aperture stop S is moved toward the object side integrally with the third lens group G3.

Focusing from infinity to an object at a close distance is performed by moving the 21st lens group G21 toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K The 31st lens group G31 positioned at an object-side of the 32nd lens group G32 is immovable during image blur correction.

In Example 4, in the wide-angle end state, since the vibration reduction coefficient is −0.64 and the focal length is 16.40 mm, the moving distance of the vibration-reduction lens group VR for correcting the rotation blur of 0.81° is −0.36 mm. In the intermediate focal length state, since the vibration reduction coefficient is −0.77 and the focal length is 23.50 mm, the moving distance of the vibration-reduction lens group VR for correcting the rotation blur of 0.67° is −0.37 mm. In the telephoto end state, since the vibration reduction coefficient is −0.99 and the focal length is 34.00 mm, the moving distance of the vibration-reduction lens group VR for correcting the rotation blur of 0.57° is −0.34 mm.

Table 4 illustrates the values of respective specifications of Example 4. Surface numbers 1 to 31 in Table 4 correspond to optical surfaces of m1 to m31 illustrated in FIG. 13.

TABLE 4

| [Lens Specification] | | | | |
| --- | --- | --- | --- | --- |
| Surface number | R | D | nd | νd |
| *1 | 158.26471 | 3.000 | 1.76690 | 46.9 |
| *2 | 16.71640 | 12.506 | 1.00000 | |
| *3 | −100.68692 | 1.700 | 1.76690 | 46.9 |
| 4 | 294.38156 | 2.036 | 1.00000 | |
| 5 | −112.13035 | 1.700 | 1.49700 | 81.7 |
| 6 | 85.46589 | 1.795 | 1.00000 | |
| 7 | 62.15225 | 4.834 | 1.75520 | 27.6 |

TABLE 4-continued

|   | | | | |
|---|---|---|---|---|
| 8 | −152.76455 | (D8) | 1.00000 | |
| 9 | 51.34147 | 5.247 | 1.57957 | 53.7 |
| 10 | −148.40876 | 0.100 | 1.00000 | |
| 11 | 52.00686 | 1.400 | 1.84666 | 23.8 |
| 12 | 20.66855 | 4.835 | 1.60342 | 38.0 |
| 13 | 70.71894 | (D13) | 1.00000 | |
| 14 | 43.27867 | 4.209 | 1.49700 | 81.7 |
| 15 | −204.02511 | (D15) | 1.00000 | |
| 16 | (Aperture stop) | 3.263 | 1.00000 | |
| 17 | −48.97633 | 1.000 | 1.80400 | 46.6 |
| 18 | −483.47840 | 0.100 | 1.00000 | |
| 19 | 123.68660 | 2.687 | 1.84666 | 23.8 |
| 20 | −137.51585 | 2.000 | 1.00000 | |
| 21 | −144.72303 | 1.000 | 1.80400 | 46.6 |
| 22 | 31.48383 | 3.234 | 1.80518 | 25.4 |
| *23 | 87.19368 | (D23) | 1.00000 | |
| 24 | 29.45649 | 7.615 | 1.49700 | 81.7 |
| 25 | −43.56074 | 0.100 | 1.00000 | |
| 26 | 57.11501 | 6.954 | 1.51680 | 63.9 |
| 27 | −29.46690 | 2.000 | 1.90200 | 25.3 |
| 28 | 475.53687 | 5.530 | 1.58144 | 41.0 |
| 29 | −30.77992 | 0.113 | 1.00000 | |
| 30 | −30.54254 | 2.000 | 1.80604 | 40.7 |
| *31 | −129.81226 | (D31) | 1.00000 | |

[Aspheric Data]

| Surface | κ | A4 | A6 | A8 | A10 |
|---|---|---|---|---|---|
| 1 | 1.00000e+00 | 3.21819e−09 | 2.61986e−09 | −6.79605e−12 | 7.09724e−15 |
| 2 | 0.00000e+00 | 5.03399e−06 | 1.70596e−10 | 4.14609e−11 | −1.35933e−13 |
| 3 | 1.00000e+00 | −3.36707e−06 | −3.58580e−09 | 1.66952e−11 | −1.07642e−13 |
| 23 | 1.00000e+00 | −2.16204e−06 | −4.20097e−10 | 7.89073e−13 | 2.88415e−14 |
| 31 | 1.00000e+00 | 1.52012e−05 | 1.66306e−08 | −6.37611e−12 | 6.87116e−14 |

[Various Data]

|   | W | M | T |
|---|---|---|---|
| f | 16.40 | 24.50 | 34.00 |
| FNo | 2.87 | 2.89 | 2.86 |
| ω | 53.8 | 39.5 | 30.3 |
| Y | 20.00 | 20.00 | 20.00 |
| TL | 159.618 | 152.183 | 154.500 |
| BF | 27.995 | 37.306 | 50.547 |

[Variable Distance Data]

|   | Focusing on infinity | | | Focusing on close point | | |
|---|---|---|---|---|---|---|
|   | W | M | T | W | M | T |
| D0 | ∞ | ∞ | ∞ | 340.38 | 347.82 | 345.50 |
| β | — | — | — | −0.0449 | −0.0661 | −0.0926 |
| f | 16.40 | 24.50 | 34.00 | — | — | — |
| D8 | 28.962 | 11.435 | 2.000 | 30.607 | 13.196 | 3.948 |
| D13 | 6.055 | 6.055 | 6.055 | 4.410 | 4.294 | 4.107 |
| D15 | 3.148 | 10.508 | 13.742 | 3.148 | 10.508 | 13.742 |
| D23 | 12.502 | 5.922 | 1.200 | 12.502 | 5.922 | 1.200 |
| D31 | 27.995 | 37.306 | 50.547 | 27.995 | 37.306 | 50.547 |

[Lens Group Data]

| Lens group | Starting surface | Focal length |
|---|---|---|
| 1st lens group | 1 | −24.41 |
| 2nd lens group | 9 | 43.07 |
| 21st lens group | 9 | 82.23 |
| 22nd lens group | 14 | 72.25 |
| 3rd lens group | 16 | −59.50 |
| 31st lens group | 16 | −654.26 |
| 32nd lens group | 21 | −67.24 |
| 4th lens group | 24 | 40.98 |

TABLE 4-continued

[Conditional Expression Correspondence Value]

| | |
|---|---|
| Conditional Expression (1) | f1/f3 = 0.410 |
| Conditional Expression (2) | f32/f3 = 1.130 |
| Conditional Expression (3) | f4/f2 = 0.951 |
| Conditional Expression (4) | A(T3.5)/A(T4.0) = 1.770 |

It can be understood from Table 4 that the variable magnification optical system ZL4 according to Example 4 satisfies Conditional Expressions (1) to (4).

Figure 14:
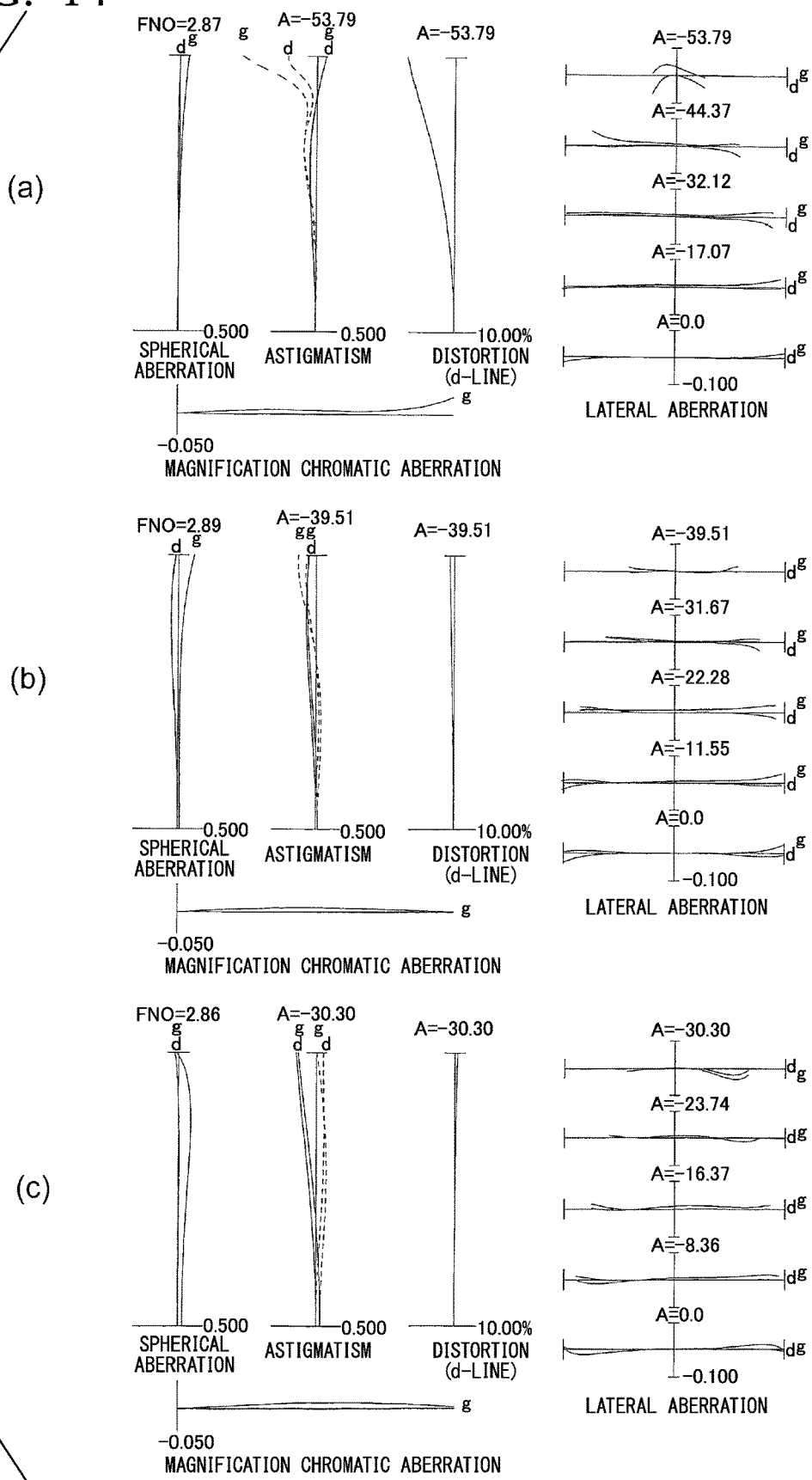
FIG. 14 shows graphs illustrating various aberrations of the variable magnification optical system according to Example 4 upon focusing on infinity, wherein parts (a), (b), and (c) are in the wide-angle end state, the intermediate focal length state, and the telephoto end state, respectively.
Figure 15:
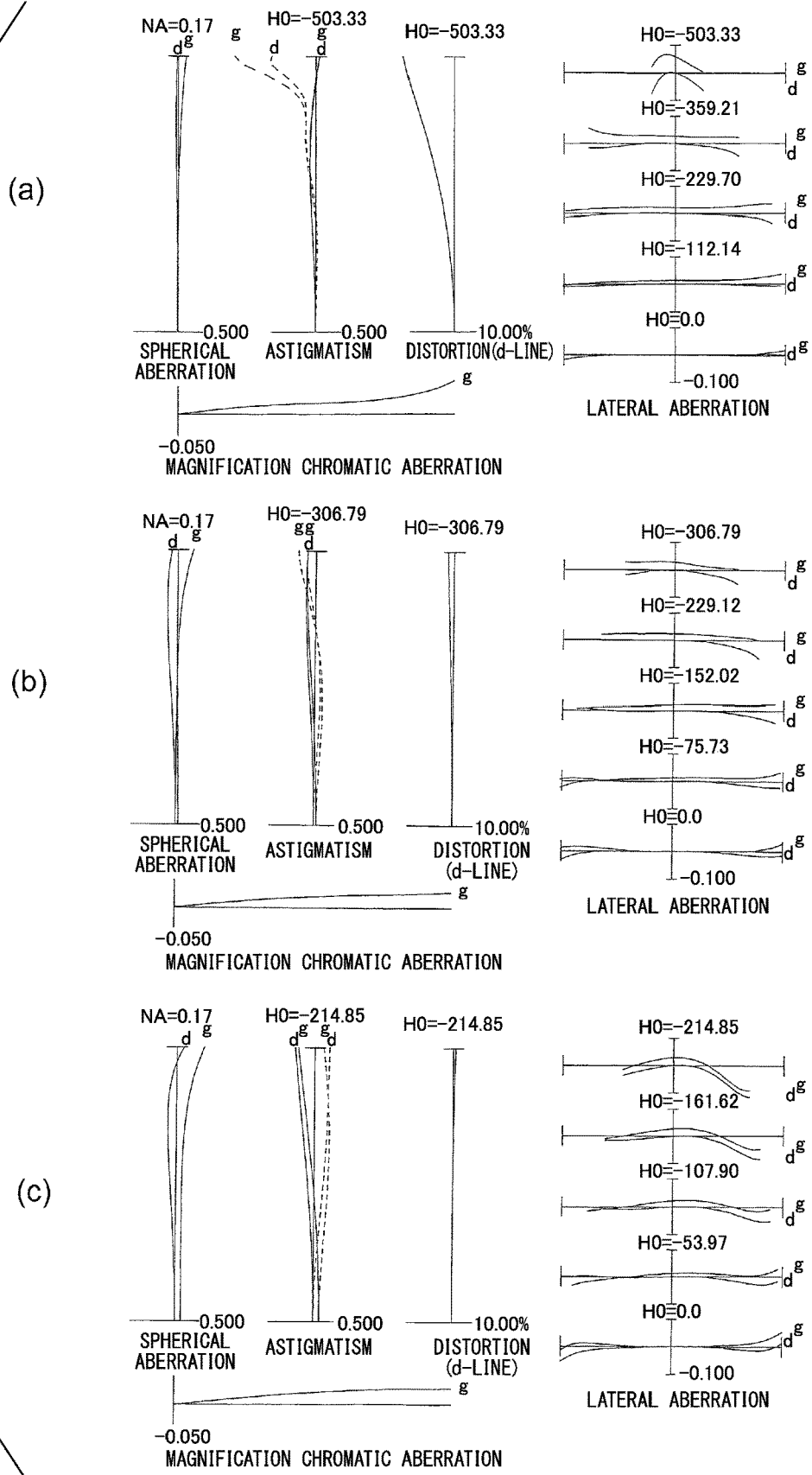
FIG. 15 shows graphs illustrating various aberrations of the variable magnification optical system according to Example 4 upon focusing on a close point, wherein parts (a), (b), and (c) are in the wide-angle end state, the intermediate focal length state, and the telephoto end state, respectively.
Figure 16:
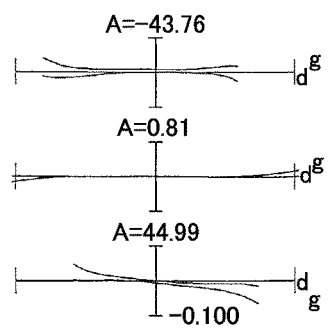
FIG. 16 shows graphs illustrating lateral aberrations of the variable magnification optical system according to Example 4 after image blur correction was performed upon focusing on infinity; part (a), (b), and (c) are in the wide-angle end state, the intermediate focal length state, and the telephoto end state, respectively.
Figure 16:
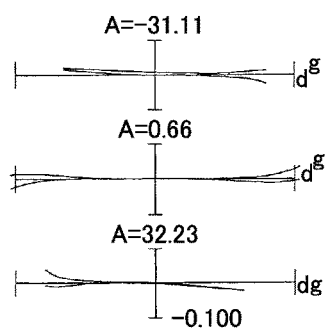
Figure 16:
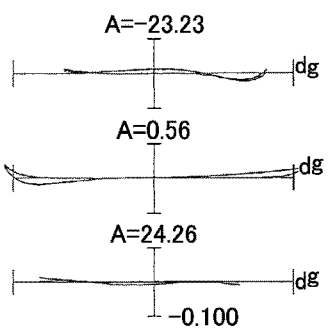

FIG. 14 shows graphs illustrating various aberrations (spherical aberration, astigmatism, distortion, magnification chromatic aberration, and lateral aberration) upon focusing on infinity, of the variable magnification optical system ZL4 according to Example 4, in which part (a) illustrates the wide-angle end state, part (b) illustrates the intermediate focal length state, and part (c) illustrates the telephoto end state. FIG. 15 shows graphs illustrating various aberrations (spherical aberration, astigmatism, distortion, magnification chromatic aberration, and lateral aberration) upon focusing on a close point, of the variable magnification optical system ZL4 according to Example 4, in which part (a) illustrates the wide-angle end state, part (b) illustrates the intermediate focal length state, and part (c) illustrates the telephoto end state. FIG. 16 shows graphs illustrating lateral aberration of the variable magnification optical system ZL4 according to Example 4 when image blur correction is performed upon focusing on infinity, in which part (a) illustrates the wide-angle end state, part (b) illustrates the intermediate focal length state, and part (c) illustrates the telephoto end state.

It can be understood from FIGS. 14 to 16 that the variable magnification optical system ZL4 according to Example 4 has a satisfactory optical performance such that aberrations are satisfactorily corrected in states ranging from the wide-angle end state to the telephoto end state and from the focusing-on-infinity state to the focusing-on-close-point state. Moreover, it can be understood that the variable magnification optical system ZL4 has an excellent imaging performance upon image blur correction.

Example 5

Figure 17:
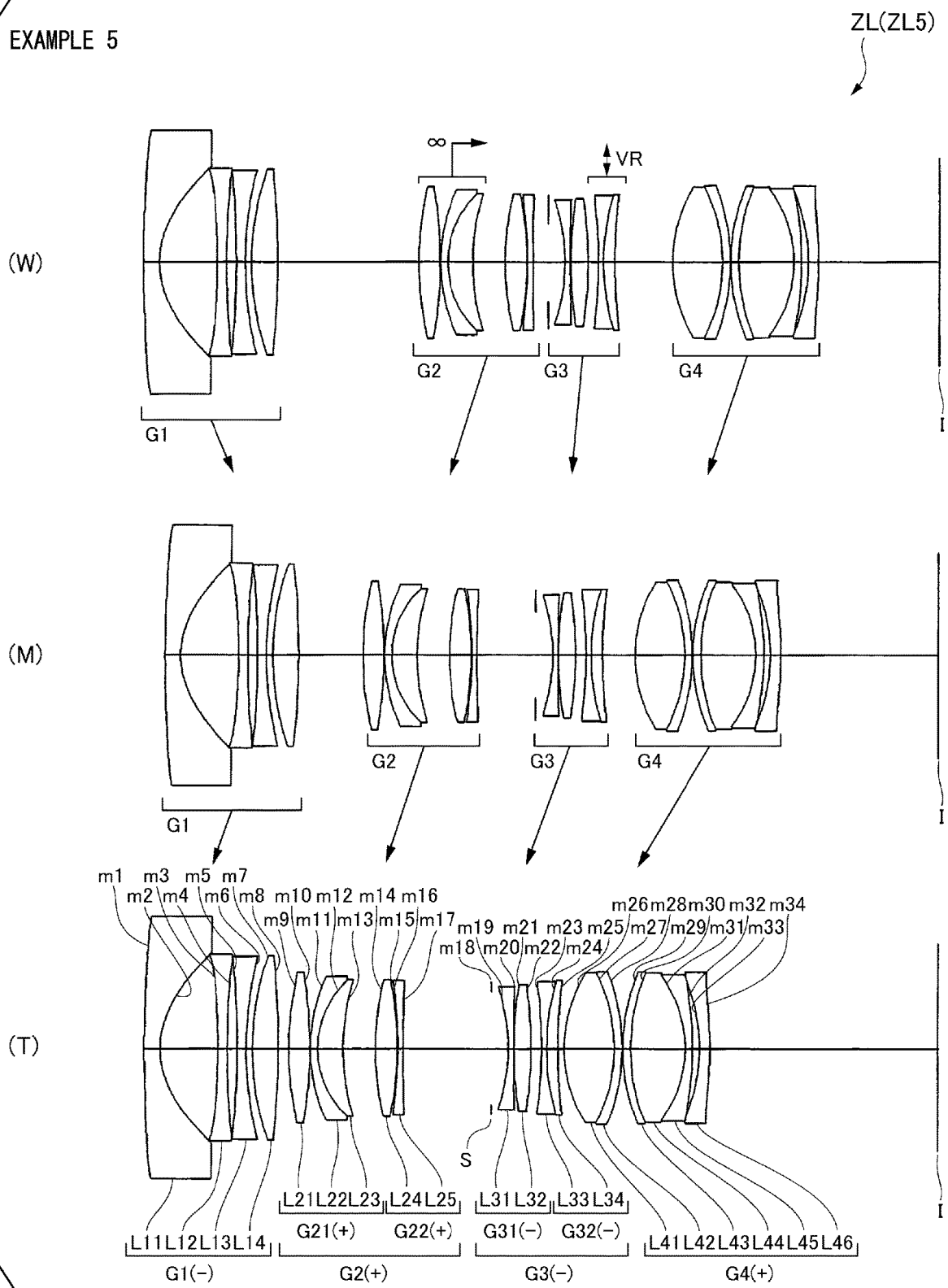
FIG. 17 is a cross-sectional view of a variable magnification optical system according to Example 5, wherein parts (W), (M), and (T) are in a wide-angle end state, an intermediate focal length state, and a telephoto end state, respectively.

Example 5 will be described with reference to FIGS. 17 to 20 and Table 5. As illustrated in FIG. 17, a variable magnification optical system ZL (ZL5) according to Example 5 is constituted by, in order from an object, a first lens group G1 having a negative refractive power; a second lens group G2 having a positive refractive power; a third lens group G3 having a negative refractive power; and a fourth lens group G4 having a positive refractive power.

The first lens group G1 is constituted by, in order from the object, a negative meniscus lens L11 having a concave surface oriented toward an image side, a biconcave lens L12, a biconcave lens L13, and a biconvex lens L14. The negative meniscus lens L11 is a glass-molded aspherical lens of which the lens surfaces on both sides are aspherical surfaces. Moreover, the biconcave lens L12 is a glass-molded aspherical lens of which the lens surface on the object side is an aspherical surface.

The second lens group G2 is constituted by, in order from the object, a 21st lens group G21 having a positive refractive power and a 22nd lens group G22 having a positive refractive power. The 21st lens group G21 is constituted by, in order from the object, a biconvex lens L21 and a cemented lens including a negative meniscus lens L22 having a concave surface oriented toward the image side and a positive meniscus lens L23 having a convex surface oriented toward the object side. The 22nd lens group G22 is constituted by, in order from the object, a biconvex lens L24 and a biconcave lens L25.

The third lens group G3 is constituted by, in order from the object, a 31st lens group G31 having a negative refractive power and a 32nd lens group G32 having a negative refractive power. The 31st lens group G31 is constituted by, in order from the object, a biconcave lens L31 and a biconvex lens L32. The 32nd lens group G32 is constituted by, in order from the object, a cemented lens including a biconcave lens L33 and a positive meniscus lens L34 having a convex surface oriented toward the object side. The positive meniscus lens L34 is a glass-molded aspherical lens of which the lens surface on the image side is an aspherical surface.

The fourth lens group G4 is constituted by, in order from the object, a cemented lens including a biconvex lens L41 and a negative meniscus lens L42 having a concave surface oriented toward the object side, a cemented lens including a negative meniscus lens L43 having a concave surface oriented toward the image side, a biconvex lens L44, and a negative meniscus lens L45 having a concave surface oriented toward the object side, and a negative meniscus lens L46 having a concave surface oriented toward the object side. The negative meniscus lens L46 is a glass-molded aspherical lens of which the lens surface on the image side is an aspherical surface.

An aperture stop S is provided between the second lens group G2 and the third lens group G3, and the aperture stop S forms the third lens group G3.

Varying magnification from the wide-angle end state to the telephoto end state is performed by moving the first lens group G1 toward the image side and then moving the first lens group G1 toward the object side, and moving the second lens group G2, the third lens group G3, and the fourth lens group G4 toward the object side such that the distances between the respective lens groups (the distance between the first and second lens groups G1 and G2, the distance between the second and third lens groups G2 and G3, and the distance between the third and fourth lens groups G4) are changed. The aperture stop S is moved toward the object side integrally with the third lens group G3.

Focusing from infinity to an object at a close distance is performed by moving the 21st lens group G21 toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K. The 31st lens group G31 positioned at an object-side of the 32nd lens group G32 is immovable during image blur correction.

In Example 5, in the wide-angle end state, since the vibration reduction coefficient is −0.64 and the focal length is 16.40 mm, the moving distance of the vibration-reduction lens group VR for correcting the rotation blur of 0.81° is −0.36 mm. In the intermediate focal length state, since the vibration reduction coefficient is −0.75 and the focal length is 23.50 mm, the moving distance of the vibration-reduction lens group VR for correcting the rotation blur of 0.68° is −0.37 mm. In the telephoto end state, since the vibration reduction coefficient is −1.00 and the focal length is 34.00 mm, the moving distance of the vibration-reduction lens group VR for correcting the rotation blur of 0.57° is −0.33 mm.

Table 5 illustrates the values of respective specifications of Example 5. Surface numbers 1 to 34 in Table 5 correspond to optical surfaces of m1 to m34 illustrated in FIG. 17.

TABLE 5

[Lens Specification]

| Surface number | R | D | nd | vd |
|---|---|---|---|---|
| *1 | 214.03011 | 3.000 | 1.76690 | 46.9 |
| *2 | 16.71640 | 11.176 | 1.00000 | |
| *3 | −149.10992 | 1.788 | 1.76690 | 46.9 |
| 4 | 166.28713 | 1.900 | 1.00000 | |
| 5 | −178.76254 | 1.700 | 1.49700 | 81.7 |
| 6 | 70.87126 | 1.200 | 1.00000 | |
| 7 | 54.15316 | 5.068 | 1.75520 | 27.6 |
| 8 | −156.77207 | (D8) | 1.00000 | |
| 9 | 65.37596 | 4.042 | 1.57957 | 53.7 |
| 10 | −86.40087 | 0.100 | 1.00000 | |
| 11 | 32.87197 | 1.400 | 1.84666 | 23.8 |
| 12 | 18.04495 | 4.835 | 1.60342 | 38.0 |
| 13 | 43.87059 | (D13) | 1.00000 | |
| 14 | 54.51621 | 4.209 | 1.62299 | 58.1 |
| 15 | −64.87306 | 0.100 | 1.00000 | |
| 16 | −89.18990 | 1.000 | 1.84666 | 23.8 |
| 17 | 358.37492 | (D17) | 1.00000 | |
| 18 | (Aperture stop) | 3.263 | 1.00000 | |
| 19 | −36.39076 | 1.000 | 1.80400 | 46.6 |
| 20 | 437.40063 | 0.100 | 1.00000 | |
| 21 | 79.71445 | 3.263 | 1.84666 | 23.8 |
| 22 | −81.04803 | 2.000 | 1.00000 | |
| 23 | −98.92231 | 1.000 | 1.80400 | 46.6 |
| 24 | 45.07100 | 2.162 | 1.80518 | 25.4 |
| *25 | 97.54115 | (D25) | 1.00000 | |
| 26 | 27.56072 | 9.635 | 1.49700 | 81.7 |
| 27 | −31.58623 | 1.500 | 1.90200 | 25.3 |
| 28 | −39.39114 | 0.100 | 1.00000 | |
| 29 | 38.11576 | 1.500 | 1.90366 | 31.3 |
| 30 | 37.86683 | 10.551 | 1.48749 | 70.3 |
| 31 | −23.33658 | 1.500 | 1.95000 | 29.4 |
| 32 | −64.06913 | 1.309 | 1.00000 | |
| 33 | −35.25758 | 2.000 | 1.80604 | 40.7 |
| *34 | −66.66667 | (D34) | 1.00000 | |

[Aspheric Data]

| Surface | κ | A4 | A6 | A8 | A10 |
|---|---|---|---|---|---|
| 1 | 1.00000e+00 | −2.89628e−06 | 4.72674e−09 | −4.61029e−12 | 5.30730e−15 |
| 2 | 0.00000e+00 | −9.24789e−07 | −4.40603e−09 | 4.08078e−11 | −1.12994e−13 |
| 3 | 1.00000e+00 | −2.38367e−06 | −3.53563e−09 | 1.63815e−11 | −1.35114e−13 |
| 25 | 1.00000e+00 | −1.99178e−06 | −6.94424e−09 | 4.45213e−11 | −8.23905e−14 |
| 34 | 1.00000e+00 | 1.62225e−05 | 1.55144e−08 | −2.37565e−11 | 6.72404e−14 |

[Various Data]

| | W | M | T |
|---|---|---|---|
| f | 16.40 | 23.50 | 34.00 |
| FNo | 2.80 | 2.84 | 2.85 |
| ω | 53.3 | 40.0 | 29.8 |
| Y | 20.00 | 20.00 | 20.00 |
| TL | 153.337 | 148.994 | 152.660 |
| BF | 23.319 | 30.400 | 43.801 |

TABLE 5-continued

[Variable Distance Data]

| | Focusing on infinity | | | Focusing on close point | | |
|---|---|---|---|---|---|---|
| | W | M | T | W | M | T |
| D0 | ∞ | ∞ | ∞ | 346.66 | 351.01 | 347.34 |
| β | — | — | — | −0.0438 | −0.0625 | −0.0917 |
| f | 16.40 | 23.50 | 34.00 | — | — | — |
| D8 | 27.207 | 12.364 | 2.000 | 29.043 | 14.128 | 3.870 |
| D13 | 6.261 | 6.261 | 6.261 | 4.424 | 4.496 | 4.391 |
| D17 | 3.000 | 11.348 | 16.997 | 3.000 | 11.348 | 16.997 |
| D25 | 11.150 | 6.221 | 1.200 | 11.150 | 6.221 | 1.200 |
| D34 | 23.319 | 30.400 | 43.801 | 23.319 | 30.400 | 43.801 |

[Lens Group Data]

| Lens group | Starting surface | Focal length |
|---|---|---|
| 1st lens group | 1 | −25.73 |
| 2nd lens group | 9 | 43.16 |
| 21st lens group | 9 | 62.62 |
| 22nd lens group | 14 | 107.74 |
| 3rd lens group | 18 | −51.17 |
| 31st lens group | 18 | −428.29 |
| 32nd lens group | 23 | −60.70 |
| 4th lens group | 26 | 33.85 |

[Conditional Expression Correspondence Value]

| Conditional Expression (1) | f1/f3 = 0.503 |
|---|---|
| Conditional Expression (2) | f32/f3 = 1.186 |
| Conditional Expression (3) | f4/f2 = 0.784 |
| Conditional Expression (4) | A(T3.5)/A(T4.0) = 1.801 |

It can be understood from Table 5 that the variable magnification optical system ZL5 according to Example 5 satisfies Conditional Expressions (1) to (4).

Figure 18:
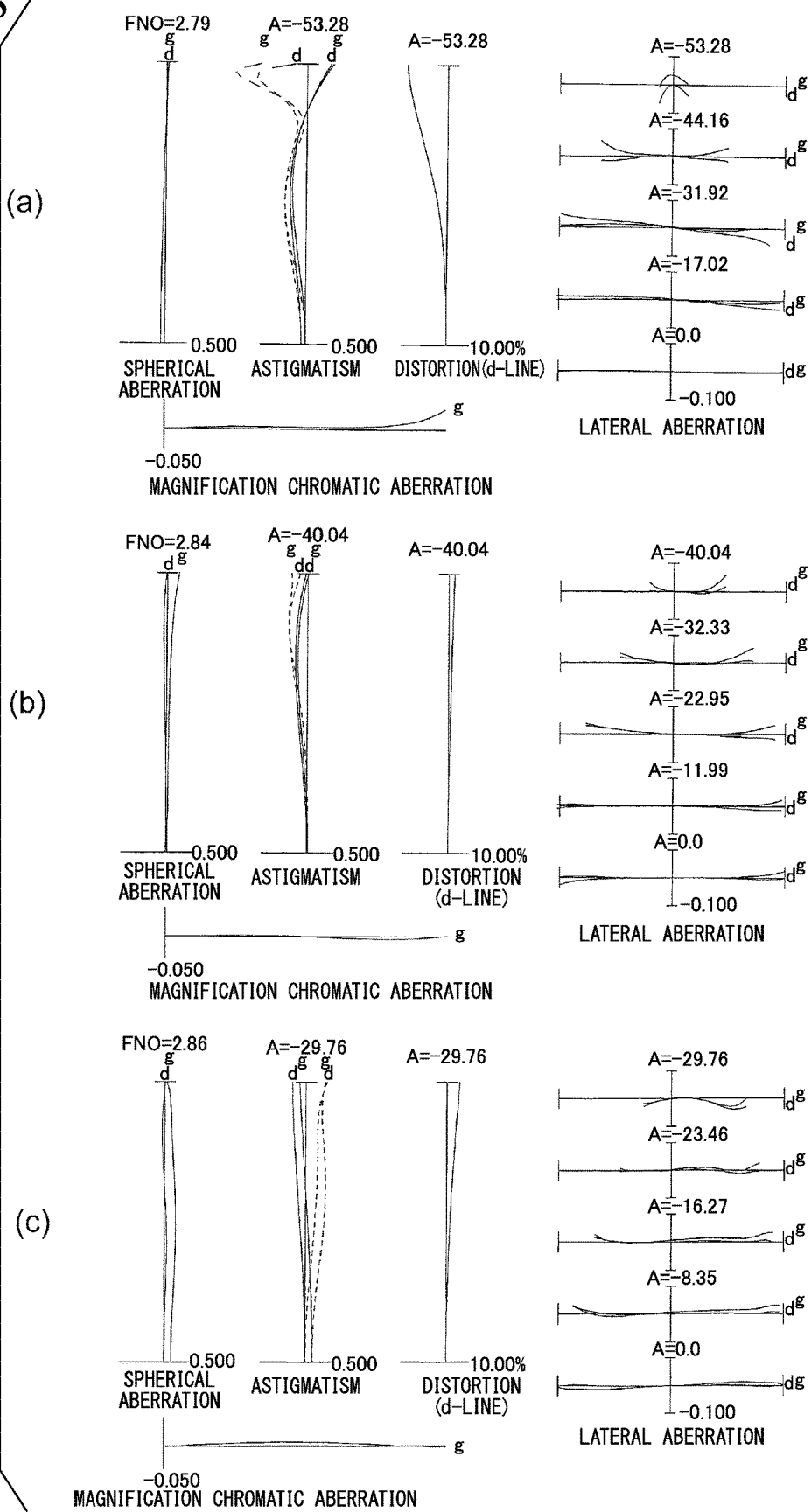
FIG. 18 shows graphs illustrating various aberrations of the variable magnification optical system according to Example 5 upon focusing on infinity, wherein parts (a), (b), and (c) are in the wide-angle end state, the intermediate focal length state, and the telephoto end state, respectively.
Figure 19:
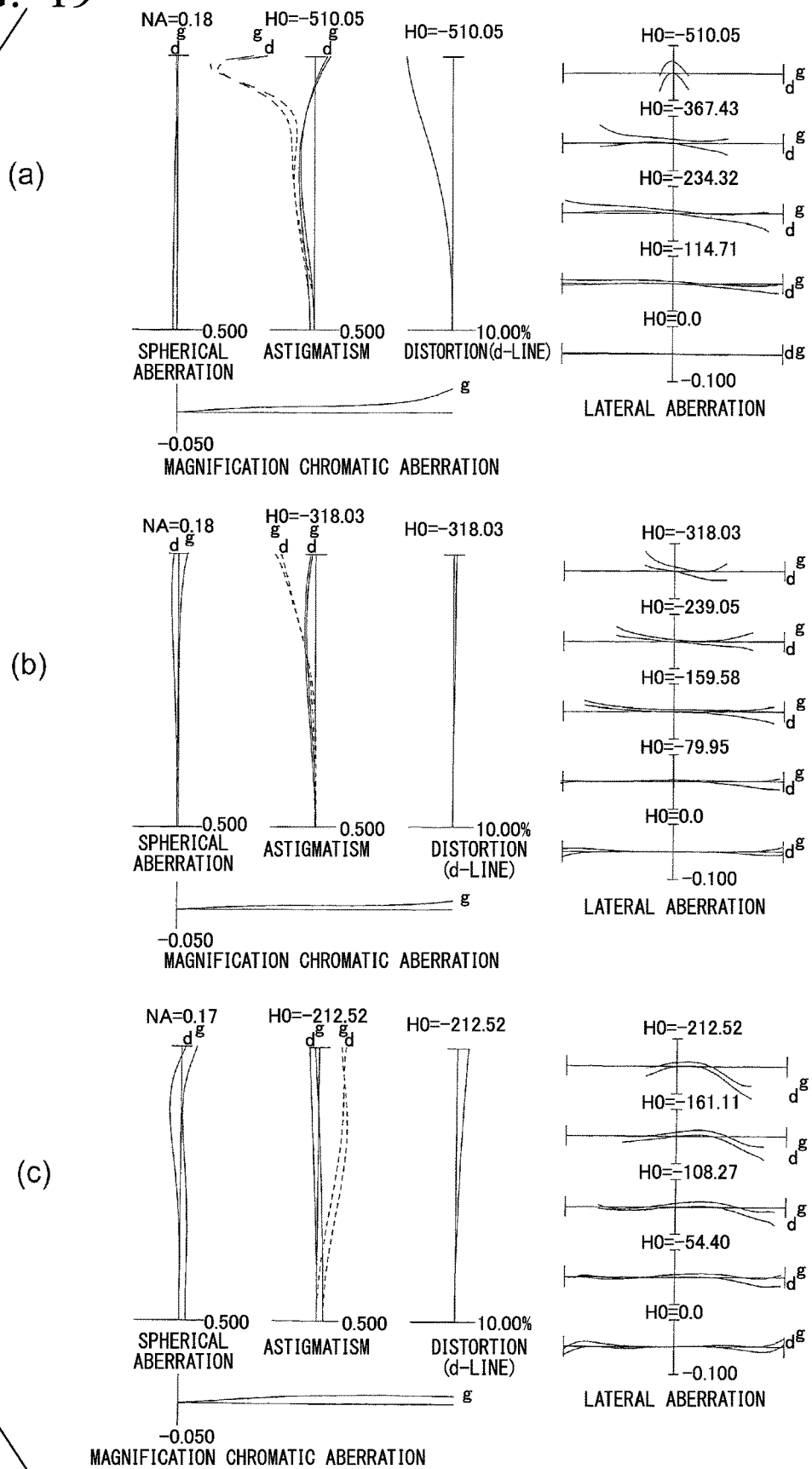
FIG. 19 shows graphs illustrating various aberrations of the variable magnification optical system according to Example 5 upon focusing on a close point, wherein parts (a), (b), and (c) are in the wide-angle end state, the intermediate focal length state, and the telephoto end state, respectively.
Figure 20:
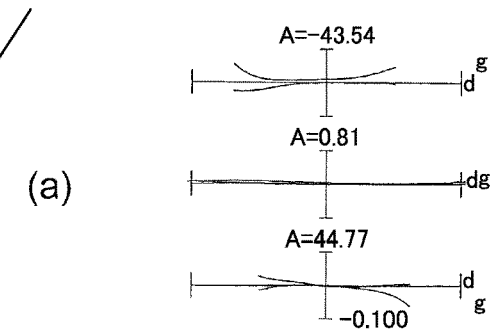
FIG. 20 shows graphs illustrating lateral aberrations of the variable magnification optical system according to Example 5 after image blur correction was performed upon focusing on infinity, wherein parts (a), (b), and (c) are in the wide-angle end state, the intermediate focal length state, and the telephoto end state, respectively.
Figure 20:
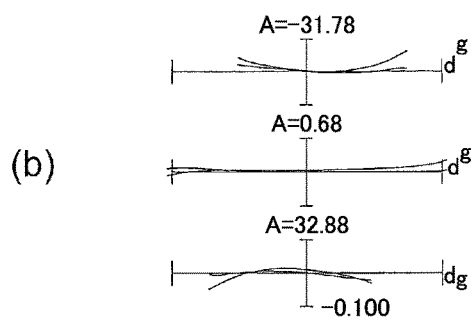
Figure 20:
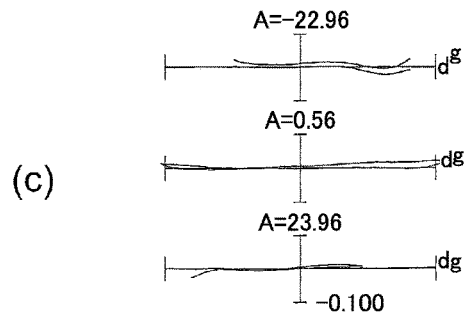

FIG. 18 shows graphs illustrating various aberrations (spherical aberration, astigmatism, distortion, magnification chromatic aberration, and lateral aberration) upon focusing on infinity, of the variable magnification optical system ZL5 according to Example 5, in which part (a) illustrates the wide-angle end state, part (b) illustrates the intermediate focal length state, and part (c) illustrates the telephoto end state. FIG. 19 shows graphs illustrating various aberrations (spherical aberration, astigmatism, distortion, magnification chromatic aberration, and lateral aberration) upon focusing on a close point, of the variable magnification optical system ZL5 according to Example 5, in which part (a) illustrates the wide-angle end state, part (b) illustrates the intermediate focal length state, and part (c) illustrates the telephoto end state. FIG. 20 shows graphs illustrating lateral aberration of the variable magnification optical system ZL5 according to Example 5 when image blur correction is performed upon focusing on infinity, in which part (a) illustrates the wide-angle end state, part (b) illustrates the intermediate focal length state, and part (c) illustrates the telephoto end state.

It can be understood from FIGS. 18 to 20 that the variable magnification optical system ZL5 according to Example 5 has a satisfactory optical performance such that aberrations are satisfactorily corrected in states ranging from the wide-angle end state to the telephoto end state and from the focusing-on-infinity state to the focusing-on-close-point state. Moreover, it can be understood that the variable magnification optical system ZL5 has an excellent imaging performance upon image blur correction.

Example 6

Figure 21:
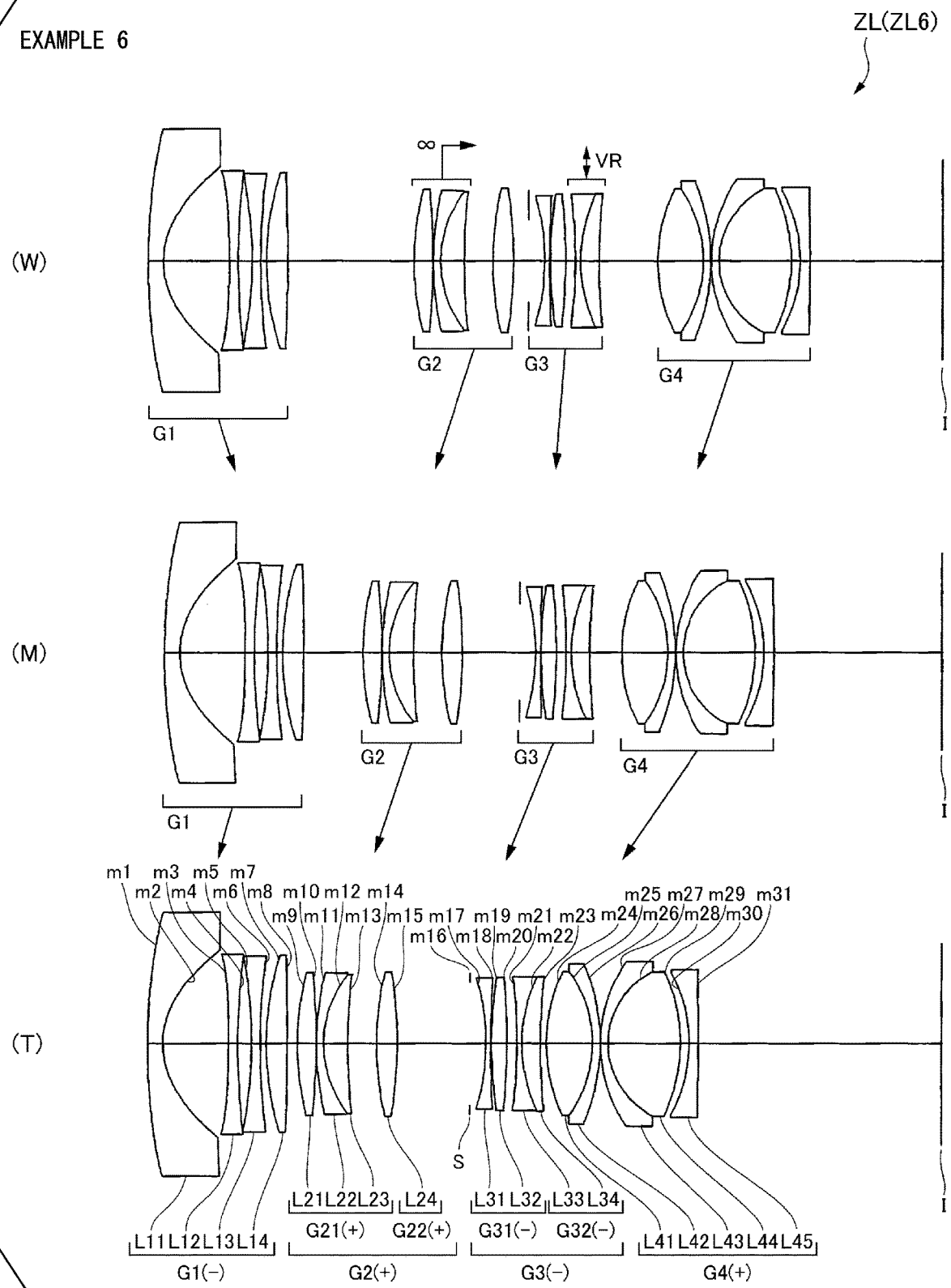
FIG. 21 is a cross-sectional view of a variable magnification optical system according to Example 6, wherein parts (W), (M), and (T) are in a wide-angle end state, an intermediate focal length state, and a telephoto end state, respectively.

Example 6 will be described with reference to FIGS. 21 to 24 and Table 6. As illustrated in FIG. 21, a variable magnification optical system ZL (ZL6) according to Example 6 is constituted by, in order from an object, a first lens group G1 having a negative refractive power; a second lens group G2 having a positive refractive power; a third lens group G3 having a negative refractive power; and a fourth lens group G4 having a positive refractive power.

The first lens group G1 is constituted by, in order from the object, a negative meniscus lens L11 having a concave surface oriented toward an image side, a biconcave lens L12, a biconcave lens L13, and a biconvex lens L14. The negative meniscus lens L11 is a glass-molded aspherical lens of which the lens surfaces on both sides are aspherical surfaces. Moreover, the biconcave lens L12 is a glass-molded aspherical lens of which the lens surface on the object side is an aspherical surface.

The second lens group G2 is constituted by, in order from the object, a 21st lens group G21 having a positive refractive power and a 22nd lens group G22 having a positive refractive power. The 21st lens group G21 is constituted by, in order from the object, a biconvex lens L21 and a cemented lens including a negative meniscus lens L22 having a concave surface oriented toward the image side and a positive meniscus lens L23 having a convex surface oriented toward the object side. The 22nd lens group G22 is constituted by a biconvex lens L24.

The third lens group G3 is constituted by, in order from the object, a 31st lens group G31 having a negative refractive power and a 32nd lens group G32 having a negative refractive power. The 31st lens group G31 is constituted by, in order from the object, a biconcave lens L31 and a biconvex lens L32. The 32nd lens group G32 is constituted by, in order from the object, a cemented lens including a biconcave lens L33 and a positive meniscus lens L34 having a convex surface oriented toward the object side. The positive meniscus lens L34 is a glass-molded aspherical lens of which the lens surface on the image side is an aspherical surface.

The fourth lens group G4 is constituted by, in order from the object, a cemented lens including a biconvex lens L41 and a negative meniscus lens L42 having a concave surface oriented toward the object side, a cemented lens including a negative meniscus lens L43 having a concave surface oriented toward the image side and a biconvex lens L44, and a negative meniscus lens L45 having a concave surface oriented toward the object side. The negative meniscus lens L45 is a glass-molded aspherical lens of which the lens surface on the image side is an aspherical surface.

An aperture stop S is provided between the second lens group G2 and the third lens group G3, and the aperture stop S forms the third lens group G3.

Varying magnification from the wide-angle end state to the telephoto end state is performed by moving the first lens group G1 toward the image side and then moving the first lens group G1 toward the object side, and moving the second lens group G2, the third lens group G3, and the fourth lens group G4 toward the object side such that the distances between the respective lens groups (the distance between the first and second lens groups G1 and G2, the distance between the second and third lens groups G2 and G3, and the distance between the third and fourth lens groups G4) are changed. The aperture stop S is moved toward the object side integrally with the third lens group G3.

Focusing from infinity to an object at a close distance is performed by moving the 21st lens group G21 toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K. The 31st lens group G31 positioned at an object-side of the 32nd lens group G32 is immovable during image blur correction.

In Example 6, in the wide-angle end state, since the vibration reduction coefficient is −0.64 and the focal length is 16.40 mm, the moving distance of the vibration-reduction lens group VR for correcting the rotation blur of 0.81° is −0.36 mm. In the intermediate focal length state, since the vibration reduction coefficient is −0.75 and the focal length is 23.50 mm, the moving distance of the vibration-reduction lens group VR for correcting the rotation blur of 0.68° is −0.37 mm. In the telephoto end state, since the vibration reduction coefficient is −0.99 and the focal length is 34.00 mm, the moving distance of the vibration-reduction lens group VR for correcting the rotation blur of 0.57° is −0.34 mm.

Table 6 illustrates the values of respective specifications of Example 6. Surface numbers 1 to 31 in Table 6 correspond to optical surfaces of m1 to m31 illustrated in FIG. 21.

TABLE 6

[Lens Specification]

| Surface number | R | D | nd | νd |
|---|---|---|---|---|
| *1 | 137.45565 | 3.000 | 1.76690 | 46.9 |
| *2 | 16.71640 | 13.249 | 1.00000 | |
| *3 | −200.00000 | 1.800 | 1.76690 | 46.9 |
| 4 | 140.79042 | 2.774 | 1.00000 | |
| 5 | −91.00641 | 1.700 | 1.49782 | 82.6 |
| 6 | 130.91139 | 1.200 | 1.00000 | |
| 7 | 57.71328 | 4.309 | 1.75520 | 27.6 |
| 8 | −391.18420 | (D8) | 1.00000 | |
| 9 | 57.45469 | 3.759 | 1.57957 | 53.7 |
| 10 | −136.04620 | 0.100 | 1.00000 | |
| 11 | 63.50444 | 1.400 | 1.84666 | 23.8 |
| 12 | 22.40727 | 4.835 | 1.60342 | 38.0 |
| 13 | 125.90248 | (D13) | 1.00000 | |
| 14 | 62.30210 | 4.178 | 1.49782 | 82.6 |
| 15 | −89.59040 | (D15) | 1.00000 | |
| 16 | (Aperture stop) | 3.263 | 1.00000 | |
| 17 | −44.41333 | 1.000 | 1.80400 | 46.6 |
| 18 | 364.43292 | 0.100 | 1.00000 | |
| 19 | 88.64581 | 3.070 | 1.84666 | 23.8 |
| 20 | −128.41166 | 2.000 | 1.00000 | |
| 21 | −105.41745 | 1.000 | 1.80400 | 46.6 |
| 22 | 31.47150 | 3.668 | 1.80518 | 25.4 |
| *23 | 117.62838 | (D23) | 1.00000 | |
| 24 | 32.80510 | 9.246 | 1.49782 | 82.6 |
| 25 | −24.51709 | 1.500 | 1.80440 | 39.6 |
| 26 | −41.14254 | 0.100 | 1.00000 | |
| 27 | 29.14204 | 1.500 | 1.80100 | 34.9 |
| 28 | 16.11298 | 14.456 | 1.49782 | 82.6 |
| 29 | −33.61990 | 1.759 | 1.00000 | |
| 30 | −29.20249 | 2.000 | 1.80604 | 40.7 |
| *31 | −200.00000 | (D31) | 1.00000 | |

TABLE 6-continued

[Aspheric Data]

| Surface | κ | A4 | A6 | A8 | A10 |
|---|---|---|---|---|---|
| 1 | 1.00000e+00 | 7.98258e−07 | 1.75025e−09 | −7.04385e−12 | 6.72581e−15 |
| 2 | 0.00000e+00 | 6.66652e−06 | 7.09047e−10 | 7.33490e−11 | −2.47224e−13 |
| 3 | 1.00000e+00 | −4.11933e−06 | −1.72136e−09 | 1.46976e−11 | −1.21272e−13 |
| 23 | 1.00000e+00 | −1.67444e−06 | −3.26939e−09 | 3.01005e−11 | −7.44169e−14 |
| 31 | 1.00000e+00 | 9.56902e−06 | −6.32519e−09 | 1.02300e−11 | −1.47998e−13 |

[Various Data]

|   | W | M | T |
|---|---|---|---|
| f | 16.40 | 23.50 | 34.00 |
| FNo | 2.83 | 2.84 | 2.90 |
| ω | 53.7 | 40.5 | 30.2 |
| Y | 20.00 | 20.00 | 20.00 |
| TL | 159.619 | 156.147 | 159.217 |
| BF | 26.814 | 33.896 | 48.769 |

[Variable Distance Data]

|   | Focusing on infinity | | | Focusing on close point | | |
|---|---|---|---|---|---|---|
|   | W | M | T | W | M | T |
| D0 | ∞ | ∞ | ∞ | 340.38 | 343.85 | 340.78 |
| β | — | — | — | −0.0449 | −0.0640 | −0.0937 |
| f | 16.40 | 23.50 | 34.00 | — | — | — |
| D8 | 25.331 | 11.804 | 2.000 | 26.896 | 13.464 | 3.841 |
| D13 | 5.722 | 5.722 | 5.722 | 4.157 | 4.061 | 3.881 |
| D15 | 3.000 | 11.367 | 14.560 | 3.000 | 11.367 | 14.560 |
| D23 | 11.785 | 6.392 | 1.200 | 11.785 | 6.392 | 1.200 |
| D31 | 26.814 | 33.896 | 48.769 | 26.814 | 33.896 | 48.769 |

[Lens Group Data]

| Lens group | Starting surface | Focal length |
|---|---|---|
| 1st lens group | 1 | −23.77 |
| 2nd lens group | 9 | 42.52 |
| 21st lens group | 9 | 79.65 |
| 22nd lens group | 14 | 74.50 |
| 3rd lens group | 16 | −52.47 |
| 31st lens group | 16 | −265.76 |
| 32nd lens group | 21 | −69.99 |
| 4th lens group | 24 | 37.73 |

[Conditional Expression Correspondence Value]

| Conditional Expression (1) | f1/f3 = 0.453 |
| Conditional Expression (2) | f32/f3 = 1.308 |
| Conditional Expression (3) | f4/f2 = 0.887 |
| Conditional Expression (4) | A(T3.5)/A(T4.0) = 1.769 |

It can be understood from Table 6 that the variable magnification optical system ZL6 according to Example 6 satisfies Conditional Expressions (1) to (4).

Figure 22:
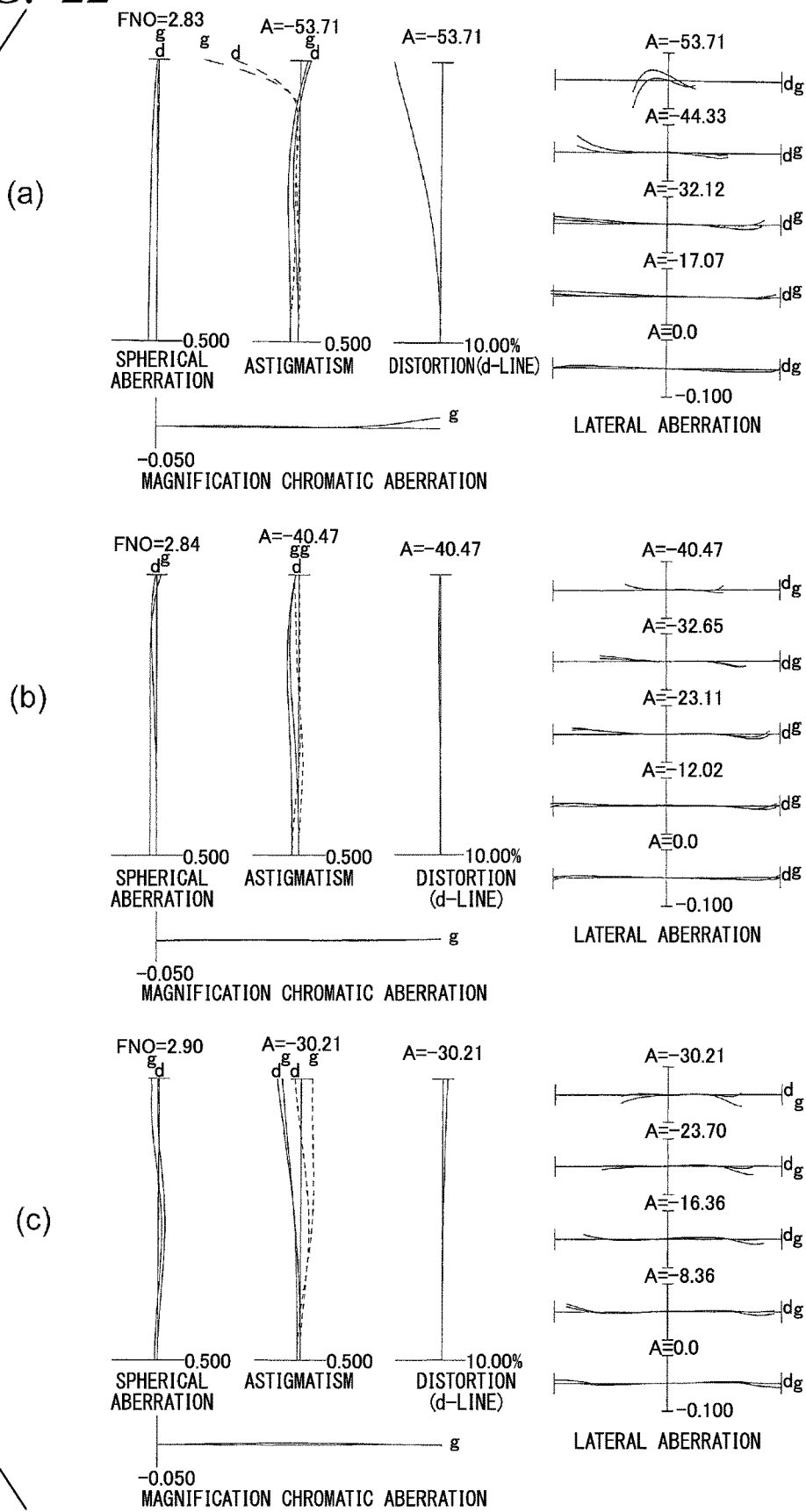
FIG. 22 shows graphs illustrating various aberrations of the variable magnification optical system according to Example 6 upon focusing on infinity, wherein parts (a), (b), and (c) are in the wide-angle end state, the intermediate focal length state, and the telephoto end state, respectively.
Figure 23:
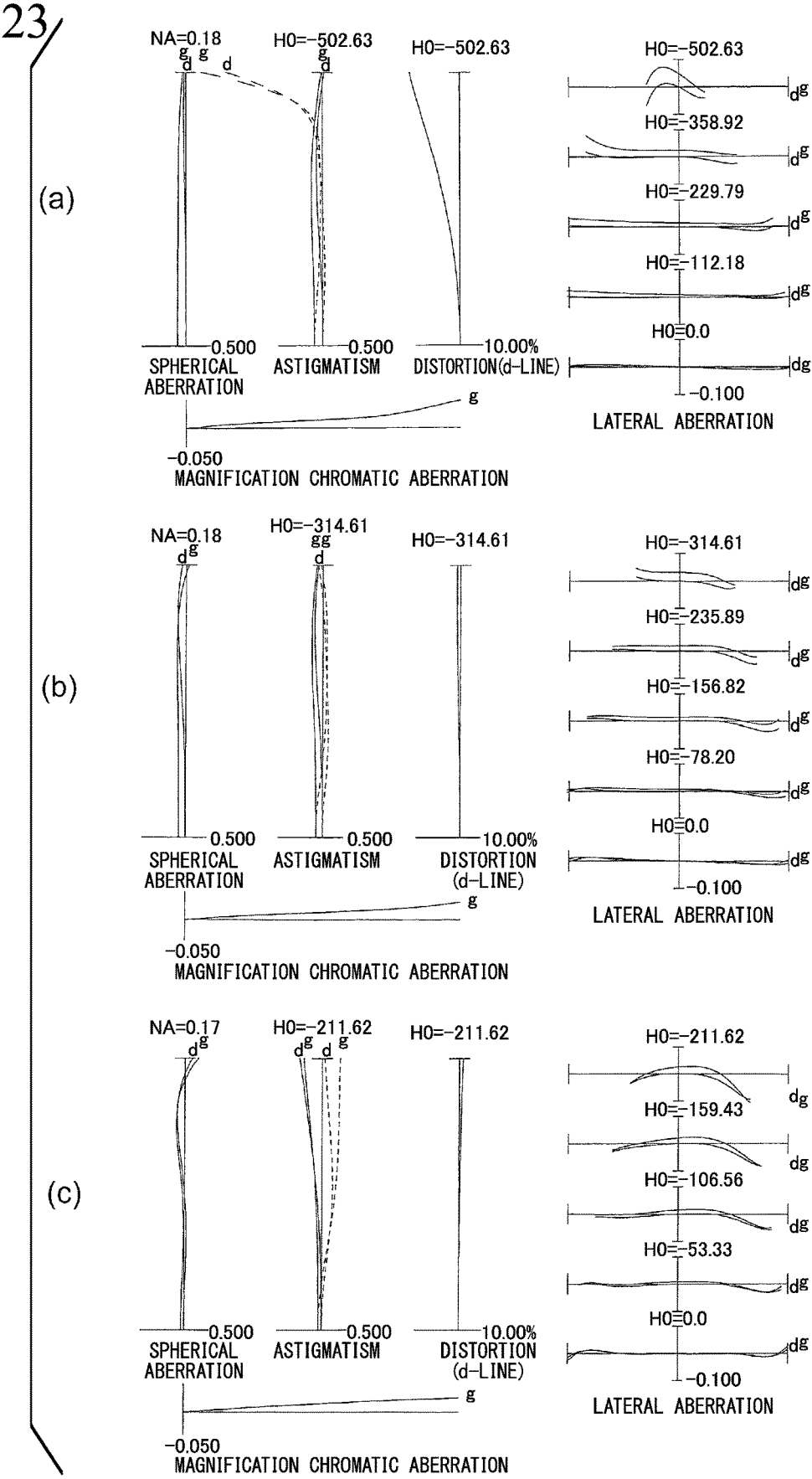
FIG. 23 shows graphs illustrating various aberrations of the variable magnification optical system according to Example 6 upon focusing on a close point, wherein parts (a), (b), and (c) are in the wide-angle end state, the intermediate focal length state, and the telephoto end state, respectively.
Figure 24:
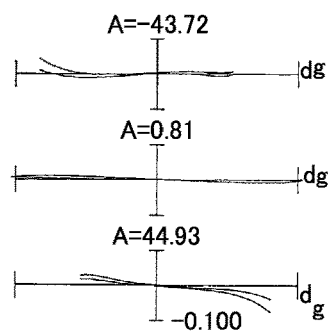
FIG. 24 shows graphs illustrating lateral aberrations of the variable magnification optical system according to Example 6 after image blur correction was performed upon focusing on infinity, wherein parts (a), (b), and (c) are in the wide-angle end state, the intermediate focal length state, and the telephoto end state, respectively.
Figure 24:
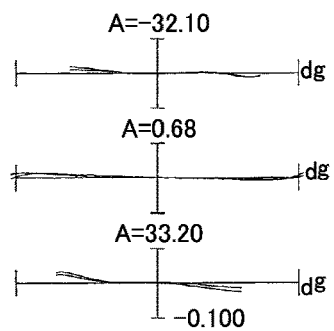
Figure 24:
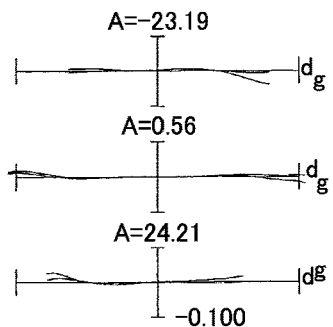

FIG. 22 shows graphs illustrating various aberrations (spherical aberration, astigmatism, distortion, magnification chromatic aberration, and lateral aberration) upon focusing on infinity, of the variable magnification optical system ZL6 according to Example 6, in which part (a) illustrates the wide-angle end state, part (b) illustrates the intermediate focal length state, and part (c) illustrates the telephoto end state. FIG. 23 shows graphs illustrating various aberrations (spherical aberration, astigmatism, distortion, magnification chromatic aberration, and lateral aberration) upon focusing on a close point, of the variable magnification optical system ZL6 according to Example 6, in which part (a) illustrates the wide-angle end state, part (b) illustrates the intermediate focal length state, and part (c) illustrates the telephoto end state. FIG. 24 shows graphs illustrating lateral aberration of the variable magnification optical system ZL6 according to Example 6 when image blur correction is performed upon focusing on infinity, in which part (a) illustrates the wide-angle end state, part (b) illustrates the intermediate focal length state, and part (c) illustrates the telephoto end state.

It can be understood from FIGS. 22 to 24 that the variable magnification optical system ZL6 according to Example 6 has a satisfactory optical performance such that aberrations are satisfactorily corrected in states ranging from the wide-angle end state to the telephoto end state and from the focusing-on-infinity state to the focusing-on-close-point state. Moreover, it can be understood that the variable magnification optical system ZL6 has an excellent imaging performance upon image blur correction.

Example 7

Figure 25:
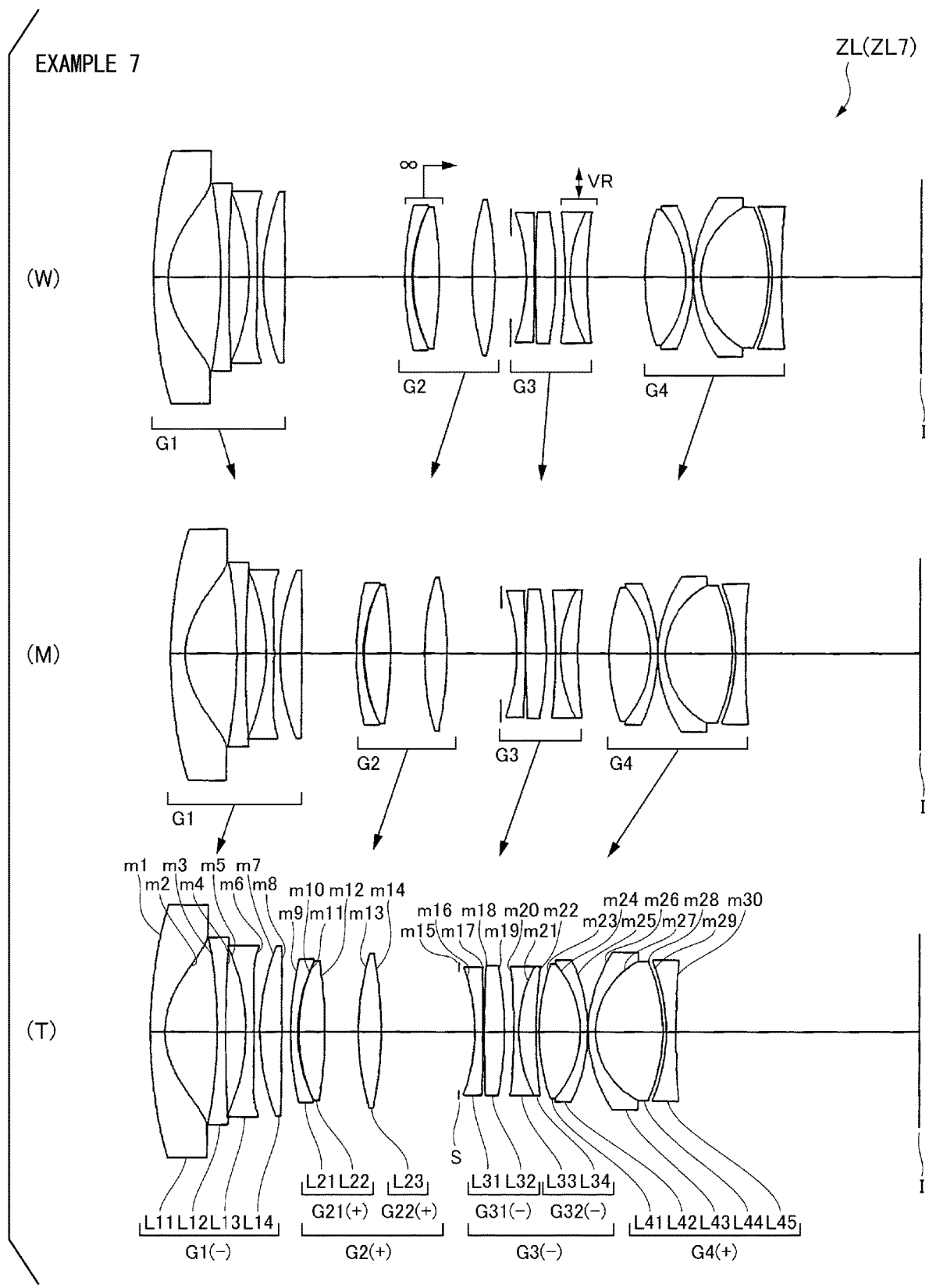
FIG. 25 is a cross-sectional view of a variable magnification optical system according to Example 7, wherein parts (W), (M), and (T) are in a wide-angle end state, an intermediate focal length state, and a telephoto end state, respectively.

Example 7 will be described with reference to FIGS. 25 to 28 and Table 7. As illustrated in FIG. 25, a variable magnification optical system ZL (ZL7) according to Example 7 is constituted by, in order from an object, a first lens group G1 having a negative refractive power; a second lens group G2 having a positive refractive power; a third lens group G3 having a negative refractive power; and a fourth lens group G4 having a positive refractive power.

The first lens group G1 is constituted by, in order from the object, a negative meniscus lens L11 having a concave surface oriented toward an image side, a biconcave lens L12, a negative meniscus lens L13 having a concave surface oriented toward the object side, and a biconvex lens L14. The negative meniscus lens L11 is a glass-molded aspherical lens of which the lens surfaces on both sides are aspherical surfaces. Moreover, the negative meniscus lens L13 is a glass-molded aspherical lens of which the lens surface on the image side is an aspherical surface.

The second lens group G2 is constituted by, in order from the object, a 21st lens group G21 having a positive refractive power and a 22nd lens group G22 having a positive refractive power. The 21st lens group G21 is constituted by, in order from the object, a negative meniscus lens L21 having a concave surface oriented toward the image side and a biconvex lens L21 The 22nd lens group G22 is constituted by a biconvex lens L23.

The third lens group G3 is constituted by, in order from the object, a 31st lens group G31 having a negative refractive power and a 32nd lens group G32 having a negative refractive power. The 31st lens group G31 is constituted by, in order from the object, a negative meniscus lens L31 having a concave surface oriented toward the object side and a biconvex lens L32. The 32nd lens group G32 is constituted by, in order from the object, a cemented lens including a biconcave lens L33 and a positive meniscus lens L34 having a convex surface oriented toward the object side. The positive meniscus lens L34 is a glass-molded aspherical lens of which the lens surface on the image side is an aspherical surface.

The fourth lens group G4 is constituted by, in order from the object, a cemented lens including a biconvex lens L41 and a negative meniscus lens L42 having a concave surface oriented toward the object side, a cemented lens including a negative meniscus lens L43 having a concave surface oriented toward the image side and a biconvex lens L44, and a biconcave lens L45. The biconcave lens L45 is a glass-molded aspherical lens of which the lens surface on the image side is an aspherical surface.

An aperture stop S is provided between the second lens group G2 and the third lens group G3, and the aperture stop S forms the third lens group G3.

Varying magnification from the wide-angle end state to the telephoto end state is performed by moving the first lens group G1 toward the image side and then moving the first lens group G1 toward the object side, and moving the second lens group G2, the third lens group G3, and the fourth lens group G4 toward the object side such that the distances between the respective lens groups (the distance between the first and second lens groups G1 and G2, the distance between the second and third lens groups G2 and G3, and the distance between the third and fourth lens groups G4) are changed. The aperture stop S is moved toward the object side integrally with the third lens group G3.

Focusing from infinity to an object at a close distance is performed by moving the 21st lens group G21 toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K. The 31st lens group G31 positioned at an object-side of the 32nd lens group G32 is immovable during image blur correction.

In Example 7, in the wide-angle end state, since the vibration reduction coefficient is −0.65 and the focal length is 16.40 mm, the moving distance of the vibration-reduction lens group VR for correcting the rotation blur of 0.81° is −0.36 mm. In the intermediate focal length state, since the vibration reduction coefficient is −0.75 and the focal length is 23.50 mm, the moving distance of the vibration-reduction lens group VR for correcting the rotation blur of 0.68° is −0.37 mm. In the telephoto end state, since the vibration reduction coefficient is −0.98 and the focal length is 34.00 mm, the moving distance of the vibration-reduction lens group VR for correcting the rotation blur of 0.57° is −0.34 mm.

Table 7 illustrates the values of respective specifications of Example 7. Surface numbers 1 to 30 in Table 7 correspond to optical surfaces of m1 to m30 illustrated in FIG. 25.

TABLE 7

| [Lens Specification] | | | | |
|---|---|---|---|---|
| Surface number | R | D | nd | vd |
| *1 | 89.53266 | 3.000 | 1.76690 | 46.9 |
| *2 | 16.72432 | 10.787 | 1.00000 | |
| 3 | −103.42713 | 1.784 | 1.80400 | 46.6 |
| 4 | 266.92556 | 4.198 | 1.00000 | |
| 5 | −43.32498 | 1.700 | 1.80400 | 46.6 |
| *6 | −166.61981 | 1.200 | 1.00000 | |
| 7 | 48.05321 | 4.547 | 1.76182 | 26.6 |
| 8 | −1018.15300 | (D8) | 1.00000 | |
| 9 | 66.55625 | 1.400 | 1.84666 | 23.8 |
| 10 | 33.15012 | 0.277 | 1.00000 | |
| 11 | 35.08798 | 5.384 | 1.61720 | 54.0 |
| 12 | −90.24468 | (D12) | 1.00000 | |
| 13 | 58.23067 | 4.702 | 1.49782 | 82.6 |
| 14 | −78.69518 | (D14) | 1.00000 | |
| 15 | (Aperture stop) | 3.263 | 1.00000 | |

TABLE 7-continued

| | | | | |
|---|---|---|---|---|
| 16 | −39.33451 | 1.699 | 1.78590 | 44.2 |
| 17 | −379.78453 | 0.207 | 1.00000 | |
| 18 | 250.67620 | 4.217 | 1.79504 | 28.7 |
| 19 | −69.00176 | 2.000 | 1.00000 | |
| 20 | −119.36962 | 1.000 | 1.80400 | 46.6 |
| 21 | 29.64048 | 3.618 | 1.84666 | 23.8 |
| *22 | 95.54478 | (D22) | 1.00000 | |
| 23 | 42.27347 | 8.607 | 1.49782 | 82.6 |
| 24 | −21.43355 | 1.500 | 1.79504 | 28.7 |
| 25 | −33.97007 | 0.100 | 1.00000 | |
| 26 | 29.11675 | 1.500 | 1.79952 | 42.1 |
| 27 | 16.33858 | 13.950 | 1.49782 | 82.6 |
| 28 | −35.02520 | 0.709 | 1.00000 | |
| 29 | −37.48375 | 2.000 | 1.80604 | 40.7 |
| *30 | 282.56902 | (D30) | 1.00000 | |

[Aspheric Data]

| Surface | κ | A4 | A6 | A8 | A10 |
|---|---|---|---|---|---|
| 1 | 1.08800e+00 | −2.64980e−06 | 4.63837e−09 | −3.36654e−12 | 1.72396e−15 |
| | | A12 | A14 | A16 | A18 |
| | | 0.00000e+00 | 0.00000e+00 | 0.00000e+00 | 0.00000e+00 |
| Surface | κ | A4 | A6 | A8 | A10 |
| 2 | 0.00000e+00 | −3.94168e−06 | −3.42246e−08 | 2.20742e−10 | −1.84647e−12 |
| | | A12 | A14 | A16 | A18 |
| | | 8.17320e−15 | −2.21930e−17 | 2.97840e−20 | −1.43740e−23 |
| Surface | κ | A4 | A6 | A8 | A10 |
| 6 | −1.26790e+00 | 1.17182e−05 | 2.20164e−08 | −4.11096e−11 | 3.46520e−13 |
| | | A12 | A14 | A16 | A18 |
| | | −7.77500e−16 | 7.88800e−19 | 0.00000e+00 | 0.00000e+00 |
| Surface | κ | A4 | A6 | A8 | A10 |
| 22 | 8.87400e−01 | −2.07608e−06 | 4.69073e−09 | −5.95702e−12 | 0.00000e+00 |
| | | A12 | A14 | A16 | A18 |
| | | 0.00000e+00 | 0.00000e+00 | 0.00000e+00 | 0.00000e+00 |
| Surface | κ | A4 | A6 | A8 | A10 |
| 30 | −1.15047e+01 | 9.28220e−06 | −1.69110e−08 | 6.56290e−11 | |
| | | A12 | A14 | A16 | A18 |
| | | 0.00000e+00 | 0.00000e+00 | 0.00000e+00 | 0.00000e+00 |

[Various Data]

| | W | M | T |
|---|---|---|---|
| f | 16.40 | 23.50 | 34.00 |
| FNo | 2.89 | 2.90 | 2.91 |
| ω | 53.5 | 40.1 | 29.8 |
| Y | 20.00 | 20.00 | 20.00 |
| TL | 159.504 | 155.699 | 159.556 |
| BF | 47.304 | 54.495 | 68.721 |

[Variable Distance Data]

| | Focusing on infinity | | | Focusing on close point | | |
|---|---|---|---|---|---|---|
| | W | M | T | W | M | T |
| D0 | ∞ | ∞ | ∞ | 340.50 | 344.30 | 340.44 |
| β | — | — | — | −0.0450 | −0.0640 | −0.0938 |
| f | 16.40 | 23.50 | 34.00 | — | — | — |
| D8 | 48.548 | 34.984 | 25.548 | 50.022 | 36.571 | 27.315 |
| D12 | 10.234 | 10.234 | 10.234 | 8.760 | 8.647 | 8.466 |
| D14 | 11.330 | 19.385 | 24.208 | 11.330 | 19.385 | 24.208 |
| D22 | 14.667 | 9.180 | 3.424 | 14.667 | 9.180 | 3.424 |
| D30 | 47.304 | 54.495 | 68.721 | 47.304 | 54.495 | 68.721 |

[Lens Group Data]

| Lens group | Starting surface | Focal length |
|---|---|---|
| 1st lens group | 1 | −22.87 |
| 2nd lens group | 9 | 40.73 |
| 21st lens group | 9 | 86.25 |
| 22nd lens group | 13 | 68.00 |
| 3rd lens group | 15 | −56.62 |

TABLE 7-continued

| 31st lens group | 15 | −408.50 |
| 32nd lens group | 20 | −70.04 |
| 4th lens group | 23 | 41.18 |

[Conditional Expression Correspondence Value]

| Conditional Expression (1) | f1/f3 = 0.404 |
| Conditional Expression (2) | f32/f3 = 1.237 |
| Conditional Expression (3) | f4/f2 = 1.011 |
| Conditional Expression (4) | A(T3.5)/A(T4.0) = 1.676 |

It can be understood from Table 7 that the variable magnification optical system ZL7 according to Example 7 satisfies Conditional Expressions (1) to (4).

Figure 26:
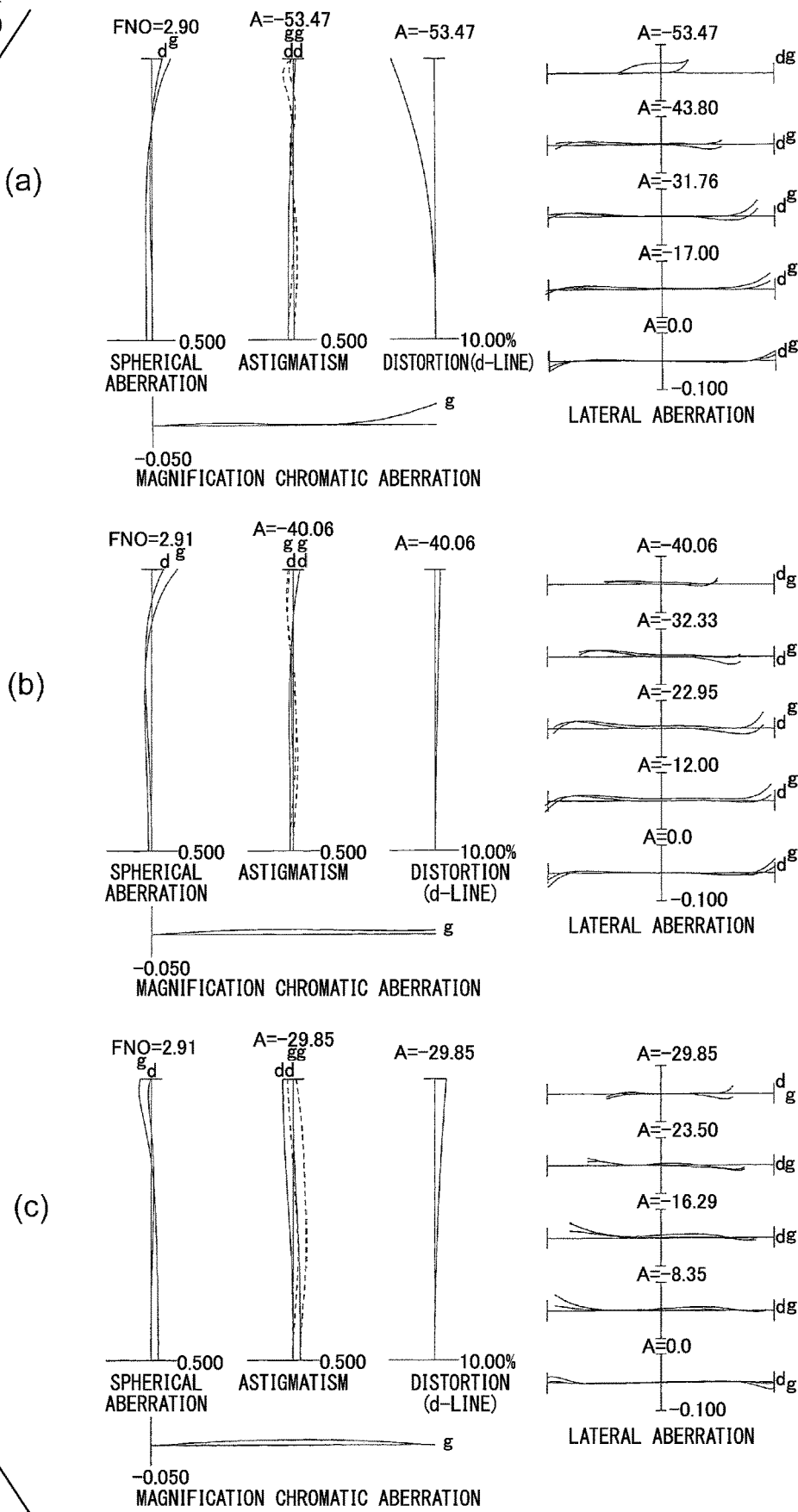
FIG. 26 shows graphs illustrating various aberrations of the variable magnification optical system according to Example 7 upon focusing on infinity, wherein parts (a), (b), and (c) are in the wide-angle end state, the intermediate focal length state, and the telephoto end state, respectively.
Figure 27:
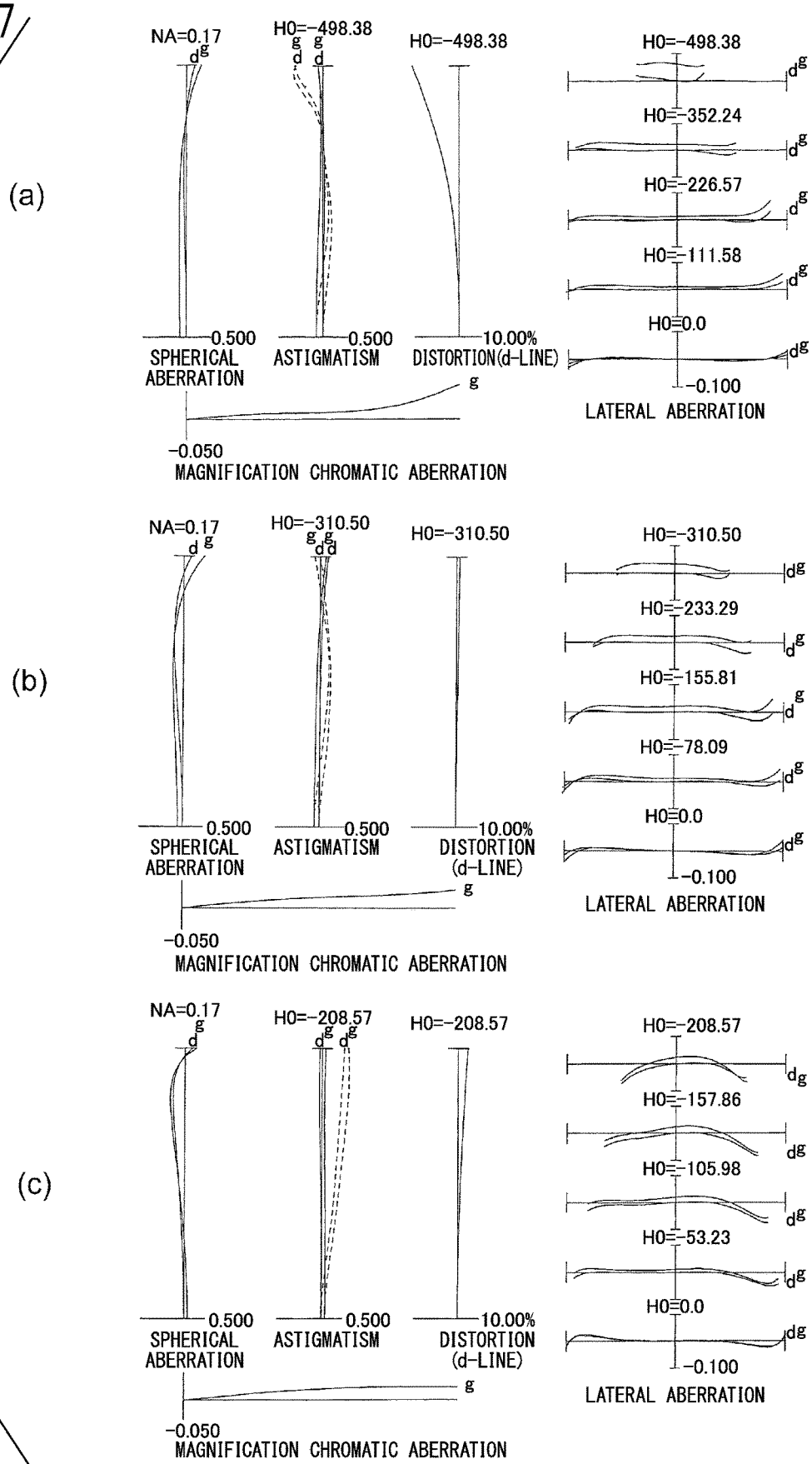
FIG. 27 shows graphs illustrating various aberrations of the variable magnification optical system according to Example 7 upon focusing on a close point, wherein parts (a), (b), and (c) are in the wide-angle end state, the intermediate focal length state, and the telephoto end state, respectively.
Figure 28:
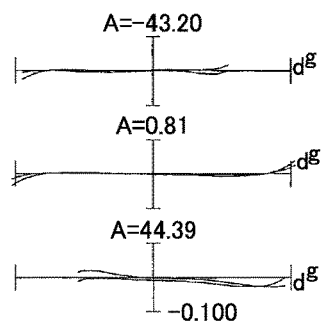
FIG. 28 shows graphs illustrating lateral aberrations of the variable magnification optical system according to Example 7 after image blur correction was performed upon focusing on infinity, wherein parts (a), (b), and (c) are in the wide-angle end state, the intermediate focal length state, and the telephoto end state, respectively.
Figure 28:
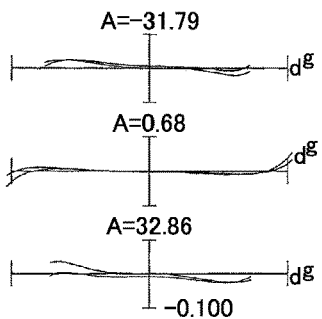
Figure 28:
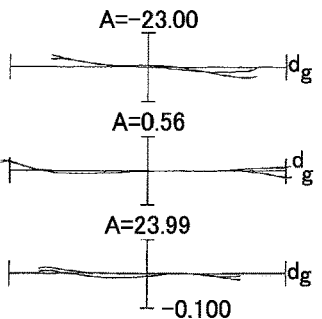

FIG. 26 shows graphs illustrating various aberrations (spherical aberration, astigmatism, distortion, magnification chromatic aberration, and lateral aberration) upon focusing on infinity, of the variable magnification optical system ZL7 according to Example 7, in which part (a) illustrates the wide-angle end state, part (b) illustrates the intermediate focal length state, and part (c) illustrates the telephoto end state. FIG. 27 shows graphs illustrating various aberrations (spherical aberration, astigmatism, distortion, magnification chromatic aberration, and lateral aberration) upon focusing on a close point, of the variable magnification optical system ZL7 according to Example 7, in which part (a) illustrates the wide-angle end state, part (b) illustrates the intermediate focal length state, and part (c) illustrates the telephoto end state. FIG. 28 shows graphs illustrating lateral aberration of the variable magnification optical system ZL7 according to Example 7 when image blur correction is performed upon focusing on infinity, in which part (a) illustrates the wide-angle end state, part (b) illustrates the intermediate focal length state, and part (c) illustrates the telephoto end state.

It can be understood from FIGS. 26 to 28 that the variable magnification optical system ZL7 according to Example 7 has a satisfactory optical performance such that aberrations are satisfactorily corrected in states ranging from the wide-angle end state to the telephoto end state and from the focusing-on-infinity state to the focusing-on-close-point state. Moreover, it can be understood that the variable magnification optical system ZL7 has an excellent imaging performance upon image blur correction.

Example 8

Figure 29:
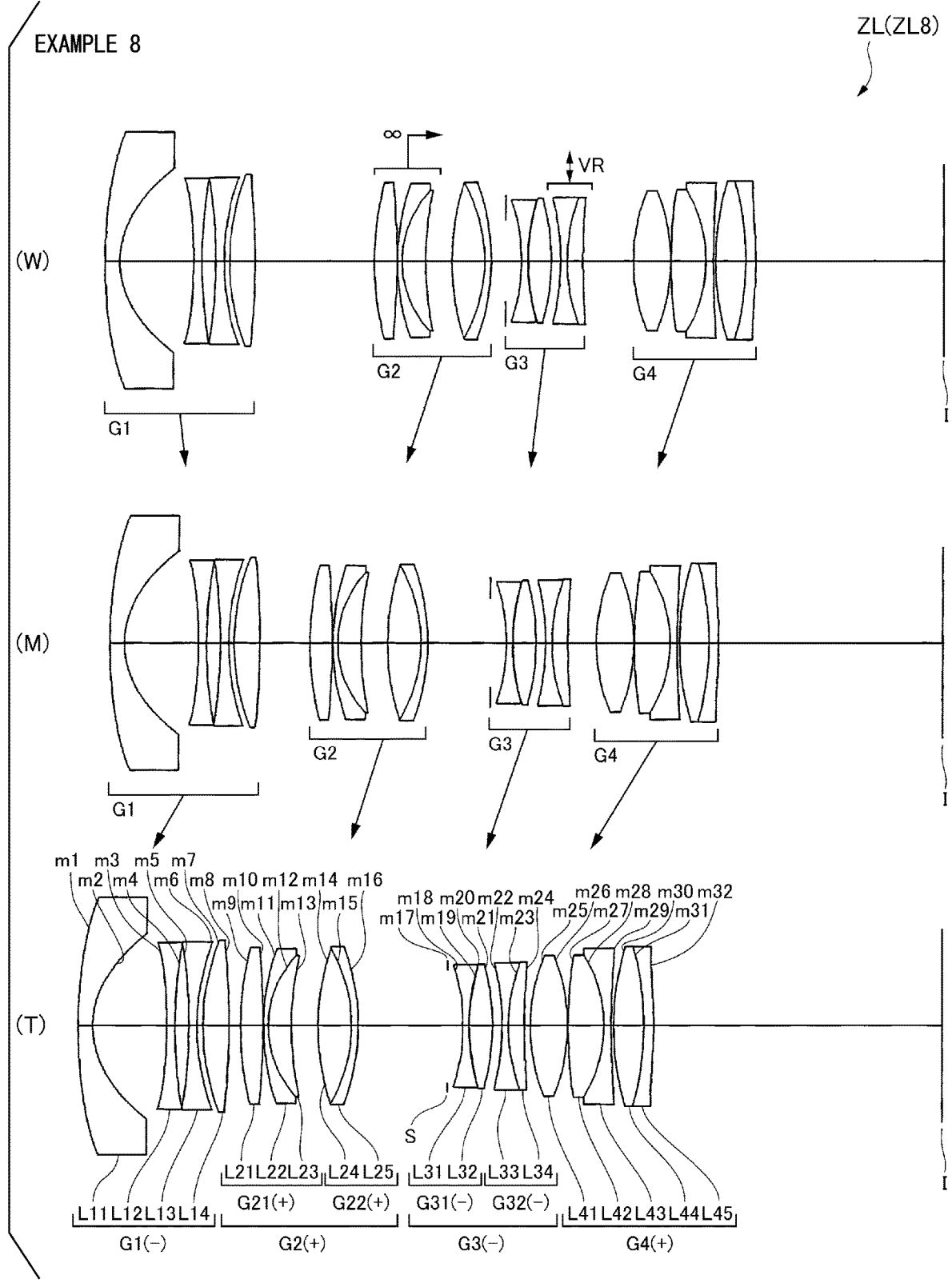
FIG. 29 is a cross-sectional view of a variable magnification optical system according to Example 8, wherein parts (W), (M), and (T) are in a wide-angle end state, an intermediate focal length state, and a telephoto end state, respectively.

Example 8 will be described with reference to FIGS. 29 to 32 and Table 8. As illustrated in FIG. 29, a variable magnification optical system ZL (ZL8) according to Example 8 is constituted by, in order from an object, a first lens group G1 having a negative refractive power; a second lens group G2 having a positive refractive power; a third lens group G3 having a negative refractive power; and a fourth lens group G4 having a positive refractive power.

The first lens group G1 is constituted by, in order from the object, a negative meniscus lens L11 having a concave surface oriented toward an image side, a biconcave lens L12, a biconcave lens L13, and a biconvex lens L14. The negative meniscus lens L11 is a glass-molded aspherical lens of which the lens surfaces on both sides are aspherical surfaces. Moreover, the biconcave lens L12 is a glass-molded aspherical lens of which the lens surface on the object side is an aspherical surface.

The second lens group G2 is constituted by, in order from the object, a 21st lens group G21 having a positive refractive power and a 22nd lens group G22 having a positive refractive power. The 21st lens group G21 is constituted by, in order from the object, a biconvex lens L21 and a cemented lens including a negative meniscus lens L22 having a concave surface oriented toward the image side and a positive meniscus lens L23 having a convex surface oriented toward the object side. The 22nd lens group G22 is constituted by, in order from the object, a cemented lens including a biconvex lens L24 and a negative meniscus lens L25 having a concave surface oriented toward the object side.

The third lens group G3 is constituted by, in order from the object, a 31st lens group G31 having a negative refractive power and a 32nd lens group G32 having a negative refractive power. The 31st lens group G31 is constituted by, in order from the object, a biconcave lens L31 and a biconvex lens L32. The 32nd lens group G32 is constituted by, in order from the object, a cemented lens including a biconcave lens L33 and a positive meniscus lens L34 having a convex surface oriented toward the object side. The positive meniscus lens L34 is a glass-molded aspherical lens of which the lens surface on the image side is an aspherical surface.

The fourth lens group G4 is constituted by, in order from the object, a biconvex lens L41, a cemented lens including a biconvex lens L42 and a biconcave lens L43, and a cemented lens including a biconvex lens L44 and a negative meniscus lens L45 having a concave surface oriented toward the object side. The negative meniscus lens L45 is a glass-molded aspherical lens of which the lens surface on the image side is an aspherical surface.

An aperture stop S is provided between the second lens group G2 and the third lens group G3, and the aperture stop S forms the third lens group G3.

Varying magnification from the wide-angle end state to the telephoto end state is performed by moving the first lens group G1 toward the image side and then moving the first lens group G1 toward the object side, and moving the second lens group G2, the third lens group G3, and the fourth lens group G4 toward the object side such that the distances between the respective lens groups (the distance between the first and second lens groups G1 and G2, the distance between the second and third lens groups G2 and G3, and the distance between the third and fourth lens groups G4) are changed. The aperture stop S is moved toward the object side integrally with the third lens group G3.

Focusing from infinity to an object at a close distance is performed by moving the 21st lens group G21 toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K. The 31st lens group G31 positioned at an object-side of the 32nd lens group G32 is immovable during image blur correction.

In Example 8, in the wide-angle end state, since the vibration reduction coefficient is −0.94 and the focal length is 16.40 mm, the moving distance of the vibration-reduction lens group VR for correcting the rotation blur of 0.81° is −0.25 mm. In the intermediate focal length state, since the vibration reduction coefficient is −1.09 and the focal length is 24.50 mm, the moving distance of the vibration-reduction lens group VR for correcting the rotation blur of 0.67° is −0.26 mm. In the telephoto end state, since the vibration reduction coefficient is −1.39 and the focal length is 34.00 mm, the moving distance of the vibration-reduction lens group VR for correcting the rotation blur of 0.57° is −0.24 mm.

Table 8 illustrates the values of respective specifications of Example 8. Surface numbers 1 to 32 in Table 8 correspond to optical surfaces of m1 to m32 illustrated in FIG. 29.

TABLE 8

[Lens Specification]

| Surface number | R | D | nd | vd |
|---|---|---|---|---|
| *1 | 118.11493 | 3.000 | 1.76690 | 46.9 |
| *2 | 18.50197 | 15.261 | 1.00000 | |
| *3 | −116.47550 | 1.700 | 1.76690 | 46.9 |
| 4 | 99.79733 | 2.879 | 1.00000 | |
| 5 | −111.98406 | 1.700 | 1.49700 | 81.7 |
| 6 | 50.34852 | 1.200 | 1.00000 | |
| 7 | 48.79982 | 5.385 | 1.75520 | 27.6 |
| 8 | −178.95096 | (D8) | 1.00000 | |
| 9 | 65.28171 | 4.673 | 1.64769 | 33.7 |
| 10 | −174.54058 | 0.100 | 1.00000 | |
| 11 | 48.60726 | 1.000 | 1.84666 | 23.8 |
| 12 | 21.59175 | 4.835 | 1.60342 | 38.0 |
| 13 | 70.71902 | (D13) | 1.00000 | |
| 14 | 52.04753 | 6.934 | 1.49700 | 81.7 |
| 15 | −32.71006 | 1.400 | 1.84666 | 23.8 |
| 16 | −47.15395 | (D16) | 1.00000 | |
| 17 | (Aperture stop) | 3.263 | 1.00000 | |
| 18 | −39.13637 | 1.300 | 1.90366 | 31.3 |
| 19 | 45.27882 | 0.100 | 1.00000 | |
| 20 | 44.76406 | 4.806 | 1.84666 | 23.8 |
| 21 | −47.87829 | 2.000 | 1.00000 | |
| 22 | −52.76760 | 1.300 | 1.80400 | 46.6 |
| 23 | 37.74504 | 3.318 | 1.80518 | 25.4 |
| *24 | 146.86303 | (D24) | 1.00000 | |
| 25 | 37.72449 | 7.793 | 1.49700 | 81.7 |
| 26 | −39.14542 | 0.100 | 1.00000 | |
| 27 | 98.93544 | 7.448 | 1.49700 | 81.7 |
| 28 | −28.00000 | 1.500 | 1.74950 | 35.2 |
| 29 | 206.14892 | 0.500 | 1.00000 | |
| 30 | 59.16975 | 6.270 | 1.49700 | 81.7 |
| 31 | −61.60359 | 2.000 | 1.80610 | 41.0 |
| *32 | −100.28613 | (D32) | 1.00000 | |

[Aspheric Data]

| Surface | κ | A4 | A6 | A8 | A10 |
|---|---|---|---|---|---|
| 1 | 1.00000e+00 | 2.40178e−06 | −8.95764e−13 | −3.96805e−12 | 4.67920e−15 |
| 2 | 0.00000e+00 | 7.02698e−06 | 3.10152e−09 | 4.96276e−11 | −1.36720e−13 |
| 3 | 1.00000e+00 | −4.79760e−06 | 4.18425e−09 | −2.12106e−11 | −4.47103e−14 |
| 24 | 1.00000e+00 | −2.30912e−06 | 3.28341e−10 | 7.64754e−12 | −1.27403e−14 |
| 32 | 1.00000e+00 | 8.57278e−06 | 4.99626e−09 | 2.15301e−12 | 9.13336e−15 |

[Various Data]

| | W | M | T |
|---|---|---|---|
| f | 16.40 | 24.50 | 34.00 |
| FNo | 2.82 | 2.94 | 2.87 |
| ω | 53.7 | 39.4 | 30.2 |
| Y | 20.00 | 20.00 | 20.00 |
| TL | 174.752 | 173.397 | 179.619 |
| BF | 39.319 | 46.677 | 60.163 |

TABLE 8-continued

[Variable Distance Data]

|  | Focusing on infinity | | | Focusing on close point | | |
| --- | --- | --- | --- | --- | --- | --- |
|  | W | M | T | W | M | T |
| D0 | ∞ | ∞ | ∞ | 325.25 | 326.60 | 320.38 |
| β | — | — | — | −0.0468 | −0.0700 | −0.0991 |
| f | 16.40 | 24.50 | 34.00 | — | — | — |
| D8 | 24.760 | 10.384 | 2.515 | 26.284 | 12.053 | 4.367 |
| D13 | 5.472 | 5.472 | 5.472 | 3.948 | 3.803 | 3.621 |
| D16 | 3.000 | 13.194 | 18.503 | 3.000 | 13.194 | 18.503 |
| D24 | 10.436 | 5.904 | 1.200 | 10.436 | 5.904 | 1.200 |
| D32 | 39.319 | 46.677 | 60.163 | 39.319 | 46.677 | 60.163 |

[Lens Group Data]

| Lens group | Starting surface | Focal length |
| --- | --- | --- |
| 1st lens group | 1 | −22.80 |
| 2nd lens group | 9 | 39.76 |
| 21st lens group | 9 | 82.98 |
| 22nd lens group | 14 | 60.60 |
| 3rd lens group | 17 | −35.94 |
| 31st lens group | 17 | −203.19 |
| 32nd lens group | 22 | −47.84 |
| 4th lens group | 25 | 35.84 |

[Conditional Expression Correspondence Value]

Conditional Expression (1)     f1/f3 = 0.635
Conditional Expression (2)     f32/f3 = 1.331
Conditional Expression (3)     f4/f2 = 0.901
Conditional Expression (4)     A(T3.5)/A(T4.0) = 1.738

It can be understood from Table 8 that the variable magnification optical system ZL8 according to Example 8 satisfies Conditional Expressions (1) to (4).

Figure 30:
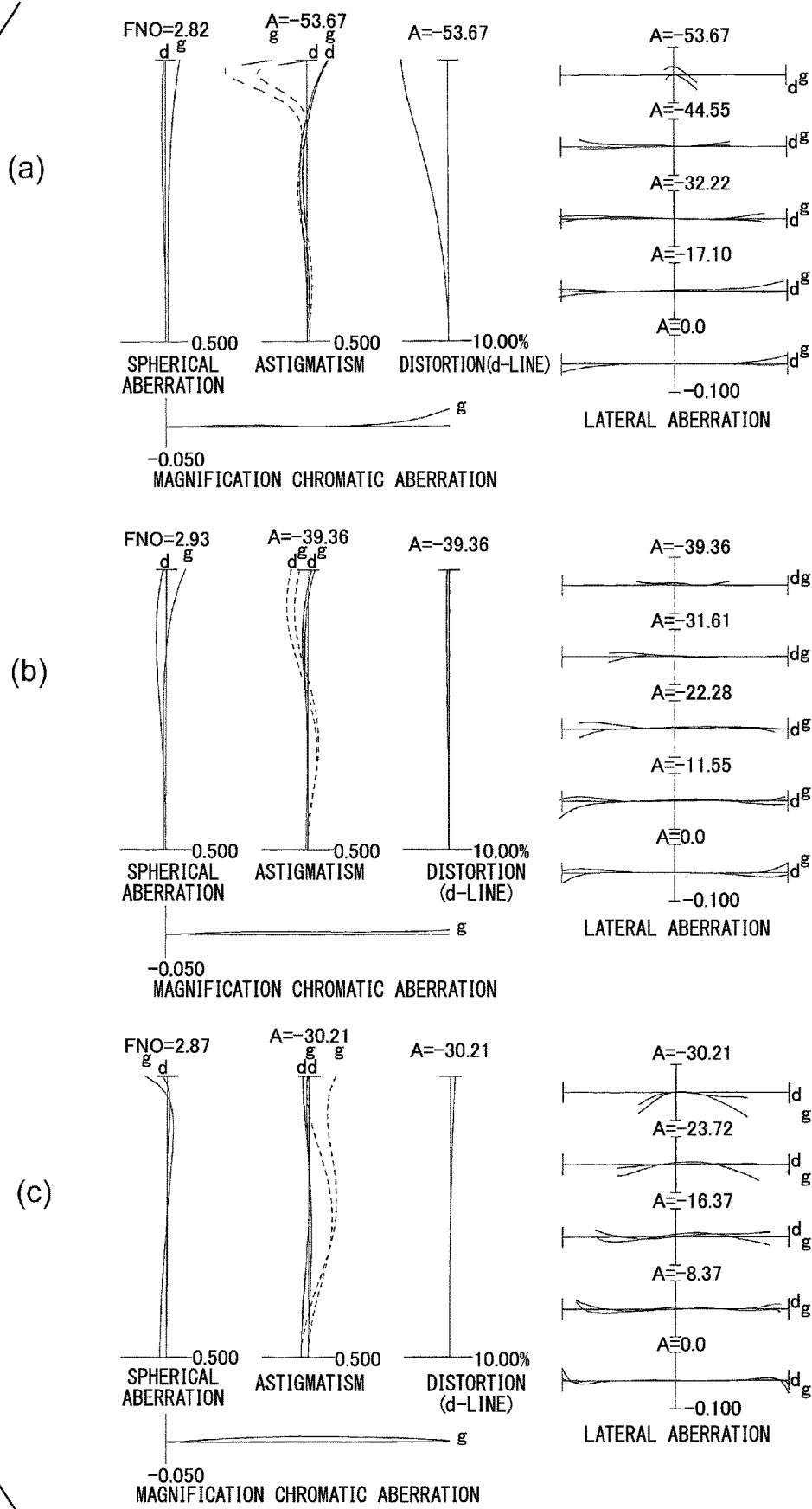
FIG. 30 shows graphs illustrating various aberrations of the variable magnification optical system according to Example 8 upon focusing on infinity, wherein parts (a), (b), and (c) are in the wide-angle end state, the intermediate focal length state, and the telephoto end state, respectively.
Figure 31:
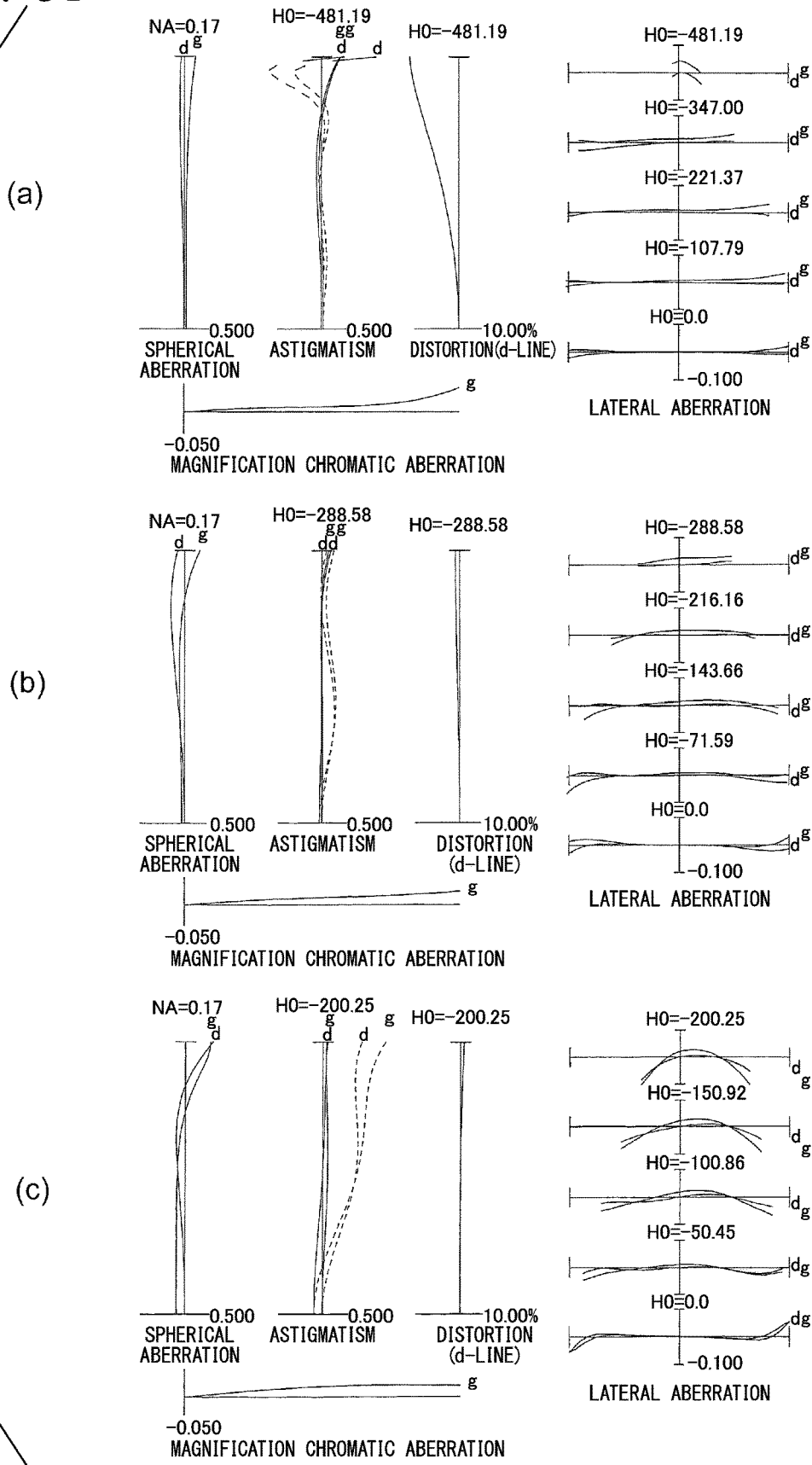
FIG. 31 shows graphs illustrating various aberrations of the variable magnification optical system according to Example 8 upon focusing on a close point, wherein parts (a), (b), and (c) are in the wide-angle end state, the intermediate focal length state, and the telephoto end state, respectively.
Figure 32:
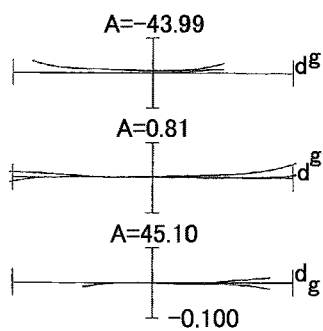
FIG. 32 shows graphs illustrating lateral aberrations of the variable magnification optical system according to Example 8 after image blur correction was performed upon focusing on infinity, wherein parts (a), (b), and (c) are in the wide-angle end state, the intermediate focal length state, and the telephoto end state, respectively.
Figure 32:
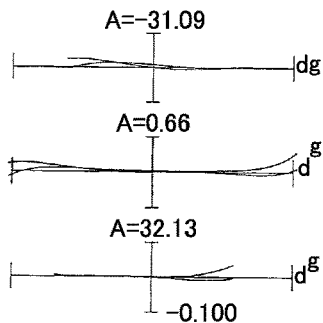
Figure 32:
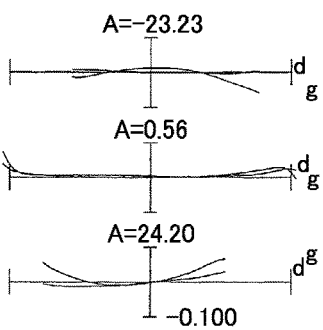

FIG. 30 shows graphs illustrating various aberrations (spherical aberration, astigmatism, distortion, magnification chromatic aberration, and lateral aberration) upon focusing on infinity, of the variable magnification optical system ZL8 according to Example 8, in which part (a) illustrates the wide-angle end state, part (b) illustrates the intermediate focal length state, and part (c) illustrates the telephoto end state. FIG. 31 shows graphs illustrating various aberrations (spherical aberration, astigmatism, distortion, magnification chromatic aberration, and lateral aberration) upon focusing on a close point, of the variable magnification optical system ZL8 according to Example 8, in which part (a) illustrates the wide-angle end state, part (b) illustrates the intermediate focal length state, and part (c) illustrates the telephoto end state. FIG. 32 shows graphs illustrating lateral aberration of the variable magnification optical system ZL8 according to Example 8 when image blur correction is performed upon focusing on infinity, in which part (a) illustrates the wide-angle end state, part (b) illustrates the intermediate focal length state, and part (c) illustrates the telephoto end state.

It can be understood from FIGS. 30 to 32 that the variable magnification optical system ZL8 according to Example 8 has a satisfactory optical performance such that aberrations are satisfactorily corrected in states ranging from the wide-angle end state to the telephoto end state and from the focusing-on-infinity state to the focusing-on-close-point state. Moreover, it can be understood that the variable magnification optical system ZL8 has an excellent imaging performance upon image blur correction.

Example 9

Figure 33:
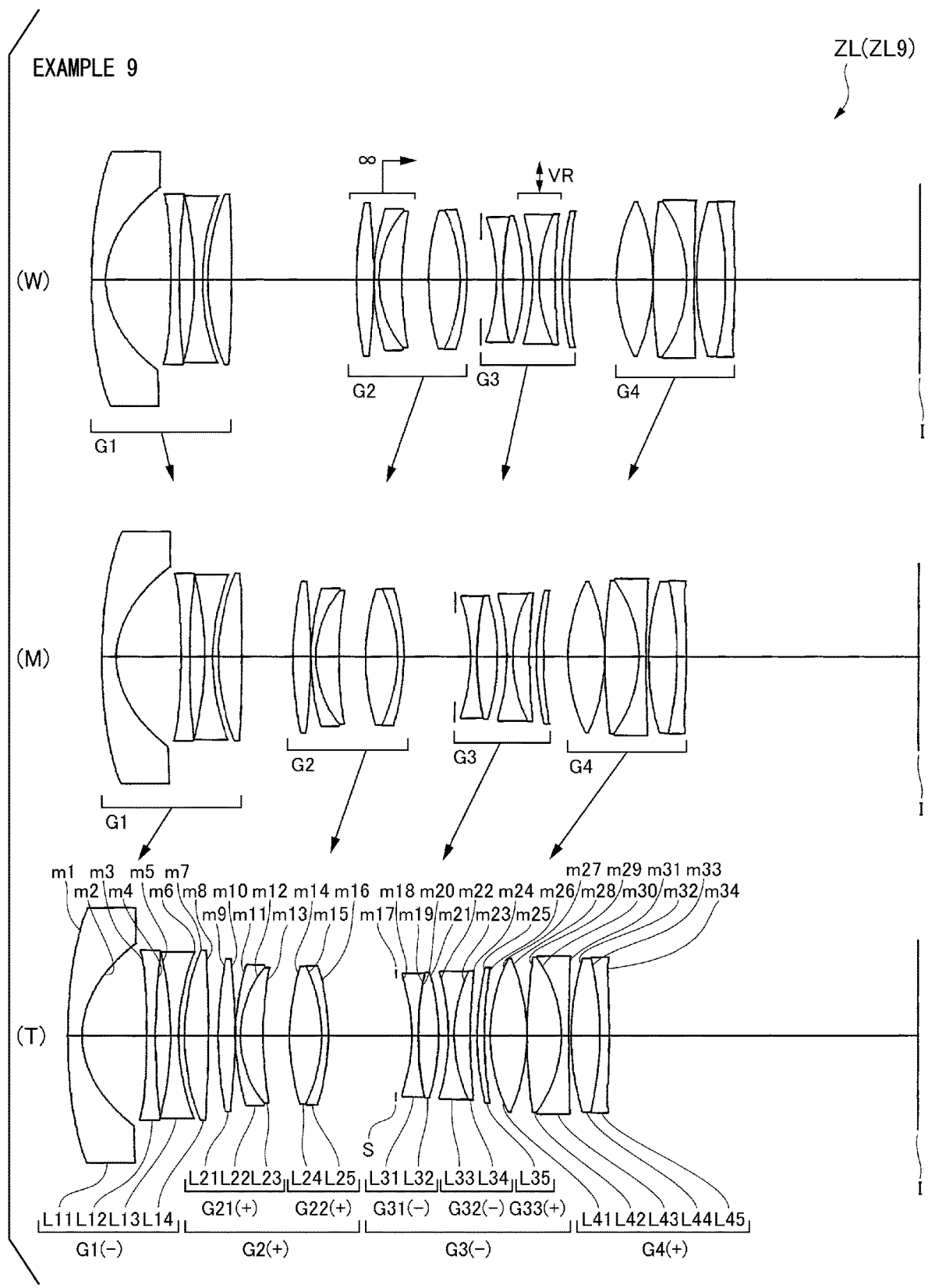
FIG. 33 is a cross-sectional view of a variable magnification optical system according to Example 9, wherein parts (W), (M), and (T) are in a wide-angle end state, an intermediate focal length state, and a telephoto end state, respectively.

Example 9 will be described with reference to FIGS. 33 to 36 and Table 9. As illustrated in FIG. 33, a variable magnification optical system ZL (ZL9) according to Example 9 is constituted by, in order from an object, a first lens group G1 having a negative refractive power; a second lens group G2 having a positive refractive power; a third lens group G3 having a negative refractive power; and a fourth lens group G4 having a positive refractive power.

The first lens group G1 is constituted by, in order from the object, a negative meniscus lens L11 having a concave surface oriented toward an image side, a biconcave lens L12, a biconcave lens L13, and a biconvex lens L14. The negative meniscus lens L11 is a glass-molded aspherical lens of which the lens surfaces on both sides are aspherical surfaces. Moreover, the biconcave lens L12 is a glass-molded aspherical lens of which the lens surface on the object side is an aspherical surface.

The second lens group G2 is constituted by, in order from the object, a 21st lens group G21 having a positive refractive power and a 22nd lens group G22 having a positive refractive power. The 21st lens group G21 is constituted by, in order from the object, a biconvex lens L21 and a cemented lens including a negative meniscus lens L22 having a concave surface oriented toward the image side and a positive meniscus lens L23 having a convex surface oriented toward the object side. The 22nd lens group G22 is constituted by, in order from the object, a cemented lens including a biconvex lens L24 and a negative meniscus lens L25 having a concave surface oriented toward the object side.

The third lens group G3 is constituted by, in order from the object, a 31st lens group G31 having a negative refractive power, a 32nd lens group G32 having a negative refractive power, and a 33rd lens group G33 having a positive refractive power. The 31st lens group G31 is constituted by, in order from the object, a biconcave lens L31 and a biconvex lens L32. The 32nd lens group G32 is constituted by a cemented lens including, in order from the object, a biconcave lens L33 and a positive meniscus lens L34 having a convex surface oriented toward the object side. The 33rd lens group G33 is constituted by a positive meniscus lens L35 having a convex surface oriented toward the object side. The positive meniscus lens L34 is a glass-molded aspherical lens of which the lens surface on the image side is an aspherical surface.

The fourth lens group G4 is constituted by, in order from the object, a biconvex lens L41, a cemented lens including a biconvex lens L42 and a biconcave lens L43, and a cemented lens including a biconvex lens L44 and a negative meniscus lens L45 having a concave surface oriented toward the object side. The negative meniscus lens L45 is a glass-molded aspherical lens of which the lens surface on the image side is an aspherical surface.

An aperture stop S is provided between the second lens group G2 and the third lens group G3, and the aperture stop S forms the third lens group G3.

Varying magnification from the wide-angle end state to the telephoto end state is performed by moving the first lens group G1 toward the image side and then moving the first lens group G1 toward the object side, and moving the second lens group G2, the third lens group G3, and the fourth lens group G4 toward the object side such that the distances between the respective lens groups (the distance between the first and second lens groups G1 and G2, the distance between the second and third lens groups G2 and G3, and the distance between the third and fourth lens groups G4) are changed. The aperture stop S is moved toward the object side integrally with the third lens group G3.

Focusing from infinity to an object at a close distance is performed by moving the 21st lens group G21 toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K. The 31st lens group G31 and the 33rd lens group G33 positioned on both sides of the 32nd lens group G32 are immovable during image blur correction.

In Example 9, in the wide-angle end state, since the vibration reduction coefficient is −1.10 and the focal length is 16.40 mm, the moving distance of the vibration-reduction lens group VR for correcting the rotation blur of 0.81° is −0.21 mm. In the intermediate focal length state, since the vibration reduction coefficient is −1.30 and the focal length is 24.50 mm, the moving distance of the vibration-reduction lens group VR for correcting the rotation blur of 0.67° is −0.22 mm. In the telephoto end state, since the vibration reduction coefficient is −1.67 and the focal length is 34.00 mm, the moving distance of the vibration-reduction lens group VR for correcting the rotation blur of 0.57° is −0.20 mm.

Table 9 illustrates the values of respective specifications of Example 9. Surface numbers 1 to 34 in Table 9 correspond to optical surfaces of m1 to m34 illustrated in FIG. 33.

TABLE 9

[Lens Specification]

| Surface number | R | D | nd | vd |
|---|---|---|---|---|
| *1 | 120.11174 | 3.000 | 1.76690 | 46.9 |
| *2 | 18.42119 | 13.635 | 1.00000 | |
| *3 | −200.00000 | 1.800 | 1.76690 | 46.9 |
| 4 | 150.83577 | 3.187 | 1.00000 | |
| 5 | −71.42255 | 1.700 | 1.49700 | 81.7 |
| 6 | 48.32790 | 1.200 | 1.00000 | |
| 7 | 47.89535 | 5.085 | 1.75520 | 27.6 |
| 8 | −307.69627 | (D8) | 1.00000 | |
| 9 | 78.39566 | 3.691 | 1.64769 | 33.7 |
| 10 | −136.82539 | 0.100 | 1.00000 | |
| 11 | 51.47266 | 1.000 | 1.84666 | 23.8 |
| 12 | 22.82138 | 4.835 | 1.60342 | 38.0 |
| 13 | 80.58386 | (D13) | 1.00000 | |
| 14 | 49.88728 | 6.745 | 1.49700 | 81.7 |
| 15 | −33.90595 | 1.400 | 1.84666 | 23.8 |
| 16 | −49.81662 | (D16) | 1.00000 | |
| 17 | (Aperture stop) | 3.263 | 1.00000 | |
| 18 | −39.95312 | 1.300 | 1.90366 | 31.3 |
| 19 | 64.01831 | 0.100 | 1.00000 | |
| 20 | 63.23831 | 4.284 | 1.84666 | 23.8 |
| 21 | −44.37778 | 2.000 | 1.00000 | |
| 22 | −46.75918 | 1.300 | 1.80400 | 46.6 |
| 23 | 31.68983 | 3.419 | 1.80518 | 25.4 |
| *24 | 114.35109 | 1.500 | 1.00000 | |
| 25 | 63.56480 | 1.500 | 1.51680 | 63.9 |
| 26 | 86.50782 | (D26) | 1.00000 | |
| 27 | 36.38921 | 7.703 | 1.49700 | 81.7 |
| 28 | −41.41376 | 0.100 | 1.00000 | |
| 29 | 124.18153 | 7.172 | 1.49700 | 81.7 |
| 30 | −28.00000 | 1.500 | 1.74950 | 35.2 |
| 31 | 342.75794 | 0.500 | 1.00000 | |

TABLE 9-continued

| | | | | |
|---|---|---|---|---|
| 32 | 55.54397 | 6.114 | 1.49700 | 81.7 |
| 33 | −70.97654 | 2.000 | 1.80610 | 41.0 |
| *34 | −134.68679 | (D34) | 1.00000 | |

[Aspheric Data]

| Surface | κ | A4 | A6 | A8 | A10 |
|---|---|---|---|---|---|
| 1 | 1.00000e+00 | 2.01132e−06 | 2.29749e−10 | −3.77587e−12 | 4.80583e−15 |
| 2 | 0.00000e+00 | 6.00527e−06 | 7.03155e−09 | 1.86429e−11 | −6.86773e−14 |
| 3 | 1.00000e+00 | −4.66953e−06 | 2.82914e−09 | −1.27985e−11 | −4.47305e−14 |
| 24 | 1.00000e+00 | −2.84048e−06 | −2.44667e−11 | 8.10427e−12 | 8.75587e−16 |
| 34 | 1.00000e+00 | 9.32637e−06 | 4.56571e−09 | 4.94800e−12 | 6.31371e−15 |

[Various Data]

| | W | M | T |
|---|---|---|---|
| f | 16.40 | 24.50 | 34.00 |
| FNo | 2.89 | 2.90 | 2.89 |
| ω | 53.7 | 39.7 | 30.5 |
| Y | 20.00 | 20.00 | 20.00 |
| TL | 175.322 | 172.751 | 179.617 |
| BF | 39.318 | 49.232 | 65.386 |

[Variable Distance Data]

| | Focusing on infinity | | | Focusing on close point | | |
|---|---|---|---|---|---|---|
| | W | M | T | W | M | T |
| D0 | ∞ | ∞ | ∞ | 324.68 | 327.25 | 320.38 |
| β | — | — | — | −0.0469 | −0.0698 | −0.0992 |
| f | 16.40 | 24.50 | 34.00 | — | — | — |
| D8 | 26.346 | 10.812 | 2.000 | 27.875 | 12.502 | 3.913 |
| D13 | 5.609 | 5.609 | 5.609 | 4.079 | 3.918 | 3.695 |
| D16 | 3.000 | 10.824 | 14.289 | 3.000 | 10.824 | 14.289 |
| D26 | 9.915 | 5.142 | 1.200 | 9.915 | 5.142 | 1.200 |
| D34 | 39.318 | 49.232 | 65.386 | 39.318 | 49.232 | 65.386 |

[Lens Group Data]

| Lens group | Starting surface | Focal length |
|---|---|---|
| 1st lens group | 1 | −22.80 |
| 2nd lens group | 9 | 39.72 |
| 21st lens group | 9 | 83.67 |
| 22nd lens group | 14 | 61.18 |
| 3rd lens group | 17 | −37.17 |
| 31st lens group | 17 | −353.13 |
| 32nd lens group | 22 | −40.79 |
| 33rd leng group | 25 | 453.66 |
| 4th lens group | 27 | 36.44 |

[Conditional Expression Correspondence Value]

| | |
|---|---|
| Conditional Expression (1) | f1/f3 = 0.613 |
| Conditional Expression (2) | f32/f3 = 1.098 |
| Conditional Expression (3) | f4/f2 = 0.917 |
| Conditional Expression (4) | A(T3.5)/A(T4.0) = 1.741 |

It can be understood from Table 9 that the variable magnification optical system ZL9 according to Example 9 satisfies Conditional Expressions (1) to (4).

Figure 34:
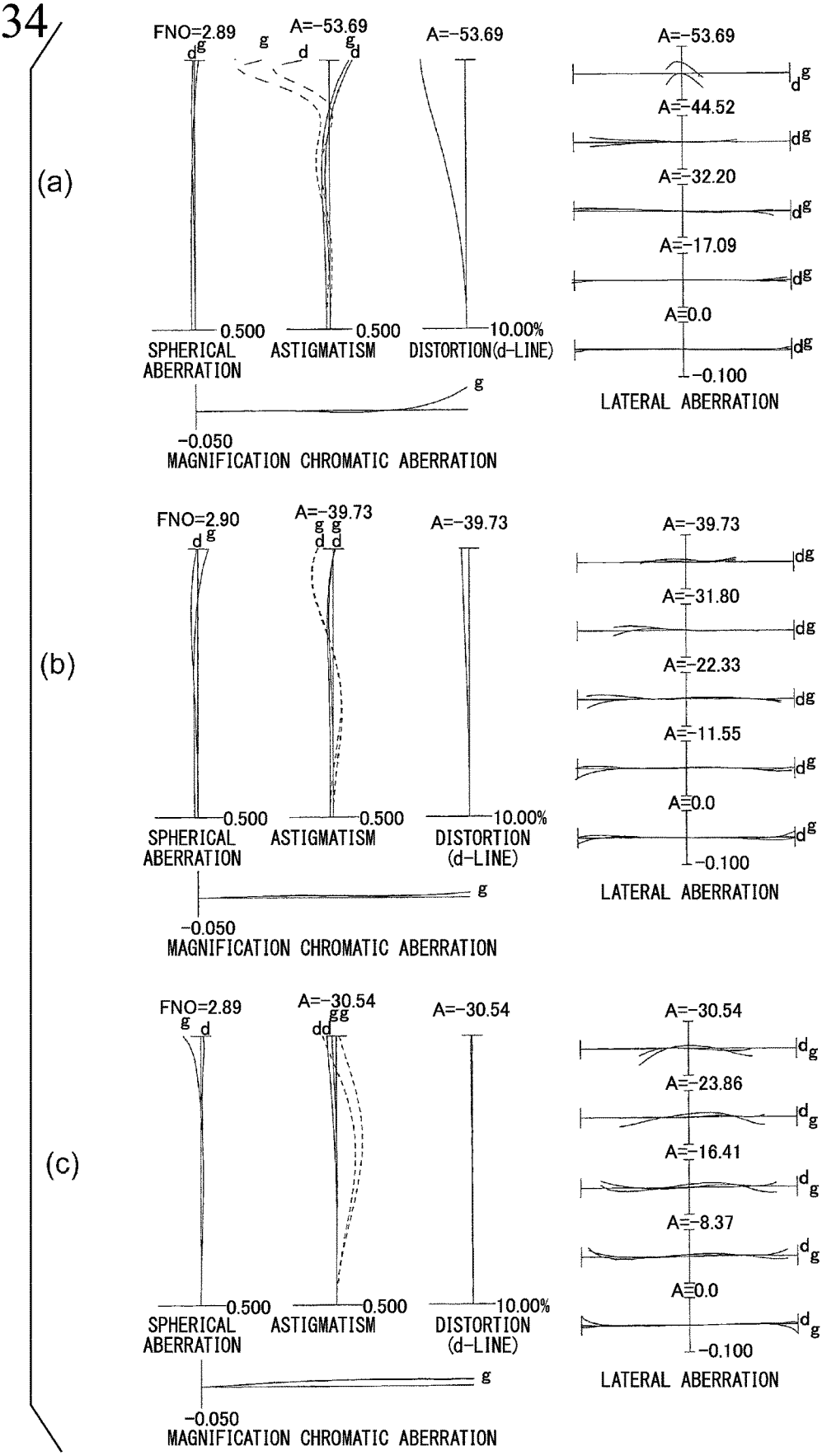
FIG. 34 shows graphs illustrating various aberrations of the variable magnification optical system according to Example 9 upon focusing on infinity, wherein parts (a), (b), and (c) are in the wide-angle end state, the intermediate focal length state, and the telephoto end state, respectively.
Figure 35:
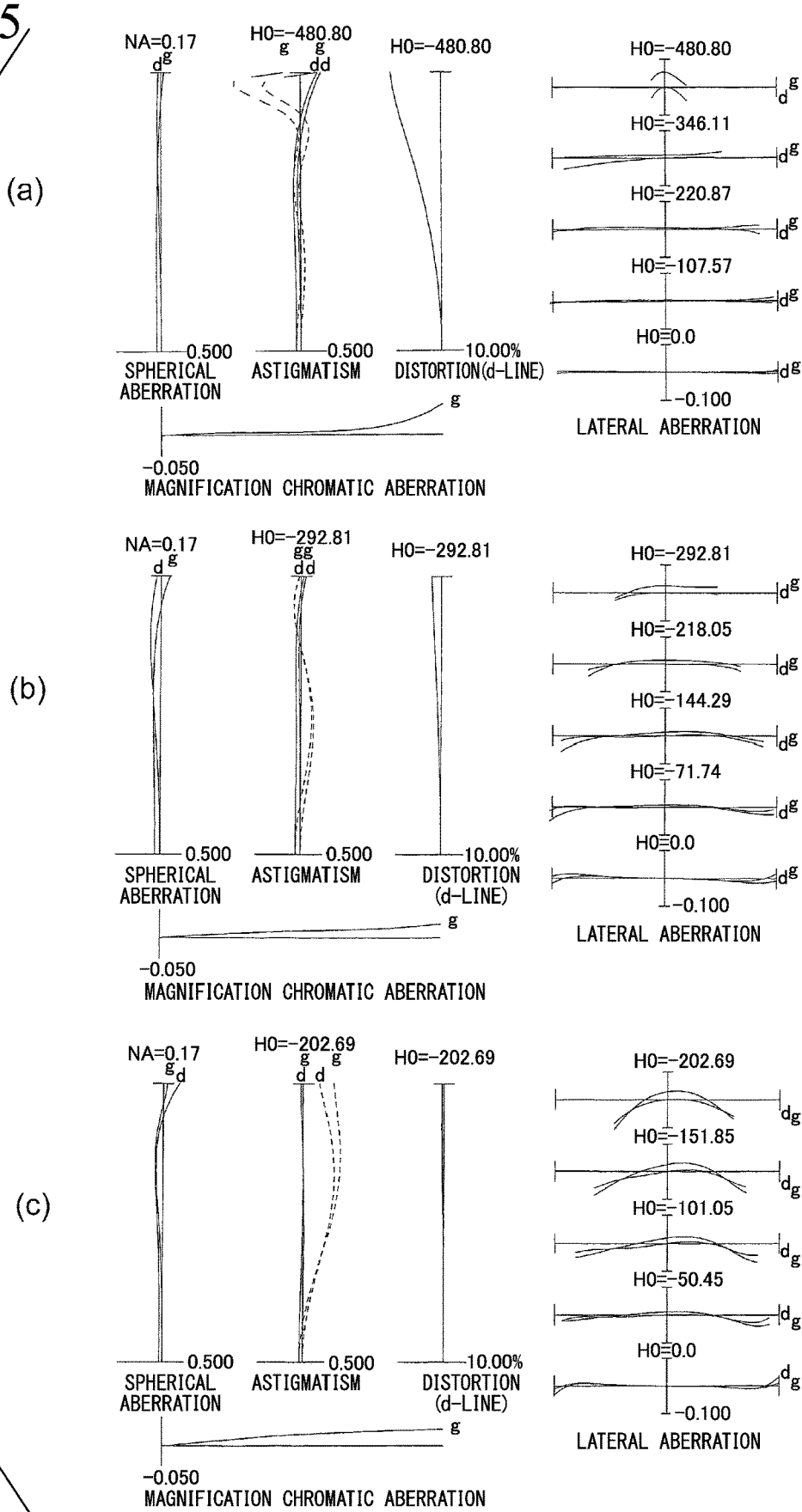
FIG. 35 shows graphs illustrating various aberrations of the variable magnification optical system according to Example 9 upon focusing on a close point, wherein parts (a), (b), and (c) are in the wide-angle end state, the intermediate focal length state, and the telephoto end state, respectively.
Figure 36:
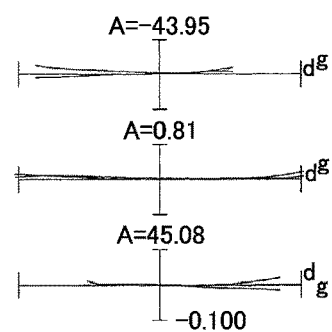
FIG. 36 shows graphs illustrating lateral aberrations of the variable magnification optical system according to Example 9 after image blur correction was performed upon focusing on infinity, wherein parts (a), (b), and (c) are in the wide-angle end state, the intermediate focal length state, and the telephoto end state, respectively.
Figure 36:
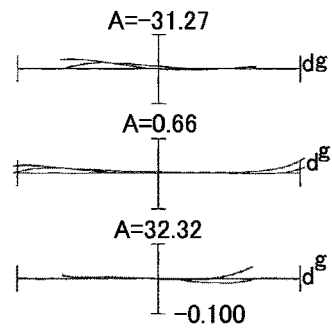
Figure 36:
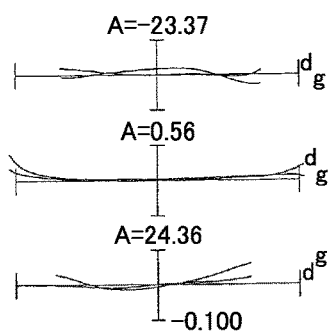

FIG. 34 shows graphs illustrating various aberrations (spherical aberration, astigmatism, distortion, magnification chromatic aberration, and lateral aberration) upon focusing on infinity, of the variable magnification optical system ZL9 according to Example 9, in which part (a) illustrates the wide-angle end state, part (b) illustrates the intermediate focal length state, and part (c) illustrates the telephoto end state. FIG. 35 shows graphs illustrating various aberrations (spherical aberration, astigmatism, distortion, magnification chromatic aberration, and lateral aberration) upon focusing on a close point, of the variable magnification optical system ZL9 according to Example 9, in which part (a) illustrates the wide-angle end state, part (b) illustrates the intermediate focal length state, and part (c) illustrates the telephoto end state. FIG. 36 shows graphs illustrating lateral aberration of the variable magnification optical system ZL9 according to Example 9 when image blur correction is performed upon focusing on infinity, in which part (a) illustrates the wide-angle end state, part (b) illustrates the intermediate focal length state, and part (c) illustrates the telephoto end state.

It can be understood from FIGS. 34 to 36 that the variable magnification optical system ZL9 according to Example 9 has a satisfactory optical performance such that aberrations are satisfactorily corrected in states ranging from the wide-angle end state to the telephoto end state and from the focusing-on-infinity state to the focusing-on-close-point state. Moreover, it can be understood that the variable magnification optical system ZL9 has an excellent imaging performance upon image blur correction.

Example 10

Figure 37:
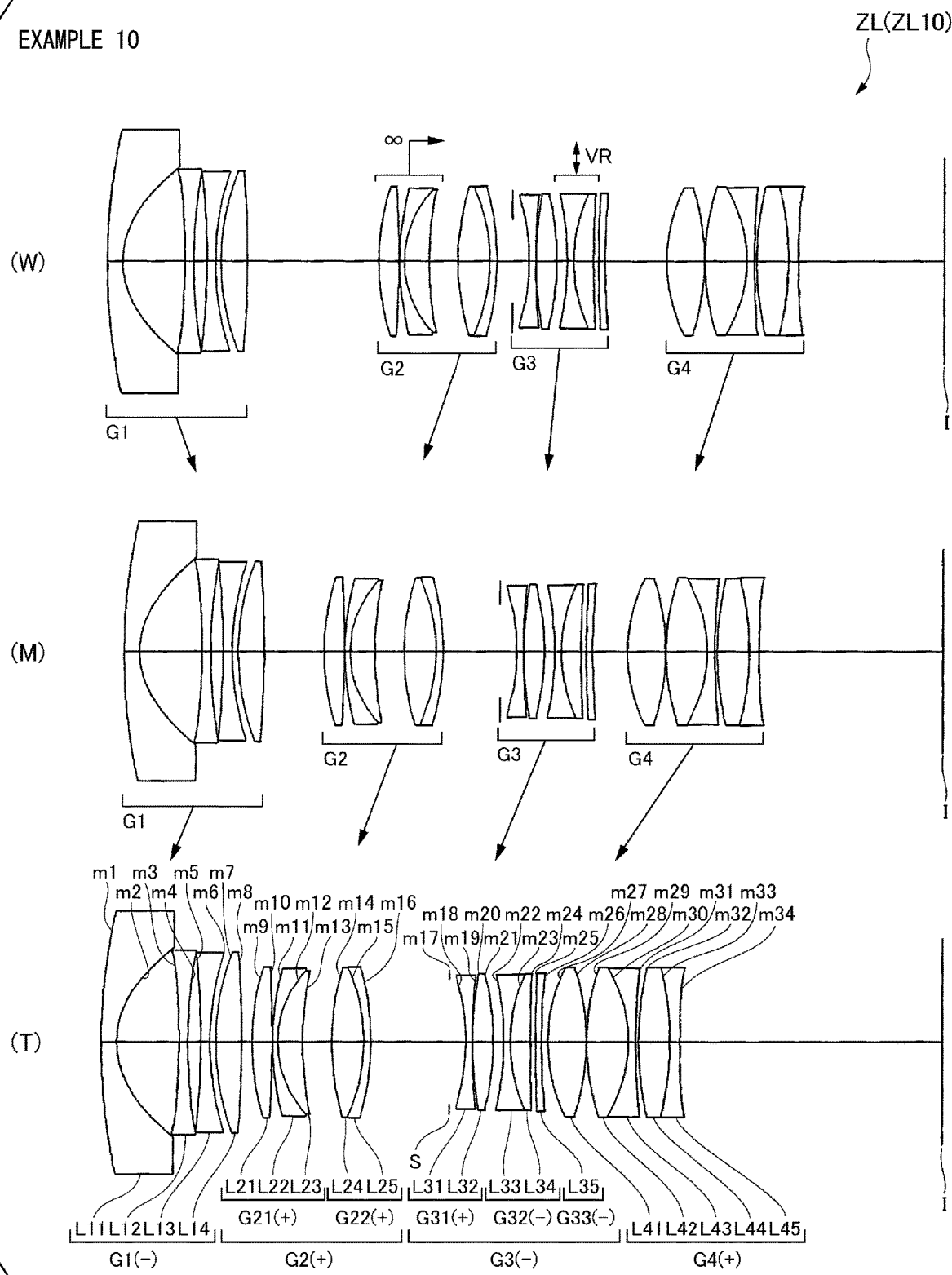
FIG. 37 is a cross-sectional view of a variable magnification optical system according to Example 10, wherein parts (W), (M), and (T) are in a wide-angle end state, an intermediate focal length state, and a telephoto end state, respectively.

Example 10 will be described with reference to FIGS. 37 to 40 and Table 10. As illustrated in FIG. 37, a variable magnification optical system ZL (ZL10) according to Example 10 is constituted by, in order from an object, a first lens group G1 having a negative refractive power; a second lens group G2 having a positive refractive power; a third lens group G3 having a negative refractive power; and a fourth lens group G4 having a positive refractive power.

The first lens group G1 is constituted by, in order from the object, a negative meniscus lens L11 having a concave surface oriented toward an image side, a biconcave lens L12, a biconcave lens L13, and a biconvex lens L14. The negative meniscus lens L11 is a glass-molded aspherical lens of which the lens surfaces on both sides are aspherical surfaces. Moreover, the biconcave lens L12 is a glass-molded aspherical lens of which the lens surface on the object side is an aspherical surface.

The second lens group G2 is constituted by, in order from the object, a 21st lens group G21 having a positive refractive power and a 22nd lens group G22 having a positive refractive power. The 21st lens group G21 is constituted by, in order from the object, a biconvex lens L21 and a cemented lens including a negative meniscus lens L22 having a concave surface oriented toward the image side and a positive meniscus lens L23 having a convex surface oriented toward the object side. The 22nd lens group G22 is constituted by, in order from the object, a cemented lens including a biconvex lens L24 and a negative meniscus lens L25 having a concave surface oriented toward the object side.

The third lens group G3 is constituted by, in order from the object, a 31st lens group G31 having a positive refractive power, a 32nd lens group G32 having a negative refractive power, and a 33rd lens group G33 having a negative refractive power. The 31st lens group G31 is constituted by, in order from the object, a biconcave lens L31 and a biconvex lens L32. The 32nd lens group G32 is constituted by, in order from the object, a cemented lens including a biconcave lens L33 and a positive meniscus lens L34 having a convex surface oriented toward the object side. The 33rd lens group G33 is constituted by a negative meniscus lens L35 having a concave surface oriented toward the image side. The positive meniscus lens L34 is a glass-molded aspherical lens of which the lens surface on the image side is an aspherical surface.

The fourth lens group G4 is constituted by, in order from the object, a biconvex lens L41, a cemented lens including a biconvex lens L42 and a biconcave lens L43, and a cemented lens including a biconvex lens L44 and a biconcave lens L45. The biconcave lens L45 is a glass-molded aspherical lens of which the lens surface on the image side is an aspherical surface.

An aperture stop S is provided between the second lens group G2 and the third lens group G3, and the aperture stop S forms the third lens group G3.

Varying magnification from the wide-angle end state to the telephoto end state is performed by moving the first lens group G1 toward the image side and then moving the first lens group G1 toward the object side, and moving the second lens group G2, the third lens group G3, and the fourth lens group G4 toward the object side such that the distances between the respective lens groups (the distance between the first and second lens groups G1 and G2, the distance between the second and third lens groups G2 and G3, and the distance between the third and fourth lens groups G4) are changed. The aperture stop S is moved toward the object side integrally with the third lens group G3.

Focusing from infinity to an object at a close distance is performed by moving the 21st lens group G21 toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K. The 31st lens group G31 and the 33rd lens group G33 positioned on both sides of the 32nd lens group G32 are immovable during image blur correction.

In Example 10, in the wide-angle end state, since the vibration reduction coefficient is −0.71 and the focal length is 16.40 mm, the moving distance of the vibration-reduction lens group VR for correcting the rotation blur of 0.81° is −0.33 mm. In the intermediate focal length state, since the vibration reduction coefficient is −0.83 and the focal length is 23.50 mm, the moving distance of the vibration-reduction lens group VR for correcting the rotation blur of 0.68° is −0.34 mm. In the telephoto end state, since the vibration reduction coefficient is −1.10 and the focal length is 34.00 mm, the moving distance of the vibration-reduction lens group VR for correcting the rotation blur of 0.57° is −0.30 mm.

Table 10 illustrates the values of respective specifications of Example 10. Surface numbers 1 to 34 in Table 10 correspond to optical surfaces of m1 to m34 illustrated in FIG. 37.

TABLE 10

| [Lens Specification] | | | | |
|---|---|---|---|---|
| Surface number | R | D | nd | νd |
| *1 | 129.36523 | 3.000 | 1.76690 | 46.9 |
| *2 | 16.79076 | 12.080 | 1.00000 | |
| *3 | −168.11497 | 1.700 | 1.76690 | 46.9 |
| 4 | 102.22883 | 2.549 | 1.00000 | |
| 5 | −153.79234 | 1.700 | 1.49700 | 81.7 |
| 6 | 54.95054 | 1.200 | 1.00000 | |
| 7 | 49.28856 | 5.114 | 1.75520 | 27.6 |
| 8 | −214.29260 | (D8) | 1.00000 | |

TABLE 10-continued

| | | | | |
|---|---|---|---|---|
| 9 | 48.24357 | 3.936 | 1.64769 | 33.7 |
| 10 | −231.49667 | 0.100 | 1.00000 | |
| 11 | 54.48877 | 1.000 | 1.84666 | 23.8 |
| 12 | 20.36996 | 4.835 | 1.60342 | 38.0 |
| 13 | 71.07354 | (D13) | 1.00000 | |
| 14 | 50.70089 | 6.202 | 1.49700 | 81.7 |
| 15 | −35.23054 | 1.400 | 1.84666 | 23.8 |
| 16 | −52.85379 | (D16) | 1.00000 | |
| 17 | (Aperture stop) | 3.263 | 1.00000 | |
| 18 | −42.64729 | 1.300 | 1.90366 | 31.3 |
| 19 | 144.87770 | 0.100 | 1.00000 | |
| 20 | 79.01871 | 3.987 | 1.84666 | 23.8 |
| 21 | −53.45918 | 2.000 | 1.00000 | |
| 22 | −59.87966 | 1.300 | 1.80400 | 46.6 |
| 23 | 32.05790 | 3.858 | 1.80518 | 25.4 |
| *24 | 262.22395 | 1.000 | 1.00000 | |
| 25 | 305.22046 | 1.200 | 1.84666 | 23.8 |
| 26 | 142.86447 | (D26) | 1.00000 | |
| 27 | 32.29080 | 7.434 | 1.49700 | 81.7 |
| 28 | −47.77121 | 0.100 | 1.00000 | |
| 29 | 46.02060 | 8.089 | 1.49700 | 81.7 |
| 30 | −28.00000 | 1.500 | 1.74950 | 35.2 |
| 31 | 155.18418 | 0.500 | 1.00000 | |
| 32 | 64.16805 | 6.127 | 1.49700 | 81.7 |
| 33 | −60.00000 | 2.000 | 1.80610 | 41.0 |
| *34 | 683.11096 | (D34) | 1.00000 | |

[Aspheric Data]

| Surface | $\kappa$ | A4 | A6 | A8 | A10 |
|---|---|---|---|---|---|
| 1 | 1.00000e+00 | 1.98429e−06 | −2.63184e−09 | −4.14768e−12 | 7.44360e−15 |
| 2 | 0.00000e+00 | 1.01727e−05 | −3.85488e−09 | 9.89275e−11 | −3.32301e−13 |
| 3 | 1.00000e+00 | −2.57886e−06 | 7.52581e−10 | 3.57367e−11 | −1.88585e−13 |
| 24 | 1 00000e+00 | −1.77103e−06 | 3.37823e−10 | 8.82760e−12 | −1.58340e−14 |
| 34 | 1.00000e+00 | 1.50115e−05 | 7.78737e−09 | 7.83699e−12 | 3.12873e−14 |

[Various Data]

| | W | M | T |
|---|---|---|---|
| f | 16.40 | 23.50 | 34.00 |
| FNo | 2.86 | 2.87 | 2.87 |
| ω | 53.9 | 40.4 | 30.1 |
| Y | 20.00 | 20.00 | 20.00 |
| TL | 163.366 | 159.714 | 163.819 |
| BF | 28.480 | 35.847 | 51.082 |

[Variable Distance Data]

| | Focusing on infinity | | | Focusing on close point | | |
|---|---|---|---|---|---|---|
| | W | M | T | W | M | T |
| D0 | ∞ | ∞ | ∞ | 336.63 | 340.29 | 336.18 |
| β | — | — | — | −0.0455 | −0.0648 | −0.0952 |
| f | 16.40 | 23.50 | 34.00 | — | — | — |
| D8 | 25.600 | 11.684 | 2.000 | 27.112 | 13.329 | 3.862 |
| D13 | 5.713 | 5.713 | 5.713 | 4.201 | 4.068 | 3.851 |
| D16 | 3.000 | 11.142 | 15.251 | 3.000 | 11.142 | 15.251 |
| D26 | 12.000 | 6.756 | 1.200 | 12.000 | 6.756 | 1.200 |
| D34 | 28.480 | 35.847 | 51.082 | 28.480 | 35.847 | 51.082 |

[Lens Group Data]

| Lens group | Starting surface | Focal length |
|---|---|---|
| 1st lens group | 1 | −23.03 |
| 2nd lens group | 9 | 40.62 |
| 21st lens group | 9 | 81.58 |
| 22nd lens group | 14 | 63.92 |
| 3rd lens group | 17 | −47.73 |
| 31st lens group | 17 | 16447.87 |

TABLE 10-continued

| 32nd lens group | 22 | −60.32 |
| 33rd leng group | 25 | −318.30 |
| 4th lens group | 27 | 37.41 |

[Conditional Expression Correspondence Value]

| Conditional Expression (1) | f1/f3 = 0.482 |
| Conditional Expression (2) | f32/f3 = 1.264 |
| Conditional Expression (3) | f4/f2 = 0.921 |
| Conditional Expression (4) | A(T3.5)/A(T4.0) = 1.727 |

It can be understood from Table 10 that the variable magnification optical system ZL10 according to Example 10 satisfies Conditional Expressions (1) to (4).

Figure 38:
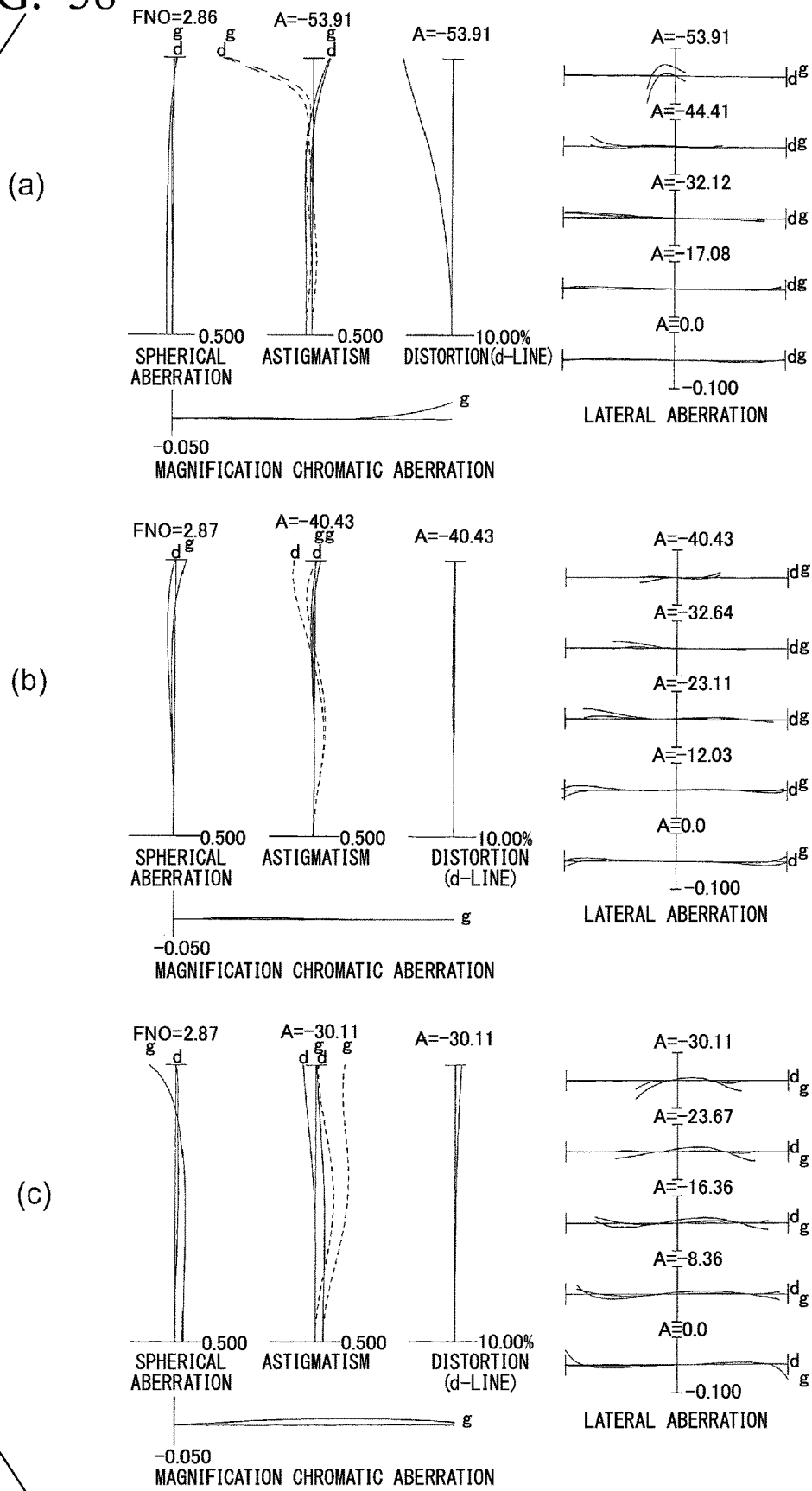
FIG. 38 shows graphs illustrating various aberrations of the variable magnification optical system according to Example 10 upon focusing on infinity, wherein parts (a), (b), and (c) are in the wide-angle end state, the intermediate focal length state, and the telephoto end state, respectively.
Figure 39:
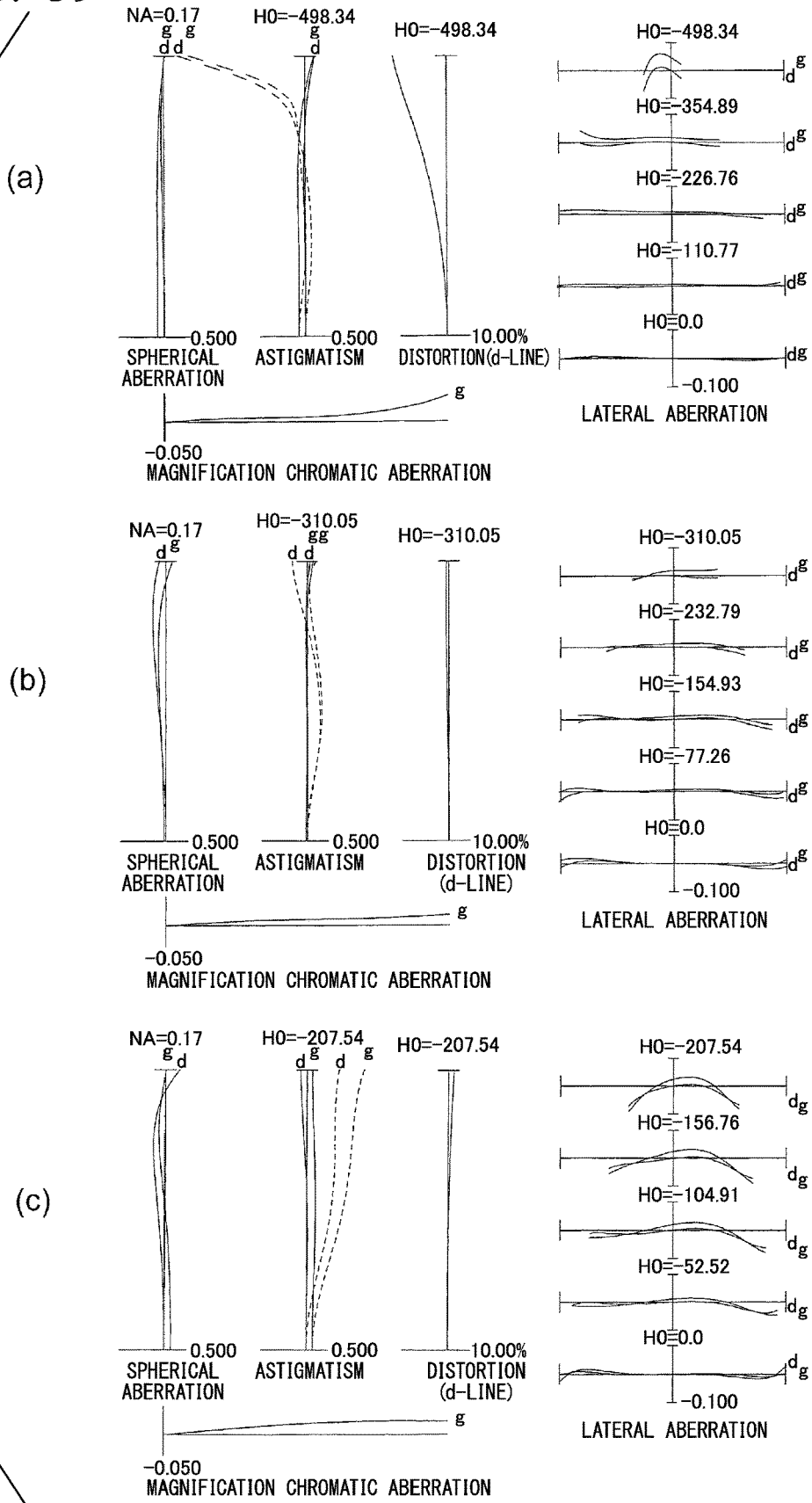
FIG. 39 shows graphs illustrating various aberrations of the variable magnification optical system according to Example 10 upon focusing on a close point, wherein parts (a), (b), and (c) are in the wide-angle end state, the intermediate focal length state, and the telephoto end state, respectively.
Figure 40:
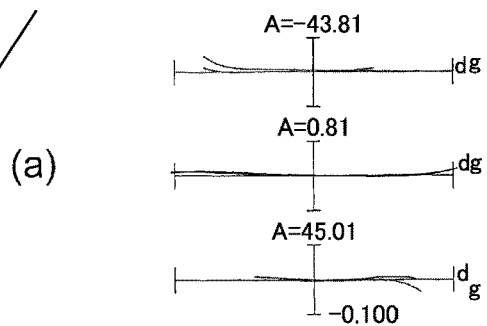
FIG. 40 shows graphs illustrating lateral aberrations of the variable magnification optical system according to Example 10 after image blur correction was performed upon focusing on infinity, wherein parts (a), (b), and (c) are in the wide-angle end state, the intermediate focal length state, and the telephoto end state, respectively.
Figure 40:
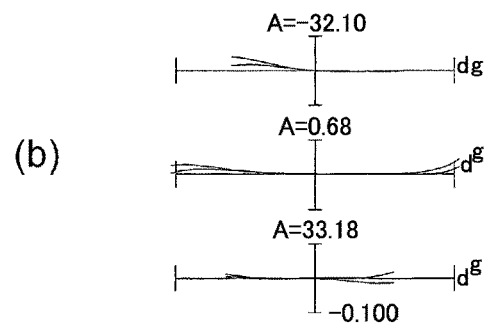
Figure 40:
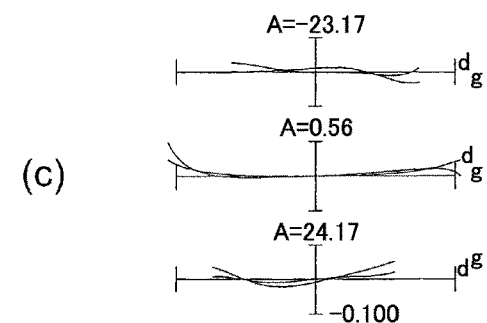

FIG. 38 shows graphs illustrating various aberrations (spherical aberration, astigmatism, distortion, magnification chromatic aberration, and lateral aberration) upon focusing on infinity, of the variable magnification optical system ZL10 according to Example 10, in which part (a) illustrates the wide-angle end state, part (b) illustrates the intermediate focal length state, and part (c) illustrates the telephoto end state. FIG. 39 shows graphs illustrating various aberrations (spherical aberration, astigmatism, distortion, magnification chromatic aberration, and lateral aberration) upon focusing on a close point, of the variable magnification optical system ZL10 according to Example 10, in which part (a) illustrates the wide-angle end state, part (b) illustrates the intermediate focal length state, and part (c) illustrates the telephoto end state. FIG. 40 shows graphs illustrating lateral aberration of the variable magnification optical system ZL10 according to Example 10 when image blur correction is performed upon focusing on infinity, in which part (a) illustrates the wide-angle end state, part (b) illustrates the intermediate focal length state, and part (c) illustrates the telephoto end state.

It can be understood from FIGS. 38 to 40 that the variable magnification optical system ZL10 according to Example 10 has a satisfactory optical performance such that aberrations are satisfactorily corrected in states ranging from the wide-angle end state to the telephoto end state and from the focusing-on-infinity state to the focusing-on-close-point state. Moreover, it can be understood that the variable magnification optical system ZL10 has an excellent imaging performance upon image blur correction.

Example 11

Figure 41:
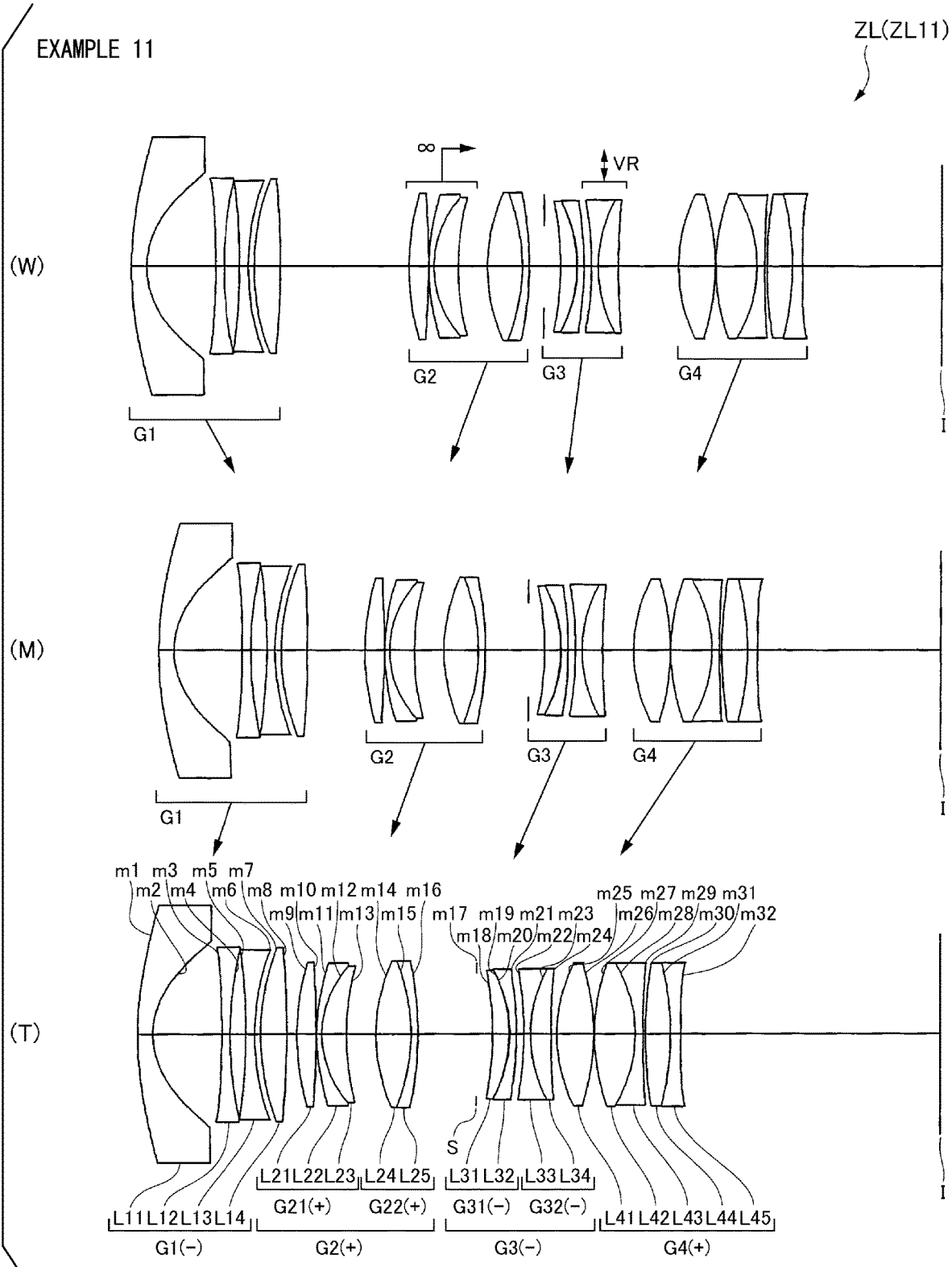
FIG. 41 is a cross-sectional view of a variable magnification optical system according to Example 11, wherein parts (W), (M), and (T) are in a wide-angle end state, an intermediate focal length state, and a telephoto end state, respectively.

Example 11 will be described with reference to FIGS. 41 to 44 and Table 11. As illustrated in FIG. 41, a variable magnification optical system ZL (ZL11) according to Example 11 is constituted by, in order from an object, a first lens group G1 having a negative refractive power; a second lens group G2 having a positive refractive power; a third lens group G3 having a negative refractive power; and a fourth lens group G4 having a positive refractive power.

The first lens group G1 is constituted by, in order from the object, a negative meniscus lens L11 having a concave surface oriented toward an image side, a biconcave lens L12, a biconcave lens L13, and a biconvex lens L14 The negative meniscus lens L11 is a glass-molded aspherical lens of which the lens surfaces on both sides are aspherical surfaces. Moreover, the biconcave lens L12 is a glass-molded aspherical lens of which the lens surface on the object side is an aspherical surface.

The second lens group G2 is constituted by, in order from the object, a 21st lens group G21 having a positive refractive power and a 22nd lens group G22 having a positive refractive power. The 21st lens group G21 is constituted by, in order from the object, a biconvex lens L21 and a cemented lens including a negative meniscus lens L22 having a concave surface oriented toward the image side and a positive meniscus lens L23 having a convex surface oriented toward the object side. The 22nd lens group G22 is constituted by, in order from the object, a cemented lens including a biconvex lens L24 and a negative meniscus lens L25 having a concave surface oriented toward the object side.

The third lens group G3 is constituted by, in order from the object, a 31st lens group G31 having a negative refractive power and a 32nd lens group G32 having a negative refractive power. The 31st lens group G31 is constituted by, in order from the object, a positive meniscus lens L31 having a convex surface oriented toward the image side and a negative meniscus lens L32 having a concave surface oriented toward the object side. The 32nd lens group G32 is constituted by, in order from the object, a cemented lens including a biconcave lens L33 and a positive meniscus lens L34 having a convex surface oriented toward the object side. The positive meniscus lens L34 is a glass-molded aspherical lens of which the lens surface on the image side is an aspherical surface.

The fourth lens group G4 is constituted by, in order from the object, a biconvex lens L41, a cemented lens including a biconvex lens L42 and a biconcave lens L43, and a cemented lens including a biconvex lens L44 and a biconcave lens L45. The biconcave lens L45 is a glass-molded aspherical lens of which the lens surface on the image side is an aspherical surface.

An aperture stop S is provided between the second lens group G2 and the third lens group G3, and the aperture stop S forms the third lens group G3.

Varying magnification from the wide-angle end state to the telephoto end state is performed by moving the first lens group G1 toward the image side and then moving the first lens group G1 toward the object side, and moving the second lens group G2, the third lens group G3, and the fourth lens group G4 toward the object side such that the distances between the respective lens groups (the distance between the first and second lens groups G1 and G2, the distance between the second and third lens groups G2 and G3, and the distance between the third and fourth lens groups G4) are changed. The aperture stop S is moved toward the object side integrally with the third lens group G3.

Focusing from infinity to an object at a close distance is performed by moving the 21st lens group G21 toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K. The 31st lens group G31 positioned at an object-side of the 32nd lens group G32 is immovable during image blur correction.

In Example 11, in the wide-angle end state, since the vibration reduction coefficient is −0.70 and the focal length is 16.40 mm, the moving distance of the vibration-reduction lens group VR for correcting the rotation blur of 0.81° is −0.33 mm. In the intermediate focal length state, since the vibration reduction coefficient is −0.84 and the focal length is 23.50 mm, the moving distance of the vibration-reduction lens group VR for correcting the rotation blur of 0.68° is −0.33 mm. In the telephoto end state, since the vibration reduction coefficient is −1.11 and the focal length is 34.00 mm, the moving distance of the vibration-reduction lens group VR for correcting the rotation blur of 0.57° is −0.30 mm.

Table 11 illustrates the values of respective specifications of Example 11. Surface numbers 1 to 32 in Table 11 correspond to optical surfaces of m1 to m32 illustrated in FIG. 41.

TABLE 11

[Lens Specification]

| Surface number | R | D | nd | νd |
|---|---|---|---|---|
| *1 | 76.25229 | 3.000 | 1.76690 | 46.9 |
| *2 | 16.79439 | 13.642 | 1.00000 | |
| *3 | −200.00000 | 1.700 | 1.76690 | 46.9 |
| 4 | 75.03729 | 3.177 | 1.00000 | |
| 5 | −125.54845 | 1.700 | 1.49700 | 81.7 |
| 6 | 49.12256 | 1.200 | 1.00000 | |
| 7 | 47.85420 | 5.237 | 1.75520 | 27.6 |
| 8 | −213.44096 | (D8) | 1.00000 | |
| 9 | 52.27459 | 3.866 | 1.64769 | 33.7 |
| 10 | −201.45526 | 0.100 | 1.00000 | |
| 11 | 47.65640 | 1.000 | 1.84666 | 23.8 |
| 12 | 20.62433 | 4.835 | 1.60342 | 38.0 |
| 13 | 51.97288 | (D13) | 1.00000 | |
| 14 | 36.30851 | 6.943 | 1.49700 | 81.7 |
| 15 | −40.01236 | 1.400 | 1.84666 | 23.8 |
| 16 | −69.69258 | (D16) | 1.00000 | |
| 17 | (Aperture stop) | 3.263 | 1.00000 | |
| 18 | −66.13207 | 3.276 | 1.84666 | 23.8 |
| 19 | −27.82464 | 0.125 | 1.00000 | |
| 20 | −27.46907 | 1.300 | 1.90366 | 31.3 |
| 21 | −76.81907 | 1.500 | 1.00000 | |
| 22 | −75.57149 | 1.300 | 1.80400 | 46.6 |
| 23 | 27.59368 | 4.056 | 1.80518 | 25.4 |
| *24 | 140.34715 | (D24) | 1.00000 | |
| 25 | 32.39018 | 7.345 | 1.49700 | 81.7 |
| 26 | −47.59659 | 0.100 | 1.00000 | |
| 27 | 43.47080 | 8.151 | 1.49700 | 81.7 |
| 28 | −28.00000 | 1.500 | 1.74950 | 35.2 |
| 29 | 204.99155 | 0.500 | 1.00000 | |
| 30 | 91.74629 | 5.029 | 1.49700 | 81.7 |
| 31 | −60.00000 | 2.000 | 1.80610 | 41.0 |
| *32 | 738.89001 | (D32) | 1.00000 | |

[Aspheric Data]

| Surface | κ | A4 | A6 | A8 | A10 |
|---|---|---|---|---|---|
| 1 | 1.00000e+00 | 1.17818e−06 | −3.05356e−09 | −5.29641e−12 | 7.81141e−15 |
| 2 | 0.00000e+00 | 1.43376e−05 | −6.00725e−09 | 1.01780e−10 | −3.85607e−13 |
| 3 | 1.00000e+00 | −1.46582e−06 | 3.27408e−09 | 1.79731e−11 | −1.64353e−13 |
| 24 | 1.00000e+00 | −1.60481e−06 | 1.85520e−09 | −5.72587e−12 | 3.09532e−14 |
| 32 | 1.00000e+00 | 1.48992e−05 | 5.55835e−09 | 1.79775e−11 | −2.72544e−15 |

[Various Data]

| | W | M | T |
|---|---|---|---|
| f | 16.40 | 23.50 | 34.00 |
| FNo | 2.87 | 2.87 | 2.89 |
| ω | 53.9 | 41.0 | 30.4 |

TABLE 11-continued

| Y | 20.00 | 20.00 | 20.00 |
| --- | --- | --- | --- |
| TL | 161.620 | 155.892 | 159.779 |
| BF | 27.863 | 36.595 | 51.713 |

[Variable Distance Data]

|  | Focusing on infinity | | | Focusing on close point | | |
| --- | --- | --- | --- | --- | --- | --- |
|  | W | M | T | W | M | T |
| D0 | ∞ | ∞ | ∞ | 338.38 | 344.11 | 340.22 |
| β | — | — | — | −0.0452 | −0.0640 | −0.0939 |
| f | 16.40 | 23.50 | 34.00 | — | — | — |
| D8 | 25.600 | 11.386 | 2.000 | 27.124 | 13.079 | 3.938 |
| D13 | 5.914 | 5.914 | 5.914 | 4.390 | 4.221 | 3.976 |
| D16 | 3.000 | 8.552 | 11.709 | 3.000 | 8.552 | 11.709 |
| D24 | 12.000 | 6.202 | 1.200 | 12.000 | 6.202 | 1.200 |
| D32 | 27.863 | 36.595 | 51.713 | 27.863 | 36.595 | 51.713 |

[Lens Group Data]

| Lens group | Starting surface | Focal length |
| --- | --- | --- |
| 1st lens group | 1 | −22.78 |
| 2nd lens group | 9 | 40.42 |
| 21st lens group | 9 | 89.17 |
| 22nd lens group | 14 | 59.41 |
| 3rd lens group | 17 | −49.31 |
| 31st lens group | 17 | −319.89 |
| 32nd lens group | 22 | −60.56 |
| 4th lens group | 25 | 37.74 |

[Conditional Expression Correspondence Value]

| Conditional Expression (1) | f1/f3 = 0.462 |
| --- | --- |
| Conditional Expression (2) | f32/f3 = 1.228 |
| Conditional Expression (3) | f4/f2 = 0.934 |
| Conditional Expression (4) | A(T3.5)/A(T4.0) = 1.717 |

It can be understood from Table 11 that the variable magnification optical system ZL11 according to Example 11 satisfies Conditional Expressions (1) to (4).

Figure 42:
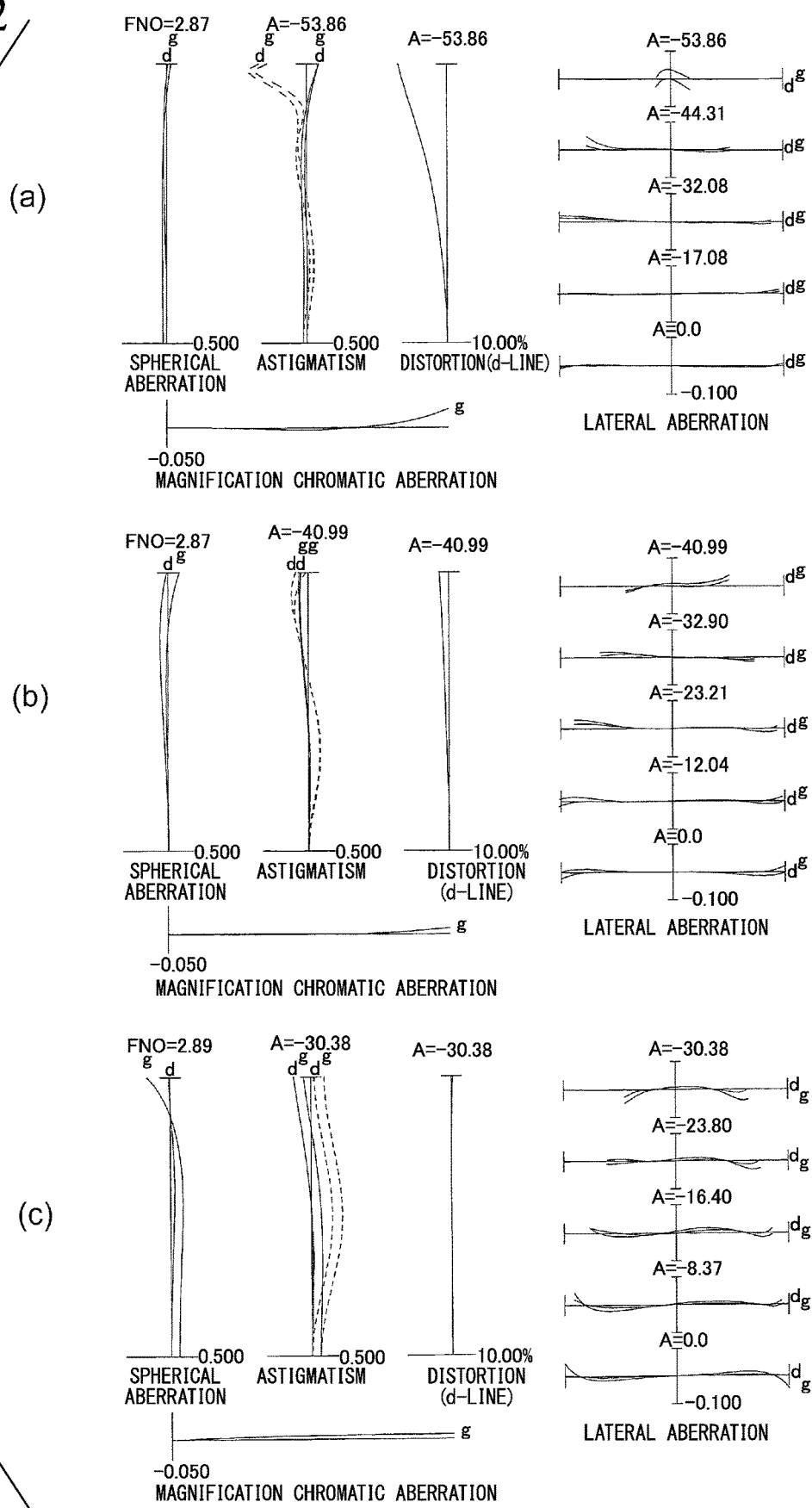
FIG. 42 shows graphs illustrating various aberrations of the variable magnification optical system according to Example 11 upon focusing on infinity, wherein parts (a), (b), and (c) are in the wide-angle end state, the intermediate focal length state, and the telephoto end state, respectively.
Figure 43:
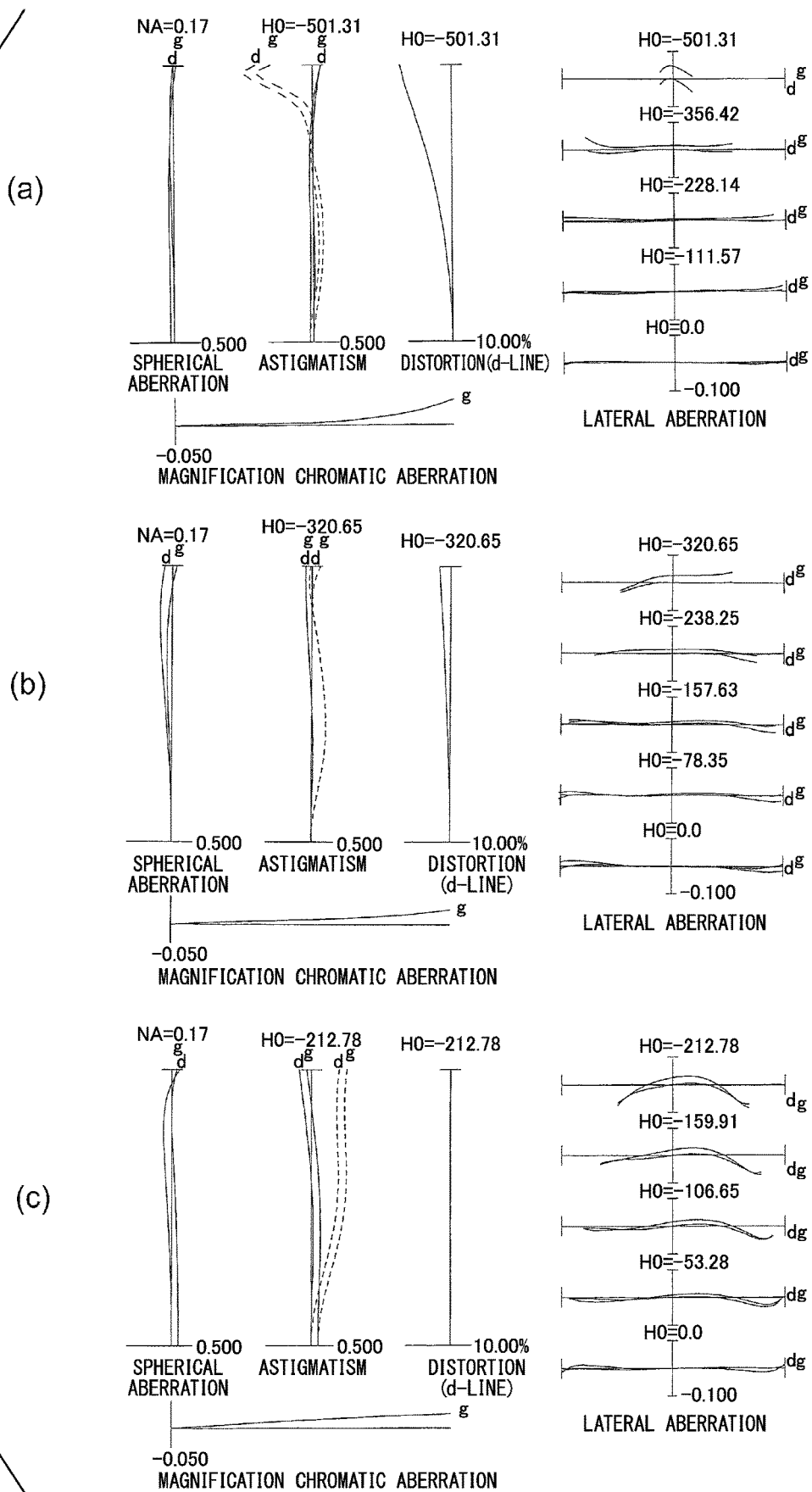
FIG. 43 shows graphs illustrating various aberrations of the variable magnification optical system according to Example 11 upon focusing on a close point, wherein parts (a), (b), and (c) are in the wide-angle end state, the intermediate focal length state, and the telephoto end state, respectively.
Figure 44:
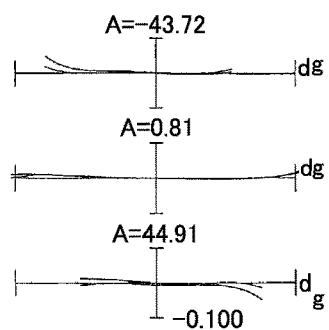
FIG. 44 shows graphs illustrating lateral aberrations of the variable magnification optical system according to Example 11 after image blur correction was performed upon focusing on infinity, wherein parts (a), (b), and (c) are in the wide-angle end state, the intermediate focal length state, and the telephoto end state, respectively.
Figure 44:
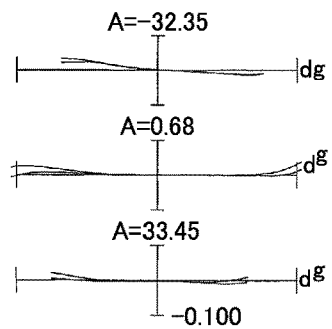
Figure 44:
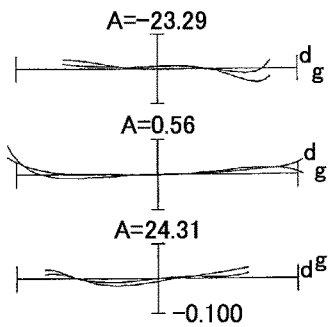

FIG. 42 shows graphs illustrating various aberrations (spherical aberration, astigmatism, distortion, magnification chromatic aberration, and lateral aberration) upon focusing on infinity, of the variable magnification optical system ZL11 according to Example 11, in which part (a) illustrates the wide-angle end state, part (b) illustrates the intermediate focal length state, and part (c) illustrates the telephoto end state. FIG. 43 shows graphs illustrating various aberrations (spherical aberration, astigmatism, distortion, magnification chromatic aberration, and lateral aberration) upon focusing on a close point, of the variable magnification optical system ZL11 according to Example 11, in which part (a) illustrates the wide-angle end state, part (b) illustrates the intermediate focal length state, and part (c) illustrates the telephoto end state. FIG. 44 shows graphs illustrating lateral aberration of the variable magnification optical system ZL11 according to Example 11 when image blur correction is performed upon focusing on infinity, in which part (a) illustrates the wide-angle end state, part (b) illustrates the intermediate focal length state, and part (c) illustrates the telephoto end state.

It can be understood from FIGS. 42 to 44 that the variable magnification optical system ZL11 according to Example 11 has a satisfactory optical performance such that aberrations are satisfactorily corrected in states ranging from the wide-angle end state to the telephoto end state and from the focusing-on-infinity state to the focusing-on-close-point state. Moreover, it can be understood that the variable magnification optical system ZL11 has an excellent imaging performance upon image blur correction.

Example 12

Figure 45:
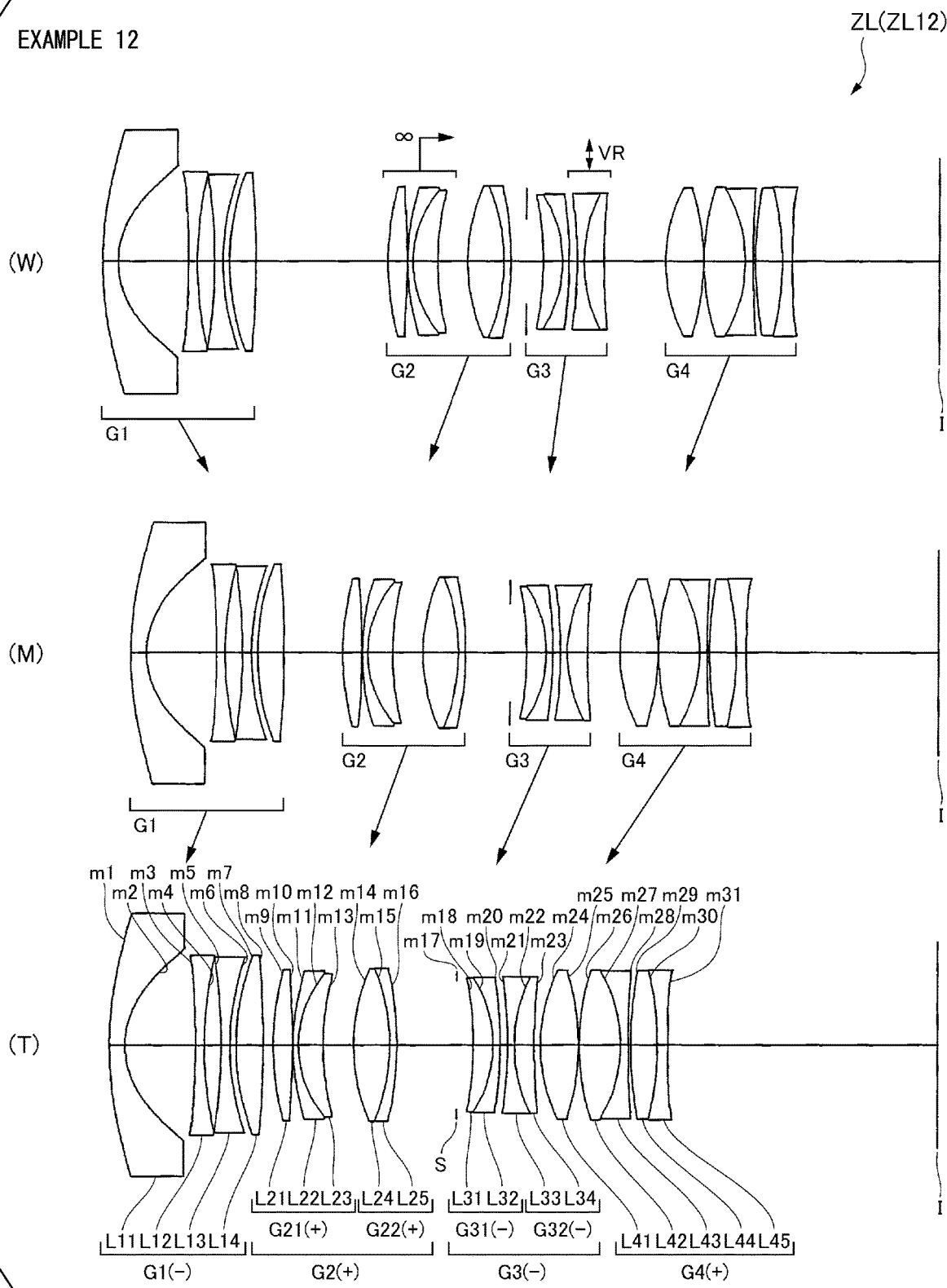
FIG. 45 is a cross-sectional view of a variable magnification optical system according to Example 12, wherein parts (W), (M), and (T) are in a wide-angle end state, an intermediate focal length state, and a telephoto end state, respectively.

Example 12 will be described with reference to FIGS. 45 to 48 and Table 12. As illustrated in FIG. 45, a variable magnification optical system ZL (ZL12) according to Example 12 is constituted by, in order from an object, a first lens group G1 having a negative refractive power; a second lens group G2 having a positive refractive power; a third lens group G3 having a negative refractive power; and a fourth lens group G4 having a positive refractive power.

The first lens group G1 is constituted by, in order from the object, a negative meniscus lens L11 having a concave surface oriented toward an image side, a biconcave lens L12, a biconcave lens L13, and a biconvex lens L14. The negative meniscus lens L11 is a glass-molded aspherical lens of which the lens surfaces on both sides are aspherical surfaces. Moreover, the biconcave lens L12 is a glass-molded aspherical lens of which the lens surface on the object side is an aspherical surface.

The second lens group G2 is constituted by, in order from the object, a 21st lens group G21 having a positive refractive power and a 22nd lens group G22 having a positive refractive power. The 21st lens group G21 is constituted by, in order from the object, a biconvex lens L21 and a cemented lens including a negative meniscus lens L22 having a concave surface oriented toward the image side and a positive meniscus lens L23 having a convex surface oriented toward the object side. The 22nd lens group G22 is constituted by, in order from the object, a cemented lens including a biconvex lens L24 and a negative meniscus lens L25 having a concave surface oriented toward the object side.

The third lens group G3 is constituted by, in order from the object, a 31st lens group G31 having a negative refractive power and a 32nd lens group G32 having a negative refractive power. The 31st lens group G31 is constituted by, in order from the object, a cemented lens including a positive meniscus lens L31 having a convex surface oriented toward the image side and a negative meniscus lens L32 having a concave surface oriented toward the object side. The 32nd lens group G32 is constituted by, in order from the object, a cemented lens including a biconcave lens L33 and a positive meniscus lens L34 having a convex surface oriented toward the object side. The positive meniscus lens L34 is a glass-molded aspherical lens of which the lens surface on the image side is an aspherical surface.

The fourth lens group G4 is constituted by, in order from the object, a biconvex lens L41, a cemented lens including a biconvex lens L42 and a biconcave lens L43, and a cemented lens including a biconvex lens L44 and a biconcave lens L45. The biconcave lens L45 is a glass-molded aspherical lens of which the lens surface on the image side is an aspherical surface.

An aperture stop S is provided between the second lens group G2 and the third lens group G3, and the aperture stop S forms the third lens group G3.

Varying magnification from the wide-angle end state to the telephoto end state is performed by moving the first lens group G1 toward the image side and then moving the first lens group G1 toward the object side, and moving the second lens group G2, the third lens group G3, and the fourth lens group G4 toward the object side such that the distances between the respective lens groups (the distance between the first and second lens groups G1 and G2, the distance between the second and third lens groups G2 and G3, and the distance between the third and fourth lens groups G4) are changed. The aperture stop S is moved toward the object side integrally with the third lens group G3.

Focusing from infinity to an object at a close distance is performed by moving the 21st lens group G21 toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K. The 31st lens group G31 positioned at an object-side of the 32nd lens group G32 is immovable during image blur correction.

In Example 12, in the wide-angle end state, since the vibration reduction coefficient is −0.67 and the focal length is 16.40 mm, the moving distance of the vibration-reduction lens group VR for correcting the rotation blur of 0.81° is −0.35 mm. In the intermediate focal length state, since the vibration reduction coefficient is −0.80 and the focal length is 23.50 mm, the moving distance of the vibration-reduction lens group VR for correcting the rotation blur of 0.68° is −0.35 mm. In the telephoto end state, since the vibration reduction coefficient is −1.06 and the focal length is 34.00 mm, the moving distance of the vibration-reduction lens group VR for correcting the rotation blur of 0.57° is −0.32 mm.

Table 12 illustrates the values of respective specifications of Example 12. Surface numbers 1 to 31 in Table 12 correspond to optical surfaces of m1 to m31 illustrated in FIG. 45.

TABLE 12

[Lens Specification]

| Surface number | R | D | nd | vd |
|---|---|---|---|---|
| *1 | 73.02420 | 3.000 | 1.76690 | 46.9 |
| *2 | 16.71640 | 13.599 | 1.00000 | |
| *3 | −200.00000 | 1.700 | 1.76690 | 46.9 |
| 4 | 73.09691 | 3.347 | 1.00000 | |
| 5 | −108.14702 | 1.700 | 1.49700 | 81.7 |
| 6 | 51.28745 | 1.200 | 1.00000 | |
| 7 | 49.11741 | 5.183 | 1.75520 | 27.6 |
| 8 | −189.76183 | (D8) | 1.00000 | |
| 9 | 56.47818 | 3.732 | 1.64769 | 33.7 |
| 10 | −178.32704 | 0.100 | 1.00000 | |
| 11 | 49.11563 | 1.000 | 1.84666 | 23.8 |
| 12 | 21.22809 | 4.835 | 1.60342 | 38.0 |
| 13 | 54.71456 | (D13) | 1.00000 | |
| 14 | 36.94523 | 6.983 | 1.49700 | 81.7 |
| 15 | −38.41319 | 1.400 | 1.84666 | 23.8 |
| 16 | −64.26981 | (D16) | 1.00000 | |
| 17 | (Aperture stop) | 3.263 | 1.00000 | |
| 18 | −68.05346 | 3.817 | 1.84666 | 23.8 |
| 19 | −23.99004 | 1.300 | 1.90366 | 31.3 |
| 20 | −88.38043 | 1.500 | 1.00000 | |
| 21 | −87.17709 | 1.300 | 1.80400 | 46.6 |
| 22 | 29.35808 | 3.856 | 1.80518 | 25.4 |
| *23 | 129.21902 | (D23) | 1.00000 | |
| 24 | 32.43952 | 7.387 | 1.49700 | 81.7 |
| 25 | −47.46555 | 0.100 | 1.00000 | |
| 26 | 46.53091 | 8.006 | 1.49700 | 81.7 |
| 27 | −28.00000 | 1.500 | 1.74950 | 35.2 |
| 28 | 220.75671 | 0.500 | 1.00000 | |

TABLE 12-continued

| 29 | 83.84132 | 5.139 | 1.49700 | 81.7 |
| 30 | −60.00000 | 2.000 | 1.80610 | 41.0 |
| *31 | 717.42318 | (D31) | 1.00000 | |

[Aspheric Data]

| Surface | κ | A4 | A6 | A8 | A10 |
|---|---|---|---|---|---|
| 1 | 1.00000e+00 | 1.32066e−06 | −2.90839e−09 | −6.61517e−12 | 8.98619e−15 |
| 2 | 0.00000e+00 | 1.50281e−05 | −5.84806e−09 | 1.11035e−10 | −4.24353e−13 |
| 3 | 1.00000e+00 | −1.65518e−06 | 3.70661e−09 | 1.62176e−11 | −1.68192e−13 |
| 23 | 1.00000e+00 | −1.77911e−06 | 2.96559e−09 | −9.96675e−12 | 3.84312e−14 |
| 31 | 1.00000e+00 | 1.45699e−05 | 4.88540e−09 | 2.17942e−11 | −6.47982e−15 |

[Various Data]

| | W | M | T |
|---|---|---|---|
| f | 16.40 | 23.50 | 34.00 |
| FNo | 2.90 | 2.90 | 2.92 |
| ω | 53.9 | 40.9 | 30.4 |
| Y | 20.00 | 20.00 | 20.00 |
| TL | 162.518 | 156.790 | 160.637 |
| BF | 28.551 | 37.243 | 52.408 |

[Variable Distance Data]

| | Focusing on infinity | | | Focusing on close point | | |
|---|---|---|---|---|---|---|
| | W | M | T | W | M | T |
| D0 | ∞ | ∞ | ∞ | 337.48 | 343.21 | 339.36 |
| β | — | — | — | −0.0453 | −0.0642 | −0.0941 |
| f | 16.40 | 23.50 | 34.00 | — | — | — |
| D8 | 25.600 | 11.376 | 2.000 | 27.126 | 13.075 | 3.946 |
| D13 | 5.921 | 5.921 | 5.921 | 4.395 | 4.222 | 3.975 |
| D16 | 3.000 | 8.539 | 11.662 | 3.000 | 8.539 | 11.662 |
| D23 | 12.000 | 6.266 | 1.200 | 12.000 | 6.266 | 1.200 |
| D31 | 28.551 | 37.243 | 52.408 | 28.551 | 37.243 | 52.408 |

[Lens Group Data]

| Lens group | Starting surface | Focal length |
|---|---|---|
| 1st lens group | 1 | −22.68 |
| 2nd lens group | 9 | 40.15 |
| 21st lens group | 9 | 91.07 |
| 22nd lens group | 14 | 58.08 |
| 3rd lens group | 17 | −48.55 |
| 31st lens group | 17 | −233.28 |
| 32nd lens group | 21 | −64.20 |
| 4th lens group | 24 | 38.12 |

[Conditional Expression Correspondence Value]

| Conditional Expression (1) | f1/f3 = 0.467 |
| Conditional Expression (2) | f32/f3 = 1.322 |
| Conditional Expression (3) | f4/f2 = 0.949 |
| Conditional Expression (4) | A(T3.5)/A(T4.0) = 1.704 |

It can be understood from Table 12 that the variable magnification optical system ZL12 according to Example 12 satisfies Conditional Expressions (1) to (4).

Figure 46:
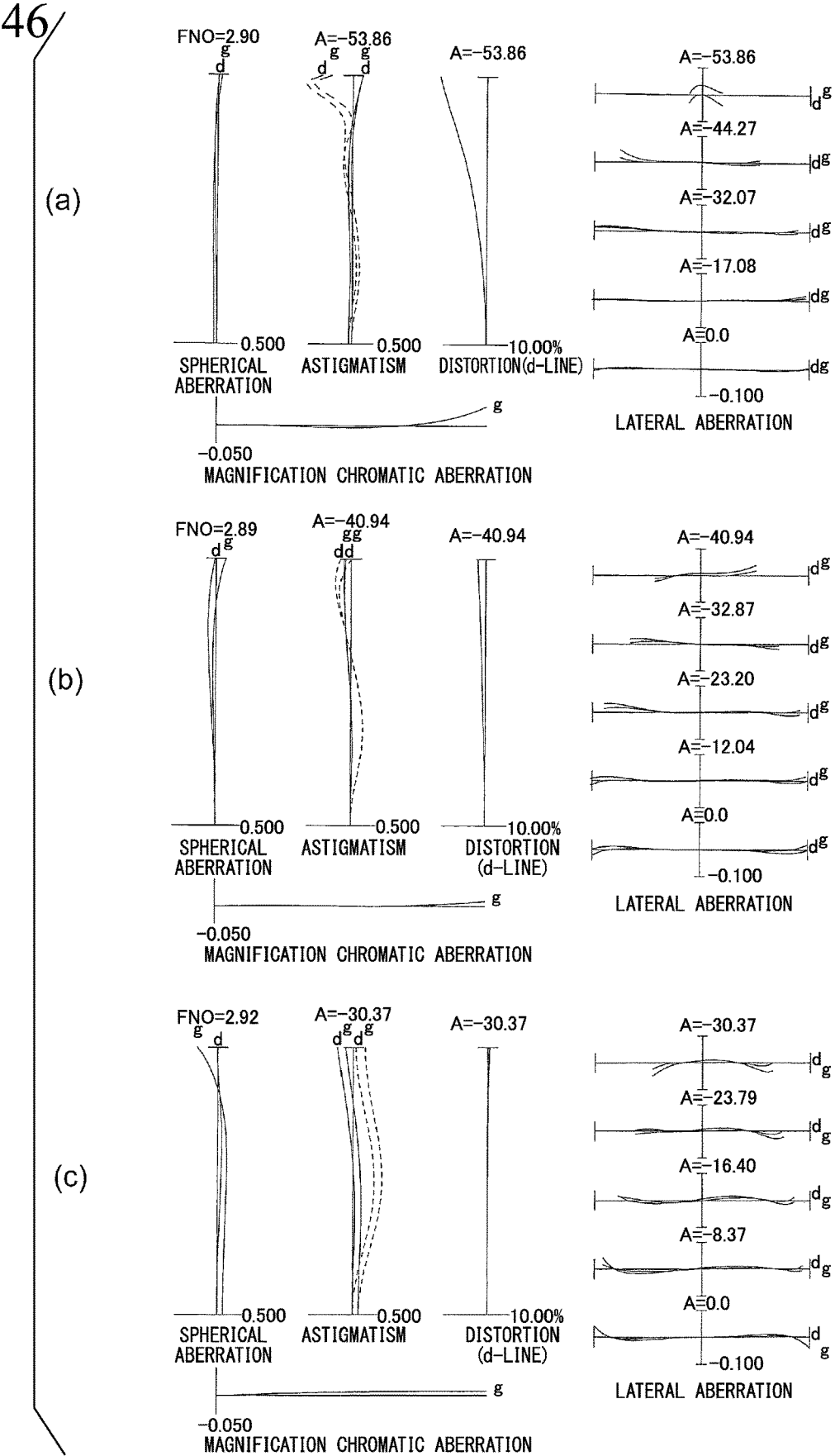
FIG. 46 shows graphs illustrating various aberrations of the variable magnification optical system according to Example 12 upon focusing on infinity, wherein parts (a), (b), and (c) are in the wide-angle end state, the intermediate focal length state, and the telephoto end state, respectively.
Figure 47:
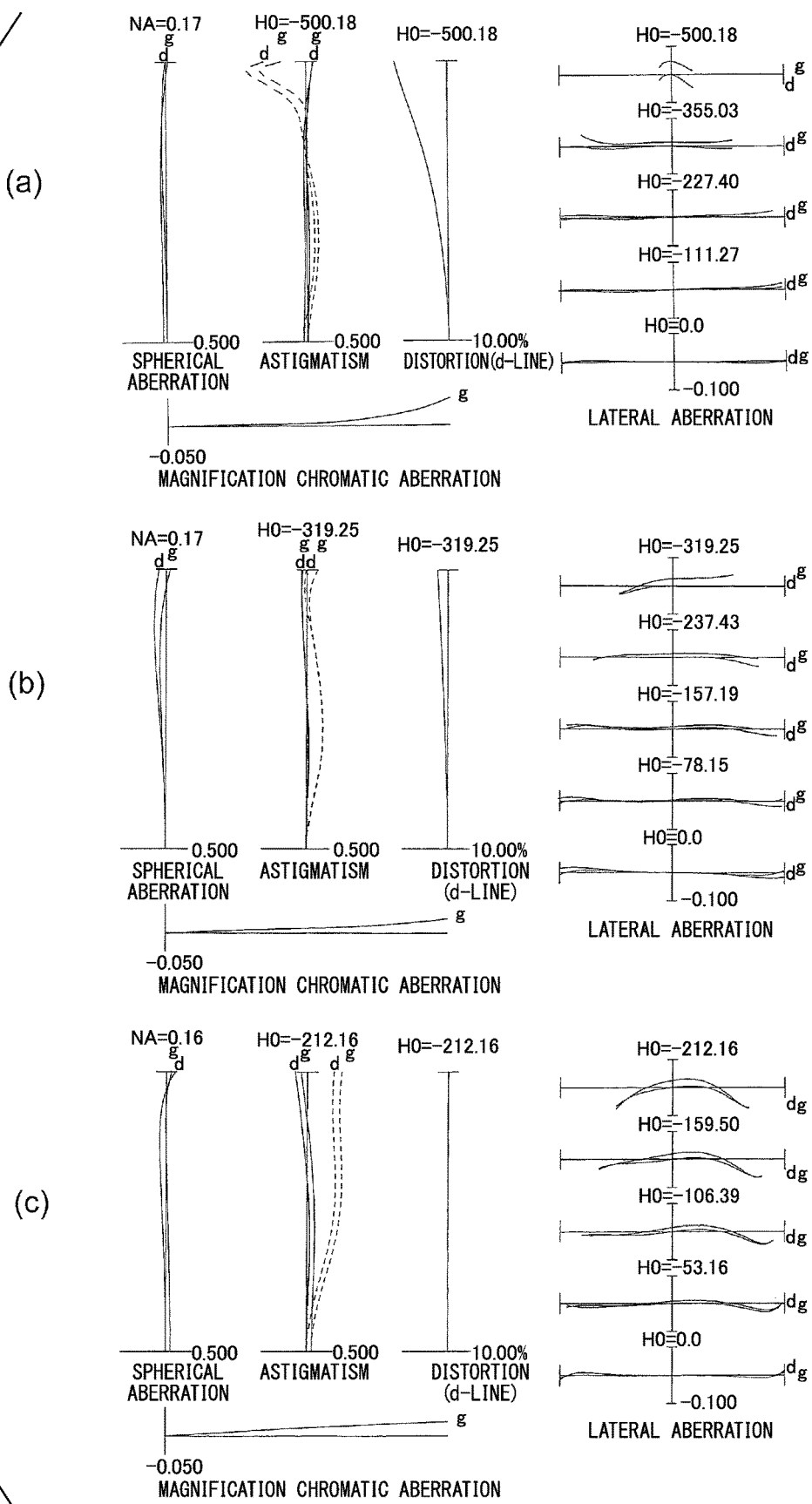
FIG. 47 shows graphs illustrating various aberrations of the variable magnification optical system according to Example 12 upon focusing on a close point, wherein parts (a), (b), and (c) are in the wide-angle end state, the intermediate focal length state, and the telephoto end state, respectively.
Figure 48:
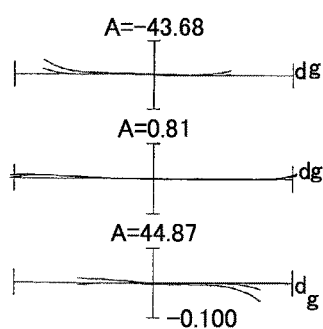
FIG. 48 shows graphs illustrating lateral aberrations of the variable magnification optical system according to Example 12 after image blur correction was performed upon focusing on infinity, wherein parts (a), (b), and (c) are in the wide-angle end state, the intermediate focal length state, and the telephoto end state, respectively.
Figure 48:
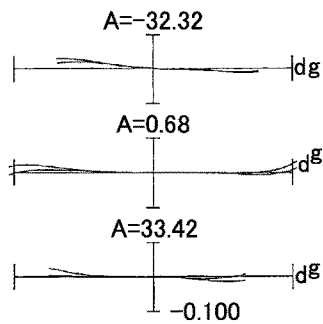
Figure 48:
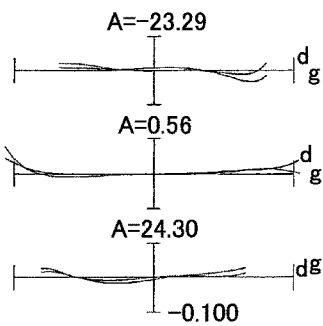

FIG. 46 shows graphs illustrating various aberrations (spherical aberration, astigmatism, distortion, magnification chromatic aberration, and lateral aberration) upon focusing on infinity, of the variable magnification optical system ZL12 according to Example 12, in which part (a) illustrates the wide-angle end state, part (b) illustrates the intermediate focal length state, and part (c) illustrates the telephoto end state. FIG. 47 shows graphs illustrating various aberrations (spherical aberration, astigmatism, distortion, magnification chromatic aberration, and lateral aberration) upon focusing on a close point, of the variable magnification optical system ZL12 according to Example 12, in which part (a) illustrates the wide-angle end state, part (b) illustrates the intermediate focal length state, and part (c) illustrates the telephoto end state. FIG. 48 shows graphs illustrating lateral aberration of the variable magnification optical system ZL12 according to Example 12 when image blur correction is performed upon focusing on infinity, in which part (a) illustrates the wide-angle end state, part (b) illustrates the intermediate focal length state, and part (c) illustrates the telephoto end state.

It can be understood from FIGS. 46 to 48 that the variable magnification optical system ZL12 according to Example 12 has a satisfactory optical performance such that aberrations are satisfactorily corrected in states ranging from the wide-angle end state to the telephoto end state and from the focusing-on-infinity state to the focusing-on-close-point state. Moreover, it can be understood that the variable magnification optical system ZL12 has an excellent imaging performance upon image blur correction.

Example 13

Figure 49:
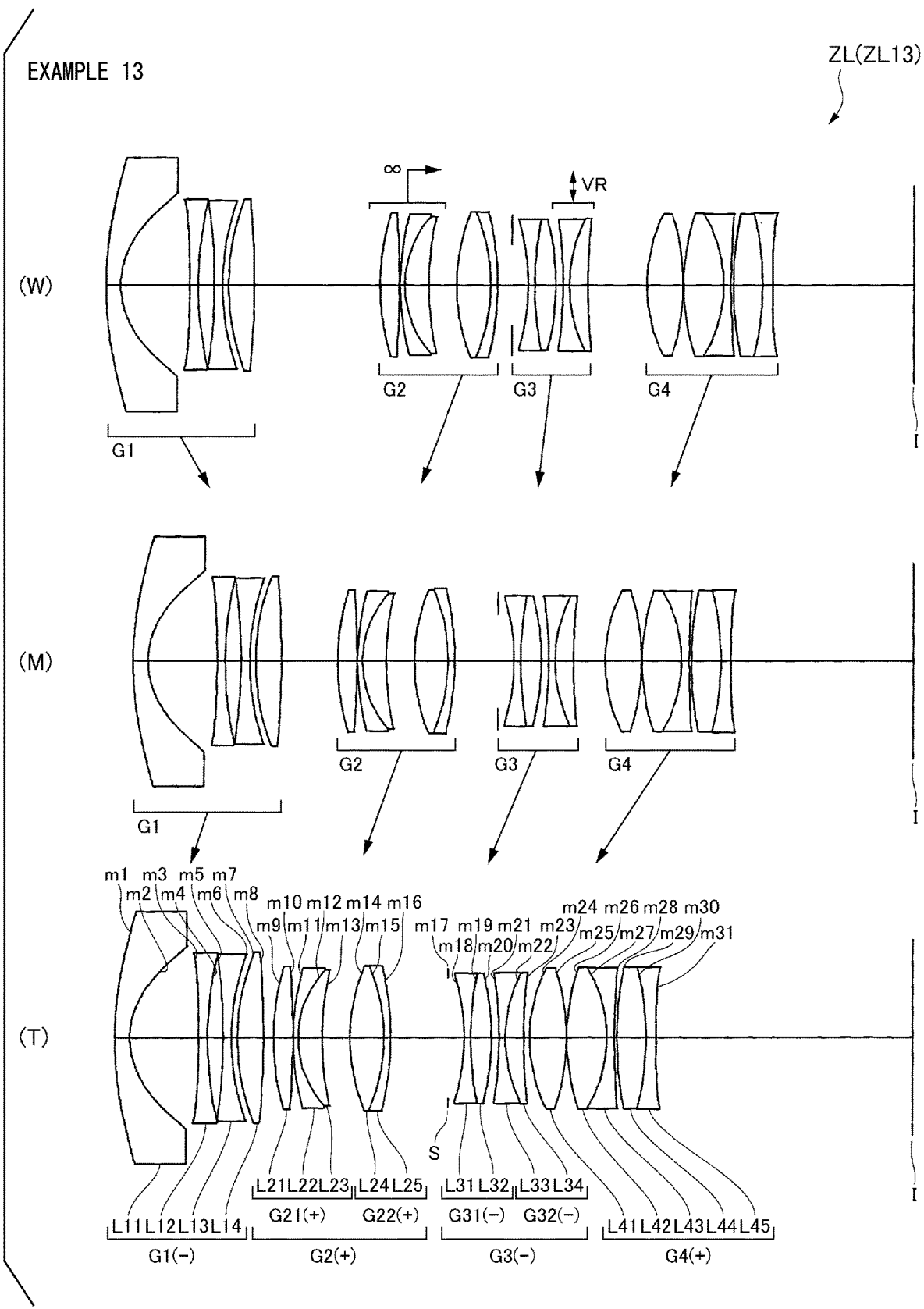
FIG. 49 is a cross-sectional view of a variable magnification optical system according to Example 13, wherein parts (W), (M), and (T) are in a wide-angle end state, an intermediate focal length state, and a telephoto end state, respectively.

Example 13 will be described with reference to FIGS. 49 to 52 and Table 13. As illustrated in FIG. 49, a variable magnification optical system ZL (ZL13) according to Example 13 is constituted by, in order from an object, a first lens group G1 having a negative refractive power; a second lens group G2 having a positive refractive power; a third lens group G3 having a negative refractive power; and a fourth lens group G4 having a positive refractive power.

The first lens group G1 is constituted by, in order from the object, a negative meniscus lens L11 having a concave surface oriented toward an image side, a biconvex lens L12, a biconcave lens L13, and a biconvex lens L14. The negative meniscus lens L11 is a glass-molded aspherical lens of which the lens surfaces on both sides are aspherical surfaces. Moreover, the biconcave lens L12 is a glass-molded aspherical lens of which the lens surface on the object side is an aspherical surface.

The second lens group G2 is constituted by a 21st lens group G21 having a positive refractive power and a 22nd lens group G22 having a positive refractive power. The 21st lens group G21 is constituted by a biconvex lens L21 and a cemented lens including a negative meniscus lens L22 having a concave surface oriented toward the image side and a positive meniscus lens L23 having a convex surface oriented toward the object side. The 22nd lens group G22 is constituted by, in order from the object, a cemented lens including a biconvex lens L24 and a negative meniscus lens L25 having a concave surface oriented toward the object side.

The third lens group G3 is constituted by, in order from the object, a 31st lens group G31 having a negative refractive power and a 32nd lens group G32 having a negative refractive power. The 31st lens group G31 is constituted by, in order from the object, a cemented lens including a biconcave lens L31 and a biconvex lens L32. The 32nd lens group G32 is constituted by, in order from the object, a cemented lens including a biconcave lens L33 and a positive meniscus lens L34 having a convex surface oriented toward the object side. The positive meniscus lens L34 is a glass-molded aspherical lens of which the lens surface on the image side is an aspherical surface.

The fourth lens group G4 is constituted by, in order from the object, a biconvex lens L41, a cemented lens including a biconvex lens L42 and a biconcave lens L43, and a cemented lens including a biconvex lens L44 and a biconcave lens L45. The biconcave lens L45 is a glass-molded aspherical lens of which the lens surface on the image side is an aspherical surface.

An aperture stop S is provided between the second lens group G2 and the third lens group G3, and the aperture stop S forms the third lens group G3.

Varying magnification from the wide-angle end state to the telephoto end state is performed by moving the first lens group G1 toward the image side and then moving the first lens group G1 toward the object side, and moving the second lens group G2, the third lens group G3, and the fourth lens group G4 toward the object side such that the distances between the respective lens groups (the distance between the first and second lens groups G1 and G2, the distance between the second and third lens groups G2 and G3, and the distance between the third and fourth lens groups G4) are changed. The aperture stop S is moved toward the object side integrally with the third lens group G3.

Focusing from infinity to an object at a close distance is performed by moving the 21st lens group G21 toward the image side.

When image blur occurs, image blur correction (vibration reduction) on the image plane I is performed by moving the 32nd lens group G32 as the vibration-reduction lens group VR so as to have a component in the direction orthogonal to the optical axis. In an image capturing lens in which the focal length of an entire system is f and a vibration reduction coefficient (the ratio of an image moving distance on an imaging plane to a moving distance of a moving lens group during blur correction) is K, in order to correct rotation blur of angle θ, the vibration-reduction lens group VR (a moving lens group) for image blur correction may be moved in the direction orthogonal to the optical axis by (f×tan θ)/K. The 31st lens group G31 positioned at an object-side of the 32nd lens group G32 is immovable during image blur correction.

In Example 13, in the wide-angle end state, since the vibration reduction coefficient is −0.70 and the focal length is 16.40 mm, the moving distance of the vibration-reduction lens group VR for correcting the rotation blur of 0.81° is −0.33 mm. In the intermediate focal length state, since the vibration reduction coefficient is −0.83 and the focal length is 23.50 mm, the moving distance of the vibration-reduction lens group VR for correcting the rotation blur of 0.68° is −0.34 mm. In the telephoto end state, since the vibration reduction coefficient is −1.11 and the focal length is 34.00 mm, the moving distance of the vibration-reduction lens group VR for correcting the rotation blur of 0.57° is −0.30 mm.

Table 13 illustrates the values of respective specifications of Example 13. Surface numbers 1 to 31 in Table 13 correspond to optical surfaces of m1 to m31 illustrated in FIG. 49.

TABLE 13

| [Lens Specification] | | | | |
|---|---|---|---|---|
| Surface number | R | D | nd | vd |
| *1 | 74.98920 | 3.000 | 1.76690 | 46.9 |
| *2 | 16.71640 | 13.914 | 1.00000 | |
| *3 | −200.00000 | 1.700 | 1.76690 | 46.9 |
| 4 | 74.41837 | 3.254 | 1.00000 | |
| 5 | −113.97279 | 1.700 | 1.49700 | 81.7 |
| 6 | 51.25758 | 1.218 | 1.00000 | |
| 7 | 48.46513 | 5.220 | 1.75520 | 27.6 |
| 8 | −196.30825 | (D8) | 1.00000 | |
| 9 | 51.66521 | 3.926 | 1.64769 | 33.7 |
| 10 | −186.59307 | 0.100 | 1.00000 | |

TABLE 13-continued

| | | | | |
|---|---|---|---|---|
| 11 | 53.65429 | 1.000 | 1.84666 | 23.8 |
| 12 | 20.79244 | 4.835 | 1.60342 | 38.0 |
| 13 | 64.81668 | (D13) | 1.00000 | |
| 14 | 39.17548 | 6.856 | 1.49700 | 81.7 |
| 15 | −37.89813 | 1.400 | 1.84666 | 23.8 |
| 16 | −61.51660 | (D16) | 1.00000 | |
| 17 | (Aperture stop) | 3.263 | 1.00000 | |
| 18 | −44.13789 | 1.300 | 1.90366 | 31.3 |
| 19 | 70.52747 | 4.187 | 1.84666 | 23.8 |
| 20 | −53.20362 | 1.500 | 1.00000 | |
| 21 | −87.83350 | 1.300 | 1.80400 | 46.6 |
| 22 | 30.11849 | 3.688 | 1.80518 | 25.4 |
| *23 | 116.01616 | (D23) | 1.00000 | |
| 24 | 33.04611 | 7.402 | 1.49700 | 81.7 |
| 25 | −46.18687 | 0.100 | 1.00000 | |
| 26 | 45.89714 | 8.060 | 1.49700 | 81.7 |
| 27 | −28.00000 | 1.500 | 1.74950 | 35.2 |
| 28 | 186.58716 | 0.500 | 1.00000 | |
| 29 | 75.28743 | 5.930 | 1.49700 | 81.7 |
| 30 | −60.00000 | 2.000 | 1.80610 | 41.0 |
| *31 | 605.98400 | (D31) | 1.00000 | |

[Aspheric Data]

| Surface | κ | A4 | A6 | A8 | A10 |
|---|---|---|---|---|---|
| 1 | 1.00000e+00 | 1.05350e−06 | −2.11331e−09 | −6.68909e−12 | 8.48966e−15 |
| 2 | 0.00000e+00 | 1.45018e−05 | −7.42095e−09 | 1.15879e−10 | −4.19276e−13 |
| 3 | 1.00000e+00 | −1.74349e−06 | 2.25437e−09 | 1.87840e−11 | −1.73570e−13 |
| 23 | 1.00000e+00 | −1.88970e−06 | 2.64440e−09 | −8.43108e−12 | 3.31091e−14 |
| 31 | 1.00000e+00 | 1.40217e−05 | 4.02684e−09 | 2.45025e−11 | −1.18730e−14 |

[Various Data]

| | W | M | T |
|---|---|---|---|
| f | 16.40 | 23.50 | 34.00 |
| FNo | 2.87 | 2.85 | 2.90 |
| ω | 53.8 | 40.8 | 30.3 |
| Y | 20.00 | 20.00 | 20.00 |
| TL | 163.819 | 157.979 | 161.332 |
| BF | 28.666 | 36.898 | 51.921 |

[Variable Distance Data]

| | Focusing on infinity | | | Focusing on close point | | |
|---|---|---|---|---|---|---|
| | W | M | T | W | M | T |
| D0 | ∞ | ∞ | ∞ | 336.18 | 342.02 | 338.67 |
| β | — | — | — | −0.0454 | −0.0643 | −0.0942 |
| f | 16.40 | 23.50 | 34.00 | — | — | — |
| D8 | 25.600 | 11.405 | 2.000 | 27.104 | 13.047 | 3.854 |
| D13 | 5.699 | 5.699 | 5.699 | 4.195 | 4.058 | 3.845 |
| D16 | 3.000 | 8.714 | 11.658 | 3.000 | 8.714 | 11.658 |
| D23 | 12.000 | 6.408 | 1.200 | 12.000 | 6.408 | 1.200 |
| D31 | 28.666 | 36.898 | 51.921 | 28.666 | 36.898 | 51.921 |

[Lens Group Data]

| Lens group | Starting surface | Focal length |
|---|---|---|
| 1st lens group | 1 | −22.86 |
| 2nd lens group | 9 | 39.48 |
| 21st lens group | 9 | 85.05 |
| 22nd lens group | 14 | 59.11 |
| 3rd lens group | 17 | −45.83 |
| 31st lens group | 17 | −227.86 |
| 32nd lens group | 21 | −61.62 |
| 4th lens group | 24 | 37.86 |

[Conditional Expression Correspondence Value]

| | |
|---|---|
| Conditional Expression (1) | f1/f3 = 0.499 |
| Conditional Expression (2) | f32/f3 = 1.344 |
| Conditional Expression (3) | f4/f2 = 0.959 |
| Conditional Expression (4) | A(T3.5)/A(T4.0) = 1.711 |

It can be understood from Table 13 that the variable magnification optical system ZL13 according to Example 13 satisfies Conditional Expressions (1) to (4).

Figure 50:
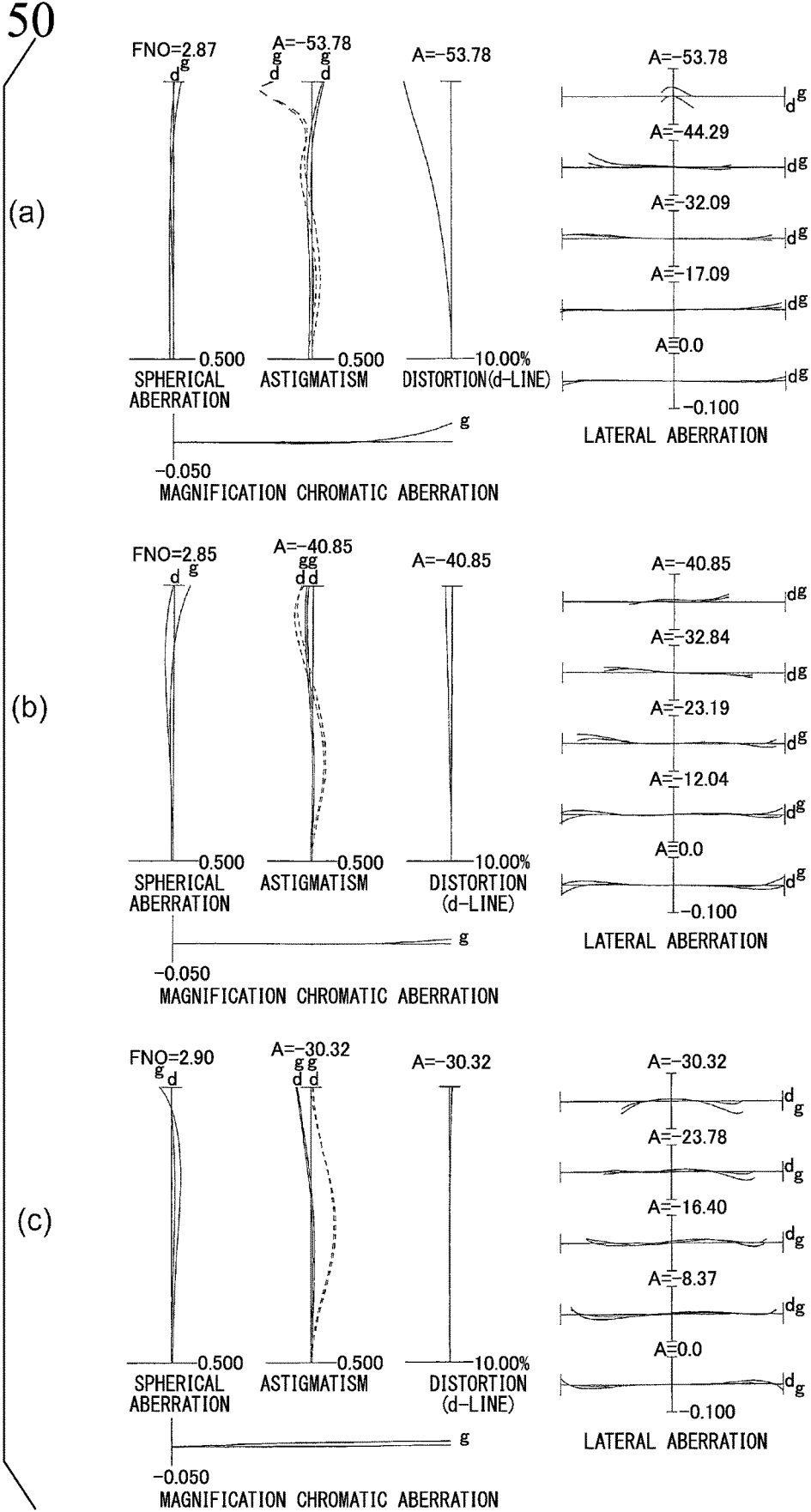
FIG. 50 shows graphs illustrating various aberrations of the variable magnification optical system according to Example 13 upon focusing on infinity, wherein parts (a), (b), and (c) are in the wide-angle end state, the intermediate focal length state, and the telephoto end state, respectively.
Figure 51:
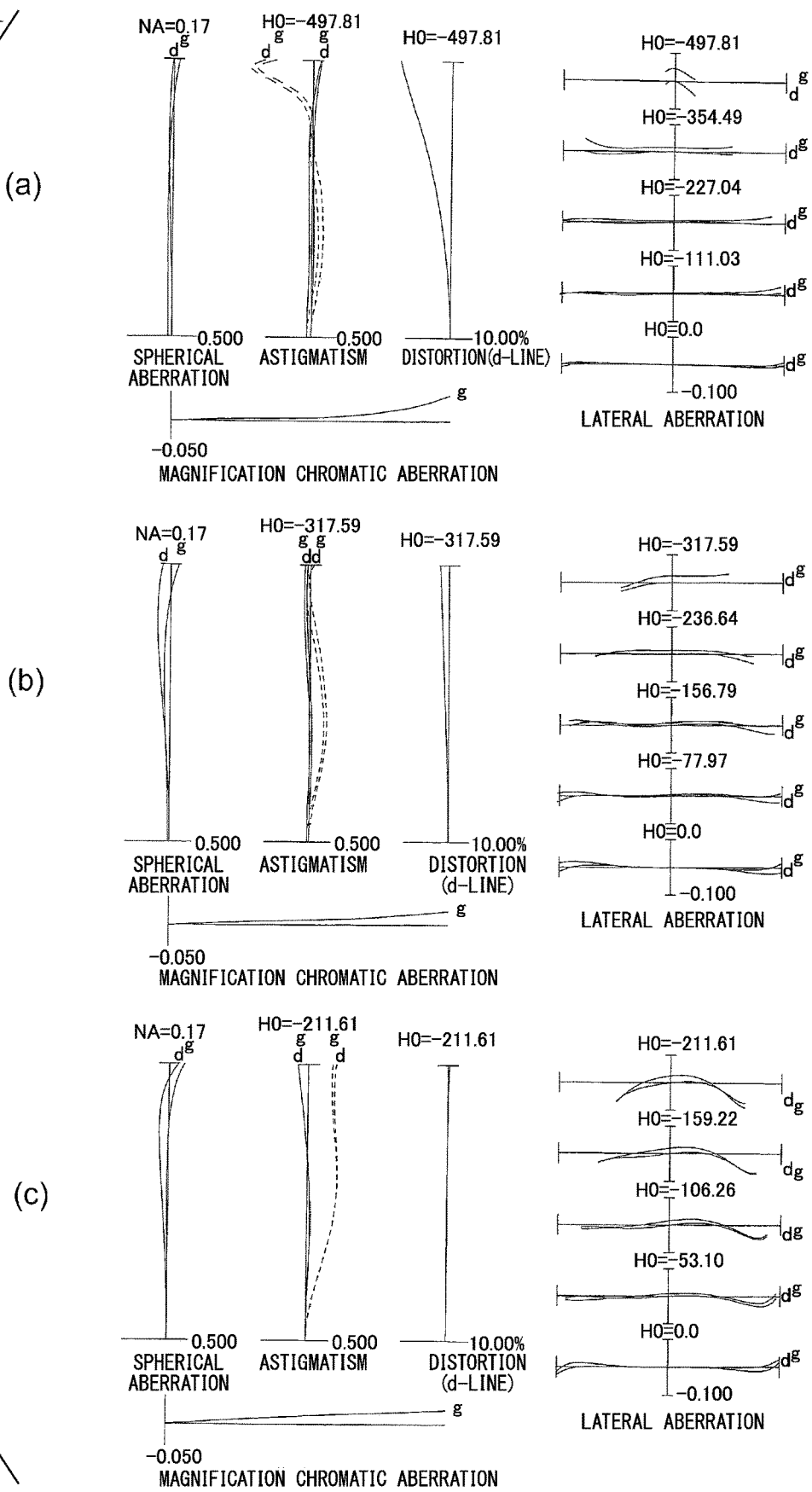
FIG. 51 shows graphs illustrating various aberrations of the variable magnification optical system according to Example 13 upon focusing on a close point, wherein parts (a), (b), and (c) are in the wide-angle end state, the intermediate focal length state, and the telephoto end state, respectively.
Figure 52:
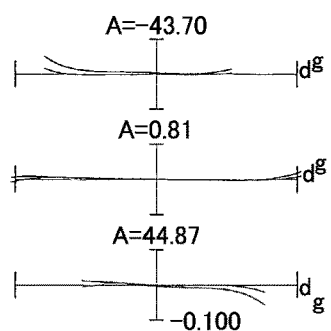
FIG. 52 shows graphs illustrating lateral aberrations of the variable magnification optical system according to Example 13 after image blur correction was performed upon focusing on infinity, wherein parts (a), (b), and (c) are in the wide-angle end state, the intermediate focal length state, and the telephoto end state, respectively.
Figure 52:
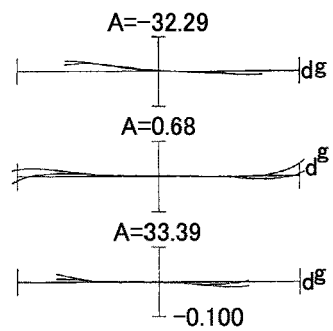
Figure 52:
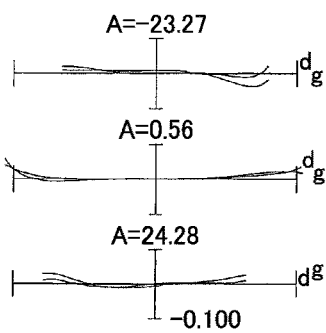

FIG. 50 shows graphs illustrating various aberrations (spherical aberration, astigmatism, distortion, magnification chromatic aberration, and lateral aberration) upon focusing on infinity, of the variable magnification optical system ZL13 according to Example 13, in which part (a) illustrates the wide-angle end state, part (b) illustrates the intermediate focal length state, and part (c) illustrates the telephoto end state. FIG. 51 shows graphs illustrating various aberrations (spherical aberration, astigmatism, distortion, magnification chromatic aberration, and lateral aberration) upon focusing on a close point, of the variable magnification optical system ZL13 according to Example 13, in which part (a) illustrates the wide-angle end state, part (b) illustrates the intermediate focal length state, and part (c) illustrates the telephoto end state. FIG. 52 shows graphs illustrating lateral aberration of the variable magnification optical system ZL13 according to Example 13 when image blur correction is performed upon focusing on infinity, in which part (a) illustrates the wide-angle end state, part (b) illustrates the intermediate focal length state, and part (c) illustrates the telephoto end state.

It can be understood from FIGS. 50 to 52 that the variable magnification optical system ZL13 according to Example 13 has a satisfactory optical performance such that aberrations are satisfactorily corrected in states ranging from the wide-angle end state to the telephoto end state and from the focusing-on-infinity state to the focusing-on-close-point state. Moreover, it can be understood that the variable magnification optical system ZL13 has an excellent imaging performance upon image blur correction.

According to the above-described examples, it is possible to implement a variable magnification optical system in which the F-value is smaller than F3.5 (preferably smaller than F2.8) upon varying magnification from the wide-angle end state to the telephoto end state and the F-value is approximately constant upon varying magnification from the wide-angle end state to the telephoto end state and which has such a wide angle of view that the half-angle of view is approximately 50° or more, and in which various aberrations are corrected satisfactorily.

While the present invention has been described by assigning reference symbols to elements of the embodiment for better understanding of the present invention, the aspect of the present invention is not limited to this. The following content can be appropriately employed within a range where the optical performance of the variable magnification optical system is not diminished.

Although the numbered examples of a four-group configuration has been illustrated as numbered examples of the variable magnification optical system ZL, the present invention is not limited to this and can be applied to other group configurations (for example, a five-group configuration or the like). Specifically, a configuration in which a lens or a lens group is added at a position closest to an object and a configuration in which a lens or a lens group is added at a position closest to an image may be employed. A lens group refers to a portion having at least one lens isolated by air space which changes upon varying magnification or focusing.

In the variable magnification optical system ZL, a portion of a lens group, an entire lens group, or a plurality of lens groups may be moved in the optical axis direction as a focusing lens group in order to perform focusing from an object at infinity to an object at a close distance. Moreover, such a focusing lens group can be applied to autofocus and is also suitable for driving based on an autofocus motor (for example, an ultrasonic motor or the like). Particularly, it is preferable to use at least a portion of the second lens group G2 as the focusing lens group.

In the variable magnification optical system ZL, an entire arbitrary lens group or a partial lens group may be moved so as to have a component in the direction orthogonal to the optical axis or may be rotated (oscillated) in an in-plane direction including the optical axis so as to function as a vibration-reduction lens group that corrects image blur occurring due to camera shake or the like. Particularly, it is preferable to use at least a portion of the third lens group G3 as the vibration-reduction lens group. Moreover, a lens that is immovable during vibration reduction may be disposed at an image-side of the 32nd lens group G32.

In the variable magnification optical system ZL, the lens surface may be formed as a spherical surface or a flat surface and may be formed as an aspherical surface. When the lens surface is a spherical surface or a flat surface, it is possible to facilitate lens processing, assembly, and adjustment and to prevent deterioration of optical performance resulting from errors in the processing, assembly and adjustment. Moreover, deterioration of the rendering performance is little even when the image plane is shifted. When the lens surface is an aspherical surface, the aspherical surface may be an aspherical surface obtained by grinding, a glass-molded aspherical surface obtained by molding glass into an aspherical surface, or a composite aspherical surface obtained by forming a resin on the surface of glass into an aspherical shape. Moreover, the lens surface may be a diffraction surface and may be a refractive index distributed lens (a GRIN lens) or a plastic lens.

In the variable magnification optical system ZL, it is preferable that the aperture stop S be disposed near the third lens group G3. However, the role of the aperture stop may be substituted by the frame of a lens without providing a separate member as the aperture stop.

In the variable magnification optical system ZL, each lens surface may be coated with an anti-reflection film which has high transmittance in a wide wavelength region in order to decrease flare and ghosting and achieve satisfactory optical performance with high contrast.

The variable magnification ratio (variable power ratio) of the variable magnification optical system ZL may be set to approximately 2, for example.

EXPLANATION OF NUMERALS AND CHARACTERS

ZL (ZL1 to ZL13) Variable magnification optical system
G1 First lens group
G2 Second lens group
G21 21st lens group (Focusing lens group)
G22 22nd lens group
G3 Third lens group
G31 31st lens group
G32 32nd lens group (Vibration-reduction lens group)
G33 33rd lens group
G4 Fourth lens group
S Aperture stop
I Image plane
1 Camera (Optical apparatus)

The invention claimed is:

1. A variable magnification optical system that is substantially constituted by four lens groups,
the four lens groups including, in order from an object:
a first lens group having a negative refractive power;
a second lens group having a positive refractive power;
a third lens group having a negative refractive power; and
a fourth lens group having a positive refractive power, wherein
upon varying magnification, the distance between the first lens group and the second lens group changes, the distance between the second lens group and the third lens group changes, and the distance between the third lens group and the fourth lens group changes,
the third lens group includes a vibration-reduction lens group that is movable so as to have a movement component in a direction orthogonal to an optical axis,
the vibration-reduction lens group has negative refractive power,
the second lens group is constituted by five lenses,
the fourth lens group has a negative meniscus lens arranged closest to the object among lenses of the fourth lens group, the negative meniscus lens having a concave surface facing toward the object, and
the following conditional expression is satisfied:

$$0.200 < f1/f3 < 0.900$$

where
f1: a focal length of the first lens group
f3: a focal length of the third lens group.

2. The variable magnification optical system according to claim 1, wherein
the second lens group includes two cemented lenses.

3. The variable magnification optical system according to claim 1, wherein
the second lens group includes a biconvex lens arranged closest to the object among lenses of the second lens group.

4. The variable magnification optical system according to claim 1, wherein
the second lens group has a cemented lens arranged closest to the object among lenses of the second lens group, the cemented lens including a biconvex lens and a negative meniscus lens, the negative meniscus lens having a concave surface facing toward the object.

5. The variable magnification optical system according to claim 1, wherein
the fourth lens group is constituted by three lens components.

6. The variable magnification optical system according to claim 1, wherein
the following conditional expression is satisfied:

$$0.700 < f32/f3 < 2.500$$

where
f32: a focal length of the vibration-reduction lens group.

7. The variable magnification optical system according to claim 1, wherein
the following conditional expression is satisfied:

$$0.400 < f4/f2 < 1.600$$

where
f4: a focal length of the fourth lens group
f2: a focal length of the second lens group.

8. The variable magnification optical system according to claim 1, wherein
the vibration-reduction lens group is constituted by a cemented lens including a positive lens and a negative lens.

9. The variable magnification optical system according to claim 1, wherein
the vibration-reduction lens group has a biconcave negative lens.

10. The variable magnification optical system according to claim 1, wherein
the second lens group is constituted by, in order from the object, a 2-1st lens group having a positive refractive power and a 2-2nd lens group having a positive refractive power, and
the 2-1st lens group performs focusing by moving in an optical axis direction as a focusing lens group.

11. The variable magnification optical system according to claim 1, wherein
a lens surface, which is closest to an image, of the vibration-reduction lens group is an aspherical surface.

12. The variable magnification optical system according to claim 11, wherein
the following conditional expression is satisfied:

$$1.100 < A(T3.5)/A(T4.0) < 5.000$$

where
A(T3.5): an asphericity at point on the aspherical surface where light corresponding to F-value of 3.5 passes through the aspherical surface in a telephoto end state
A(T4.0): an asphericity at point on the aspherical surface where light corresponding to F-value of 4.0 passes through the aspherical surface in the telephoto end state.

13. An optical apparatus having the variable magnification optical system of claim 1 mounted thereon.

14. A method for manufacturing a variable magnification optical system, wherein
the variable magnification optical system is substantially constituted by four lens groups, the four lens groups including, in order from an object: a first lens group having a negative refractive power; a second lens group having a positive refractive power; a third lens group having a negative refractive power; and a fourth lens group having a positive refractive power,
the method comprising:
arranging the lens groups in a lens barrel such that upon varying magnification, the distance between the first lens group and the second lens group changes, the distance between the second lens group and the third lens group changes, and the distance between the third lens group and the fourth lens group changes,
configuring the third lens group to include a vibration-reduction lens group that is movable so as to have a movement component in a direction orthogonal to an optical axis,
configuring the vibration-reduction lens group to have negative refractive power,
configuring the second lens group to be constituted by five lenses,
configuring the fourth lens group to have a negative meniscus lens arranged closest to the object among lenses of the fourth lens group, the negative meniscus lens having a concave surface facing toward the object, and
satisfying the following conditional expression:

$$0.200 < f1/f3 < 0.900$$

where
f1: a focal length of the first lens group
f3: a focal length of the third lens group.

15. A variable magnification optical system that is substantially constituted by four lens groups,
the four lens groups including, in order from an object:
a first lens group having a negative refractive power;
a second lens group having a positive refractive power;
a third lens group having a negative refractive power; and
a fourth lens group having a positive refractive power, wherein
upon varying magnification, the distance between the first lens group and the second lens group changes, the distance between the second lens group and the third lens group changes, and the distance between the third lens group and the fourth lens group changes,
the third lens group includes a vibration-reduction lens group that is movable so as to have a movement component in a direction orthogonal to an optical axis,
the vibration-reduction lens group has negative refractive power,
the second lens group is constituted by five lenses,
the second lens group has a cemented lens arranged closest to the object among lenses of the second lens group, the cemented lens including a biconvex lens and a negative meniscus lens, the negative meniscus lens having a concave surface facing toward the object, and
the following conditional expression is satisfied:

$$0.200 < f1/f3 < 0.900$$

where
f1: a focal length of the first lens group
f3: a focal length of the third lens group.

16. The variable magnification optical system according to claim 15, wherein
the second lens group includes two cemented lenses.

17. The variable magnification optical system according to claim 15, wherein
the second lens group includes a biconvex lens arranged closest to the object among lenses of the second lens group.

18. The variable magnification optical system according to claim 15, wherein
the fourth lens group is constituted by three lens components.

19. A method for manufacturing a variable magnification optical system, wherein
the variable magnification optical system is substantially constituted by four lens groups, the four lens groups including, in order from an object: a first lens group having a negative refractive power; a second lens group having a positive refractive power; a third lens group having a negative refractive power; and a fourth lens group having a positive refractive power,
the method comprising:
arranging the lens groups in a lens barrel such that upon varying magnification, the distance between the first lens group and the second lens group changes, the distance between the second lens group and the third lens group changes, and the distance between the third lens group and the fourth lens group changes,
configuring the third lens group to include a vibration-reduction lens group that is movable so as to have a movement component in a direction orthogonal to an optical axis,
configuring the vibration-reduction lens group to have negative refractive power,
configuring the second lens group to be constituted by five lenses,
configuring the second lens group to have a cemented lens arranged closest to the object among lenses of the second lens group, the cemented lens including a biconvex lens and a negative meniscus lens, the negative meniscus lens having a concave surface facing toward the object, and
satisfying the following conditional expression:

$$0.200 < f1/f3 < 0.900$$

where
f1: a focal length of the first lens group
f3: a focal length of the third lens group.

* * * * *